United States Patent [19]
Hisatomi

[11] Patent Number: 6,112,011
[45] Date of Patent: *Aug. 29, 2000

[54] RECORDING MEDIUM HAVING VIDEO DATA STORED THEREIN WHICH IS CAPABLE OF FORCIBLY REPRODUCING SUB-PICTURE IN ACCORDANCE WITH STATE OF REPRODUCTION AND SYSTEM FOR THE SAME

[75] Inventor: Shuichi Hisatomi, Tokyo, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,598

[22] Filed: May 13, 1997

[30] Foreign Application Priority Data

May 14, 1996 [JP] Japan .................................. 8-119067

[51] Int. Cl.[7] .................................................. H04N 5/52
[52] U.S. Cl. .............................. 386/98; 386/111; 386/126
[58] Field of Search ................................... 386/1, 45, 98, 386/111, 112, 125, 126, 97; 369/47, 48

[56] References Cited

U.S. PATENT DOCUMENTS

| | | | |
|---|---|---|---|
| 5,237,426 | 8/1993 | Daito | 358/342 |
| 5,721,720 | 2/1998 | Kikuchi et al. | 386/126 |
| 5,734,788 | 3/1998 | Nonomura et al. | 386/126 |
| 5,758,007 | 5/1998 | Kitamura et al. | 386/45 |
| 5,835,670 | 11/1998 | Hirayama et al. | 386/97 |

FOREIGN PATENT DOCUMENTS

| | | |
|---|---|---|
| 546189 | 6/1993 | European Pat. Off. . |
| 633560 | 1/1995 | European Pat. Off. . |
| 661888 | 7/1995 | European Pat. Off. . |
| 8-340507 | 12/1996 | Japan . |
| 94/30014 | 12/1994 | WIPO . |

*Primary Examiner*—Wendy Garber
*Assistant Examiner*—Christopher Onuaku
*Attorney, Agent, or Firm*—Pillsbury Madison & Sutro LLP

[57] ABSTRACT

A recording medium is provided in which video data capable of forcibly reproducing a sub-picture in accordance with a state of reproduction is stored. A sub-picture pack sequence for forming a sub-picture data unit stores a unit header, run-length-compressed sub-picture pixel data and a display sequence table. The display sequence table stores a plurality of display sequences and having, described therein, a command for forcibly outputting sub-picture pixel data as the display sequence.

22 Claims, 37 Drawing Sheets

| VMGI_MAT | CONTENT (DESCRIPTION ORDER) |
|---|---|
| VMG_ID | VIDEO MANAGER IDENTIFIER |
| VMG_EA | END ADDRESS OF VMG |
| VMGI_EA | END ADDRESS OF VMGI |
| VERN | VERSION NUMBER OF DVD VIDEO SPECIFICATION |
| VMG_CAT | VIDEO MANAGER CATEGORY |
| VLMS_ID | VOLUME SET IDENTIFIER |
| VTS_Ns | NUMBER OF VIDEO TITLE SET |
| PVR_ID | PROVIDER UNIQUE ID |
| VMGI_MAT_EA | END ADDRESS OF VMGI_MAT |
| VMGM_VOBS_SA | VIDEO MANAGER MENU VIDEO OBJECT SET START ADDRESS |
| TT_SRPT_SA | START ADDRESS OF TT_SRPT |
| VMGM_PGCI_UT_SA | START ADDRESS OF VMGM_PGCI_UT |
| VTS_ATRT_SA | START ADDRESS OF VTS_ATRT |
| VMGM_V_ATR | VIDEO ATTRIBUTE OF VMGM |
| VMGM_AST_Ns | NUMBER OF AUDIO STREAM OF VMGM |
| VMGM_AST_ATR | AUDIO STREAM ATTRIBUTE OF VMGM |
| VMGM_SPST_Ns | NUMBER OF SUB-PICTURE STREAM OF VMGM |
| VMGM_SPST_ATR | SUB-PICTURE STREAM ATTRIBUTE OF VMGM |

FIG.7

TT_SRPT

TT_SRPTI (DESCRIPTION ORDER)

| | CONTENTS |
|---|---|
| TT_SRP_Ns | NUMBERS OF TITLE SEARCH POINTERS |
| TT_SRPT_EA | END ADDRESS OF TT_SRPT |

TT_SRP (DESCRIPTION ORDER)

| | CONTENTS |
|---|---|
| TT_PB_TY | TITLE PLAYBACK TYPE |
| AGL_Ns | NUMBER OF ANGLES |
| PTT_Ns | NUMBER OF PART OF TITLE |
| VTSN | VTS NUMBER |
| VTS_TTN | VTS TITLE NUMBER |
| VTS_SA | START ADDRESS OF VIDEO TITLE SET |

| VMGM_PGCI_UTI | |
|---|---|
| | CONTENTS |
| VMGM_LU_Ns | NUMBER OF VIDEO MANAGER MENU LANGUAGE UNITS |
| VMGM_PGCI_UT_EA | END ADDRESS OF VMGM_PGCI_UT |

| VMGM_LU_SRP | |
|---|---|
| | CONTENTS |
| VMGM_LCD | VIDEO MANAGER MENU LANGUAGE CODE |
| VMGM_LU_SA | START ADDRESS OF VMGM_LU |

| VMGM_LUI | |
|---|---|
| | CONTENTS |
| VMGM_PGCI_SRP_Ns | NUMBER OF VMGM_PGCI_SRPs |
| VMGM_LUI_EA | END ADDRESS OF VMGM_LUI |

| VMGM_PGCI_SRP | |
|---|---|
| | CONTENTS |
| VMGM_PGC-CAT | VMGM_PGC CATEGORY |
| VMGM_PGCI_SA | START ADDRESS OF VMGM_PGCI |

| VTS_ATRTI | |
|---|---|
| | CONTENTS |
| VTS_Ns | NUMBER OF VTSs |
| VTS_ATRT_EA | END ADDRESS OF VTS_ATRT |

| VTS_ATR_SRP | |
|---|---|
| | CONTENTS |
| (1)VTS_ATR_SA | START ADDRESS OF VTS_ATR |

| VTS_ATR | |
|---|---|
| | CONTENTS |
| VTS_ATR_EA | END ADDRESS OF VTS_ATR |
| VTS_CAT | VIDEO TITLE SET CATEGORY |
| VTS_ATRI | VIDEO TITLE SET ATTRIBUTE INFORMATION |

FIG.23

| VTSI_MAT | CONTENTS |
|---|---|
| VTS_ID | VTS IDENTIFIER |
| VTS_EA | END ADDRESS OF VTS |
| VTSI_EA | END ADDRESS OF VTSI |
| VERN | VERSION NUMBER OF DVD VIDEO SPECIFICATION |
| VTS_CAT | VTS CATEGORY |
| VTSI_MAT_EA | END ADDRESS OF VTSI_MAT |
| VTSM_VOBS_SA | START ADDRESS OF VTSM_VOBS |
| VTSTT_VOBS_SA | START ADDRESS OF VTSTT_VOB |
| VTS_PTT_SRPT_SA | START ADDRESS OF VTS_PTT_SRPT |
| VTS_PGCIT_SA | START ADDRESS OF VTS_PGCIT |
| VTSM_PGCI_UT_SA | START ADDRESS OF VTSM_PGCI_UT |
| VTS_TMAPT_SA | START ADDRESS OF VTS_TMAPT |
| VTS_C_ADT_SA | START ADDRESS OF CELL ADDRESS TABLE |
| VTS_VOBU_ADMAP_SA | START ADDRESS OF VOBU ADDRESS MAP |
| VTSM_V_ATR | VIDEO ATTRIBUTE OF VTSM |
| VTSM_AST_Ns | NUMBER OF AUDIO STREAMS OF VTSM |
| VTSM_AST_ATR | AUDIO STREAMS ATTRIBUTE OF VTSM |
| VTSM_SPST_Ns | NUMBER OF SUB-PICTURE STREAMS OF VTSM |
| VTSM_SPST_ATR | SUB-PICTURE STREAMS ATTRIBUTE OF VTSM |
| VTS_V_ATR | VIDEO ATTRIBUTE OF VTS |
| VTS_AST_Ns | NUMBER OF AUDIO STREAMS OF VTS |
| VTS_AST_ATR | AUDIO STREAM ATTRIBUTE OF VTS |
| VTS_SPST_Ns | NUMBER OF SUB-PICTURE STREAMS OF VTS |
| VTS_SPST_ATR | SUB-PICTURE STREAM ATTRIBUTE OF VTS |
| VTS_MU_AST_ATR | MULTICHANNEL AUDIO STREAM ATTRIBUTE OF VTS |

PTT_SRPTI

| | CONTENTS |
|---|---|
| VTS_TTU_Ns | NUMBER OF TTU IN VTS |
| VTS_PTT_SRPT_EA | END ADDRESS OF VTS PTT SRPT |

TTU_SRP

| | CONTENTS |
|---|---|
| (1)TTU_SA | START ADDRESS OF TTU |

PTT_SRP

| | CONTENTS |
|---|---|
| PGC_N | PROGRAM CHAIN NUMBER |
| PG_N | PROGRAM NUMBER |

VTS_PGCIT_I (DESCRIPTION ORDER)

| | CONTENT |
|---|---|
| VTS_PGC_Ns | NUMBER OF VTS_PGCs |
| VTS_PGCIT_EA | END ADDRESS OF VTS_PGCCIT |

VTS_PGCIT_SRP (DESCRIPTION ORDER)

| | CONTENT |
|---|---|
| VTS_PGC_CAT | VIDEO TITLE SET PGC CATEGORY |
| VTS_PGCI_SA | START ADDRESS OF VTS_PGCI |

PGC_GI

| | CONTENTS |
|---|---|
| PGC_CNT | PGC CONTENTS |
| PGC_PB_TM | PGC PLAYBACK TIME |
| PGC_UOP_CTL | PGC USER OPERATION CONTROL |
| PGC_SPST_CTL | PGC SUB-PICTURE STREAM CONTROL |
| PGC_AST_CTL | PGC AUDIO STREAM CONTROL |
| PGC_NV_CTL | PGC NAVIGATION CONTROL |
| PGC_SP_PLT | PGC SUB-PICTURE PALETTE |
| PGC_NV_CMDT_SA | START ADDRESS OF PGC_NV_CMDT |
| PGC_PGMAP_SA | START ADDRESS OF PGC_PGMAP |
| C_PBIT_SA | START ADDRESS OF C_PBIT |
| C_POSIT_SA | START ADDRESS OF C_POSIT |

FIG.32

PGC_PGMAP

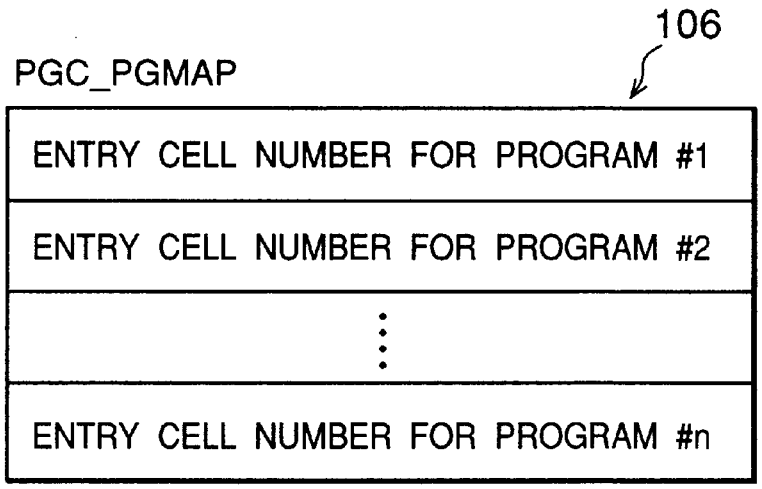

FIG.33

ENTRY CELL NUMBER

| | CONTENT |
|---|---|
| ECELLN | ENTRY CELL NUMBER |

FIG.34

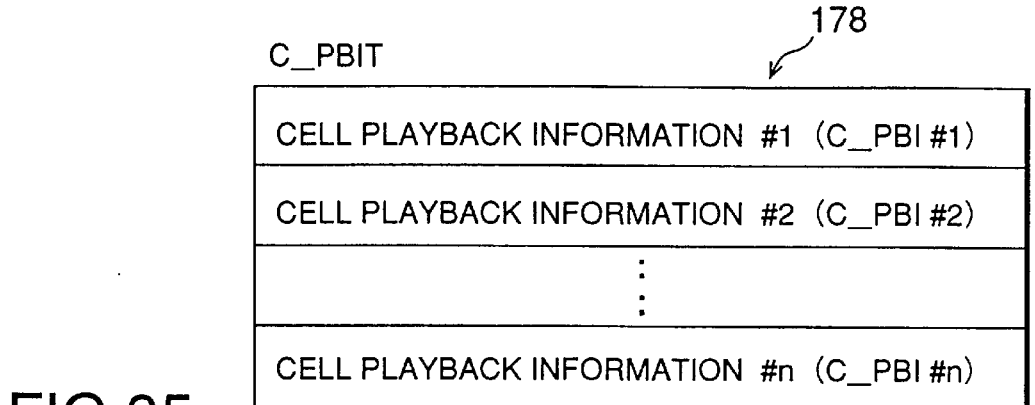
FIG.35
| C_PBI | |
|---|---|
| | CONTENT |
| C_CAT | CELL CATEGORY |
| C_PBTM | CELL PLAYBACK TIME |
| C_FVOBU_SA | START ADDRESS OF THE FIRST VOBU IN THE CELL |
| C_LVOBU_SA | START ADDRESS OF THE LAST VOBU IN THE CELL |
| C_LVOBU_EA | END ADDRESS OF THE LAST VOBU IN THE CELL |
FIG.36
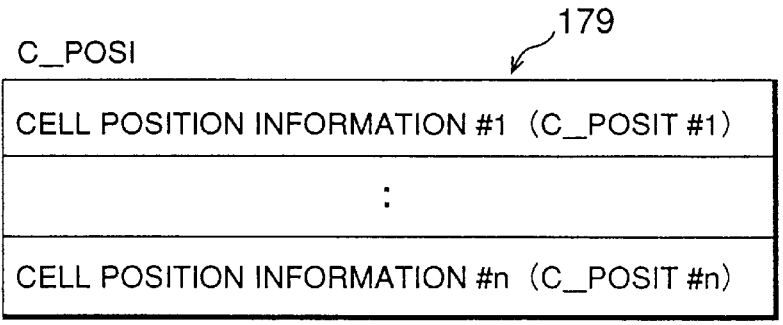
FIG.37
| C_POSI | |
|---|---|
| | CONTENT |
| C_VOB_IDN | VOB ID NUMBER OF CELL |
| C_IDN | CELL ID NUMBER OF THE CELL |
FIG.38

| VTSM_PGCI_UTI | |
|---|---|
| | CONTENTS |
| VTSM_LU_Ns | NUMBER OF VIDEO TITLE SET MENU LANGUAGE UNITS |
| VTSM_PGCI_UT_EA | END ADDRESS OF VTSM_PGCI_UT |

| VTSM_LU_SRP | |
|---|---|
| | CONTENTS |
| VTSM_LCD | VIDEO TITLE SET MENU LANGUAGE CODE |
| VTSM_LU_SA | START ADDRESS OF VTSM_LU |

| VTSM_LUI | |
|---|---|
| | CONTENTS |
| VTSM_PGC_Ns | NUMBER OF VTSM_PGCI_SRPs |
| VTSM_LU_EA | END ADDRESS OF VTSM_LU |

| VTSM_PGCI_SRP | |
|---|---|
| | CONTENTS |
| VTSM_PGC_CAT | VTSM_PGC CATEGORY |
| VTSM_PGCI_SA | START ADDRESS OF VTSM_PGCI |

FIG. 47

PCI

| | CONTENT |
|---|---|
| PCI_GI | PCI GENERAL INFORMATION |
| NSMLS_ANGLI | ANGLE INFORMATION |

FIG. 48

PCI_GI

| | CONTENT |
|---|---|
| NV_PCK_LBN | LBN OF NV PACK |
| VOBU_CAT | CATEGORY OF VOBU |
| VOBU_S_PTM | START PTM OF VOBU |
| VOBU_E_PTM | END PTM OF VOBU |
| VOBU_SE_E_PTM | END PTM OF SEQUENCE END IN VOBU |
| C_ELTM | CELL ELAPSE TIME |

FIG. 49

DSI

| | CONTENT |
|---|---|
| DSI_GI | DSI GENERAL INFORMATION |
| SML_PBI | SEAMLESS PLAYBACK INFORMATION |
| SML_AGLI | ANGLE INFORMATION |
| VOBU_SRI | VOB UNIT SEARCH INFORMATION |
| SYNCI | SYNCHRONUS PLAYBACK INFORMATION |

FIG. 50

DSI_GI

| | CONTENT |
|---|---|
| NV_PCK_SCR | SCR OF NV PACK |
| NV_PCK_LBN | LBN OF NV PACK |
| VOBU_EA | VOBU END ADDRESS |
| VOBU_1STREF_EA | END ADDRESS OF THE FIRST REFERENCE PICTURE IN VOBU |
| VOBU_2NDREF_EA | END ADDRESS OF THE SECOND REFERNECE PICTURE IN VOBU |
| VOBU_3RDREF_EA | END ADDRESS OF THE THIRD REFERENCE PICTURE IN VOBU |
| VOBU_VOB_IDN | VOBU ID NUMBER |
| VOBU_C_IDN | CELL ID NUMBER |
| C_ELTM | CELL ELAPSE TIME |

FIG. 51

SYNCI

| | CONTENT |
|---|---|
| A_SYNCA 0 TO 7 | TARGET AUDIO PACK ADDRESS |
| SP_SYNCA 0 TO 31 | VOBU START ADDRESS FOR TARGET SP PACK |

FIG.54

| SPUH | |
|---|---|
| | CONTENT |
| SPDSZ | SIZE OF SUB-PICTURE UNIT |
| SPDCSQTA | START ADDRESS OF DISPLAY SEQUENCE TABLE |

FIG.55

| SP_DCSQ | |
|---|---|
| | CONTENT |
| SP_DCSQ_STM | START TIME OF SP_DCSQ |
| SP_NXT_DCSQ_SA | START ADDRESS OF THE NEXT SP_DCSQ |
| SP_DCCMD1 | DISPLAY CONTROL COMMAND#1 |
| ... | ... |
| SP_DCCMDn | DISPLAY CONTROL COMMAND#n |

FIG.56

| SP_DCCMD | |
|---|---|
| COMMAND NAME | CONTENTS |
| FSTA_DSP | FORCEDLY SETS DISPLAY START TIMING OF PIXEL DATA |
| STA_DSP | SETS DISPLAY START TIMING OF PIXEL DATA |
| STP_DSP | SETS DISPLAY STOP TIMING OF PIXEL DATA |
| SET_COLOR | SETS COLOR CODE OF PIXEL DATA |
| SET_CONTR | SETS CONTRAST BETWEEN PIXEL DATA AND MAIN PICTURE |
| SET_DAREA | SETS DISPLAY AREA OF PIXEL DATA |
| SET_DSPXA | SETS DISPLAY START ADDRESS OF PIXEL DATA |
| CHG_COLCON | SETS CHANGE OF COLOR AND CONTRAST FOR PIXEL DATA |
| CMD_END | END OF DISPLAY CONTROL COMMAND |

RECORDING MEDIUM HAVING VIDEO DATA STORED THEREIN WHICH IS CAPABLE OF FORCIBLY REPRODUCING SUB-PICTURE IN ACCORDANCE WITH STATE OF REPRODUCTION AND SYSTEM FOR THE SAME

BACKGROUND OF THE INVENTION

The present invention relates to a recording medium having, together with video data, sub-picture data stored therein and a reproducing system for the same, and more particularly to a recording medium having video data stored therein which is capable of forcibly reproducing sub-picture in accordance with a state of reproduction and a reproducing system for the same.

Recently, a significant progress has been achieved in developing an optical disk reproducing apparatus adaptable to time-varying images.

The apparatus of the foregoing type is arranged such that data is reproduced from an optical disk which is a recording medium, on which digital data of, images, audio and the like, has been compressed and recorded at a high density and a monitor or a speaker unit is operated in accordance with reproduced digital data. If optical disk reproducing apparatuses of the foregoing type will be mass-produced in the future, a multiplicity of manufacturers are expected to provide a variety of software of motion pictures, those of singing to taped accompaniment and the like.

Hitherto, video tapes have been employed as usual image recording mediums. The video tape having a smaller recording capacity per unit area than that of the optical disk does not permit a complicated random access. Therefore, video data is usually recorded together with audio data such that video data is, as an option, recorded together with single sub-picture data. Audio data and sub-picture data are selectively reproduced by a conventional reproducing system. Since state and time of reproduction of sub-picture data are not controlled, sub-pictures provided for respective scenes cannot be switched.

Video recording mediums having English captions have been widely used in U.S.A. The English caption is recorded on the recording medium as a form of sub-picture data. Then, a system for reproducing the foregoing recording medium selectively turns on or off the English caption. If the English caption is turned off, the reproducing system continuously disables the display of the English caption regardless of a speech expressed by audio data which is reproduced together with sub-picture data.

If a recording medium stores a movie containing a scene in which a speech in a language except for English is expressed, there arises the following problem. If the English caption of the reproducing apparatus is turned off, any English caption is not displayed even in a case where a speech in another language is output. Specifically, a corresponding scene can be considered in which a hero travels from an English language zone to a French language and thus the hero speaks French. If no English caption corresponding to the French speech is displayed, audiences in the English language zone cannot understand the foregoing speech. Similarly, a corresponding scene can be considered in which a hero looks at a label of a medicine written in German. If no English caption indicating the label written in German is displayed, audiences in the English language zone cannot understand the type of the medicine.

The above-mentioned problem can be solved by preparing an additional English caption which is turned on when the main English caption has been turned off and which relates to a speech in a language except for English. In this case, a recording space having a capacity of two times is required to record sub-picture data for the main English caption and sub-picture data for the additional English caption.

BRIEF SUMMARY OF THE INVENTION

A first object of the present invention is to provide a recording medium in which video data capable of forcibly reproducing a sub-picture in accordance with a state of reproduction is stored.

A second object of the present invention is to provide a reproducing system for causing a sub-picture to be adequately displayed in accordance with a state of reproduction from a recording medium, in which video data capable of forcibly reproducing the sub-picture is stored.

A third object of the present invention is to provide a reproducing method of causing a sub-picture to be adequately displayed in accordance with a state of reproduction from a recording medium, in which video data capable of forcibly reproducing the sub-picture is stored.

A fourth object of the present invention is to provide a method of recording sub-picture data together with video data on a recording medium, in which video data capable of forcibly reproducing a sub-picture in accordance with a state of reproduction is stored.

A fifth object of the present invention is to provide an apparatus for recording sub-picture data together with video data on a recording medium, in which video data capable of forcibly reproducing a sub-picture in accordance with a state of reproduction is stored.

A sixth object of the present invention is to provide a communication system for transferring, together with sub-picture data, video data capable of forcibly reproducing a sub-picture in accordance with a state of reproduction.

According to one aspect of the present invention, there is provided a recording medium having a data pack sequence composed of recorded packs in each of which video data, audio data and sub-picture data respectively are stored, the recording medium comprising:

a sub-picture data unit composed of a plurality of sub-picture packs, wherein control information for controlling reproduction of sub-picture data is described in the sub-picture data unit.

According to another aspect of the present invention, there is provided a reproducing method structured such that a sub-picture is reproduced from a recording medium having a data pack sequence composed of recorded packs in each of which video data, audio data and sub-picture data respectively are stored, the reproducing method comprising the steps of:

acquiring a sub-picture data unit composed of a plurality of sub-picture packs from the recording medium; and acquiring control information for controlling reproduction of sub-picture data described in the sub-picture data unit to control output of pixel data in the sub-picture data unit in accordance with acquired control information.

According to another aspect of the present invention, there is provided a reproducing apparatus for reproducing a sub-picture from a recording medium having a data pack sequence composed of recorded packs in each of which video data, audio data and sub-picture data respectively are stored, the reproducing apparatus comprising:

means for retrieving a sub-picture data unit composed of a plurality of sub-picture packs from the recording medium; and means for retrieving control information for controlling reproduction of sub-picture data described in the sub-picture data unit to control output of pixel data in the sub-picture data unit in accordance with retrieved control information.

According to another aspect of the present invention, there is provided a recording method structured such that a data pack sequence consisting of packs in each of which video data, audio data and sub-picture data respectively are stored is recorded on a recording medium, the recording method comprising the steps of:

forming a sub-picture data unit by a plurality of sub-picture packs; and describing control information for controlling reproduction of sub-picture data in the sub-picture data unit.

According to another aspect of the present invention, there is provided a recording apparatus for recording, on a recording medium, a data pack sequence consisting of packs in each of which video data, audio data and sub-picture data respectively are stored, the recording apparatus comprising:

means for forming a sub-picture data unit by a plurality of sub-picture packs; and means for describing control information for controlling reproduction of sub-picture data in the sub-picture data unit.

According to another aspect of the present invention, there is provided a communication apparatus for transferring a data pack sequence consisting of packs respectively storing video data, audio data and sub-picture data, the communication apparatus comprising:

means for transferring, to the recording medium, a sub-picture data unit composed of a plurality of sub-picture packs, the means being transferring means for transferring control information for controlling reproduction of sub-picture data to be described in the sub-picture data unit and controlling output of pixel data in the sub-picture data unit in accordance with transferred control information.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 shows parameters and contents of a volume manager information management table (VMGI_MAT) in the video manager (VMGI) shown in FIG. 6;

FIG. 23 shows parameters and contents of a management table (VTSI_MAT) of video title set information (VTSI) shown in FIG. 22;

FIG. 32 shows parameters and contents of general information (PGC_GI) of a program chain of program chain information (VTS_PGCI) shown FIG. 31;

FIG. 33 shows a structure of a program chain map (PGC_PGMAP) of program chain information (VTS_PGCI) shown in FIG. 31;

FIG. 34 shows parameters and contents of an entry cell number (ECELLN) of a program described on a program chain map (PGC_PGMAP) shown in FIG. 33;

FIG. 35 shows a structure of a cell playback information table (C_PBIT) of program chain information (VTS_PGCI) shown in FIG. 33;

FIG. 36 shows parameters and contents of cell playback information (C_PBI) on the cell playback information table (C_PBIT) shown in FIG. 35;

FIG. 37 shows a structure of cell position information (C_POSI) of program chain information (VTS_PGCI) shown in FIG. 35;

FIG. 38 shows parameters and contents of the cell position information (C_POSI) shown in FIG. 37;

FIG. 47 shows parameters and contents of presentation control information (PCI) of the navigation pack shown in FIG. 45;

FIG. 48 shows parameters and contents of general information (PCI_GI) in presentation control information (PCI) shown in FIG. 45;

FIG. 49 shows parameters and contents of disk search information (DSI) of the navigation pack shown in FIG. 48;

FIG. 50 shows parameters and contents of DSI general information (DSI_GI) of disk search information (DSI) shown in FIG. 49;

FIG. 51 shows parameters and contents of synchronous playback information (SYNCI) of video object (VOB) shown in FIG. 49;

FIG. 54 shows parameters and contents of unit headers (SPUH) of the sub-picture data units shown in FIG. 53;

FIG. 55 shows parameters and contents in a display sequence control table (SP_DCSQT) of the sub-picture data unit (SPU) shown in FIG. 53;

FIG. 56 shows command names and contents of the display control commands (SP_DCSQT) shown in FIG. 55;

DETAILED DESCRIPTION OF THE INVENTION

Hereinafter, referring to the accompanying drawings, an optical disk and an optical disk reproducing apparatus according to an embodiment of the present invention will be explained.

Figure 1:
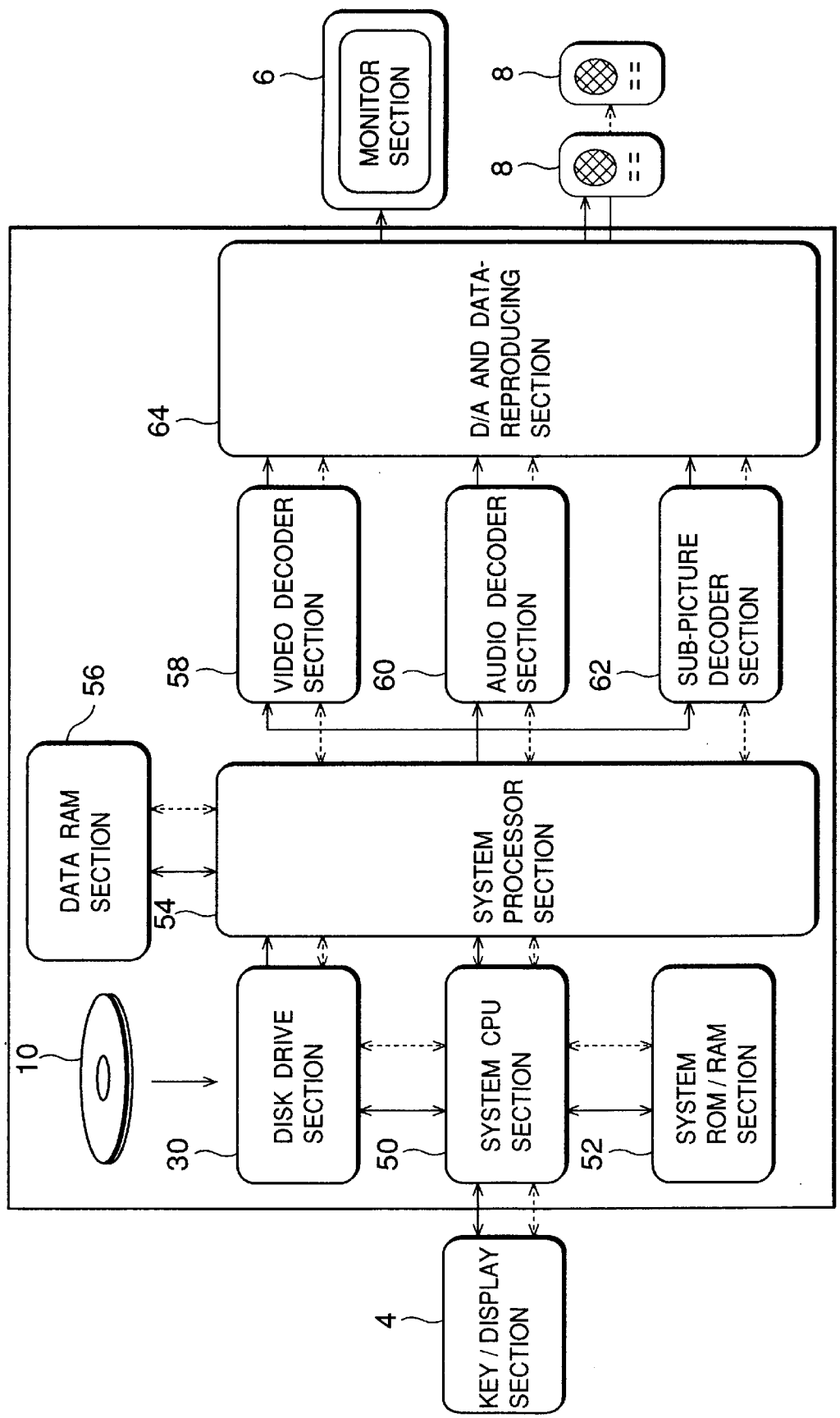
FIG. 1 is a block diagram schematically showing an optical disk apparatus.
Figure 2:
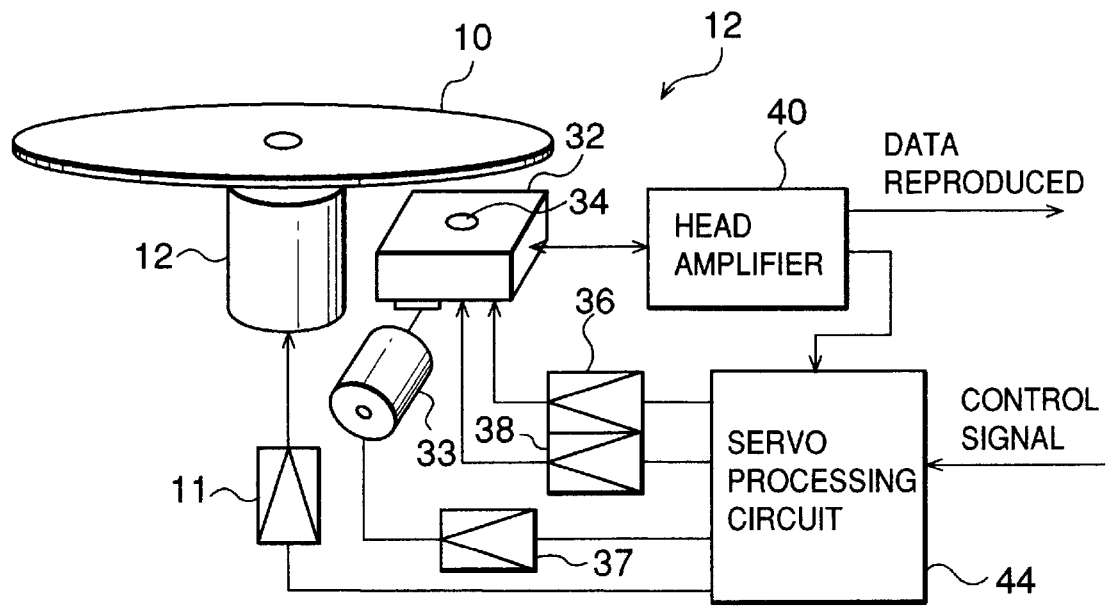
FIG. 2 is a block diagram showing details of the mechanism of a disk drive section shown in FIG. 1.
Figure 3:
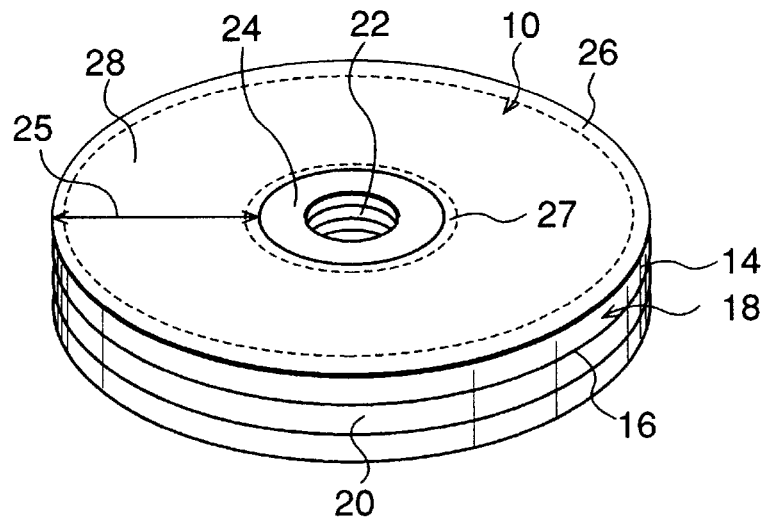
FIG. 3 is a perspective view schematically showing the structure of an optical disk shown in FIG. 1.

FIG. 1 is a block diagram of an optical disk reproducing apparatus that reproduces data from an optical disk associated with the embodiment of the present invention. FIG. 2 is a block diagram of a disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

It is known that the optical disk 10 is available with various structures. For instance, one type of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues clamped at the clamping areas 24.

As shown in FIG. 3, the optical disk 10 has an information zone 25 around the clamping zone 24 on each side, the information zones allowing the information to be recorded on the optical disk 10. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which reproduction data, video data, sub-picture data, and audio data are recorded in the form of pits (that is, in the form of changes in the physical state), as will be explained later. With the read-only optical disk 10, a train of pits is formed in advance in the transparent substrate 14 by a stamper, a reflecting layer is formed by deposition on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 56, a video decoder section 58, an audio decoder section 60, a sub-picture decoder section 62, and a D/A and data reproducing section 64.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 across the radius of the optical disk 10. The optical head 32 is provided with an objective lens 34 positioned so as to face the optical disk 10. The objective lens 34 is moved according to the driving signal supplied from the focus circuit 36 so as to move along its optical axis.

To reproduce the data from the above optical disk 10, the optical head 32 projects a laser beam on the optical disk 10 via the objective lens 34. The objective lens 34 is moved little by little across the radius of the optical disk 10 according to the driving signal supplied from the tracking circuit 38. Furthermore, the objective lens 34 is moved along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, the objective lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track, for example, at a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in the data RAM section 56 by the system processor section 54 which is controlled by the system CPU section 50 which is operated in accordance with the programs stored in the system ROM/RAM section 52. The stored reproduced data is processed at the system processor section 54, which sorts the data into video data, audio data, and sub-picture data, which are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal and an analog audio signal, and supplies the resulting video signal to the monitor 6 and the resulting audio signal to the speaker 8. Then, on the basis of the video signal and sub-picture signal, images are displayed on the monitor section 6 and according to the audio signal, sound is simultaneously reproduced at the speaker section 8.

The operation of the optical disk apparatus shown in FIG. 1 will be described in greater detail along with the logic formats of the optical disk 10.

Figure 4:
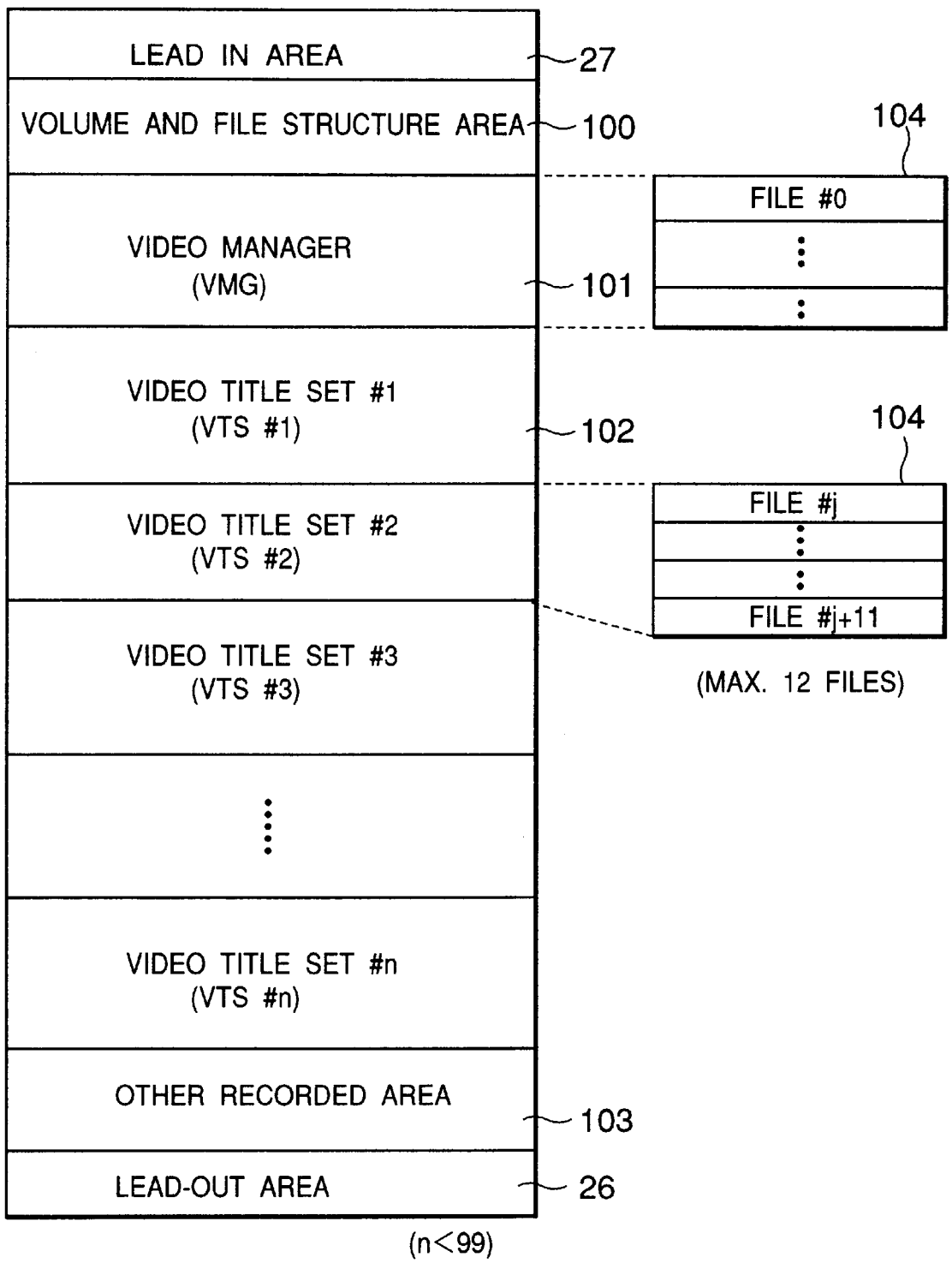
FIG. 4 shows a structure of a logic format of an optical disk shown in FIG. 3.

FIG. 4 shows the structure of the theoretical format f a optical disk 10 shown in FIG. 1. The data recording area 28 between the lead-in area 27 and the lead-out area 26 on the optical disk 10 of FIG. 1 has a volume and file structure as shown in FIG. 4. The structure has been determined in conformity to specific logic format standards, such as micro UDF or ISO 9660. The data recording area 28 is physically divided into a plurality of sectors as described earlier. These physical sectors are assigned serial numbers. In the following explanation, a logical address means a logical sector number (LSN) as determined in micro UDF or ISO 9660. Like a physical sector, a logical sector contains 2048 bytes. The numbers (LSN) of logical sectors are assigned consecutively in ascending order as the physical sector number increments.

As shown in FIG. 4, the volume and file structure is a hierarchical structure and contains a volume and file structure area 100, a video manager (VMG) 101, at least one video title set (VTS) 102, and other recorded areas 73. These areas are partitioned at the boundaries between logical sectors. As with a conventional CD, a logical sector is defined as a set of 2048 bytes. Similarly, a logical block is defined as a set of 2048 bytes. Therefore, a single logical sector is defined as a single logical block.

The file structure area 100 corresponds to a management area determined in micro UDF or ISO 9660. According to the description in the management area, the video manager 101 is stored in the system ROM/RAM section 52. As explained with reference to FIG. 5, the information used to manage video title sets is described in the video manager, which is composed of a plurality of files 104, starting with file #0. In each video title set (VTS) 102, compressed video data, compressed audio data, compressed sub-picture data, and the playback information about these data items are stored as explained later. Each video title set is composed of a plurality of files 104. The number of video title sets is limited to 99 maximum. Furthermore, the number of files 104 (from File #j to File #j+12) constituting each video title set is 12 at most. These files are also partitioned at the boundaries between logical sectors.

In the other recorded areas 73, the information capable of using the video title sets 102 is recorded. The other recorded areas 103 are not necessarily provided.

Figure 5:
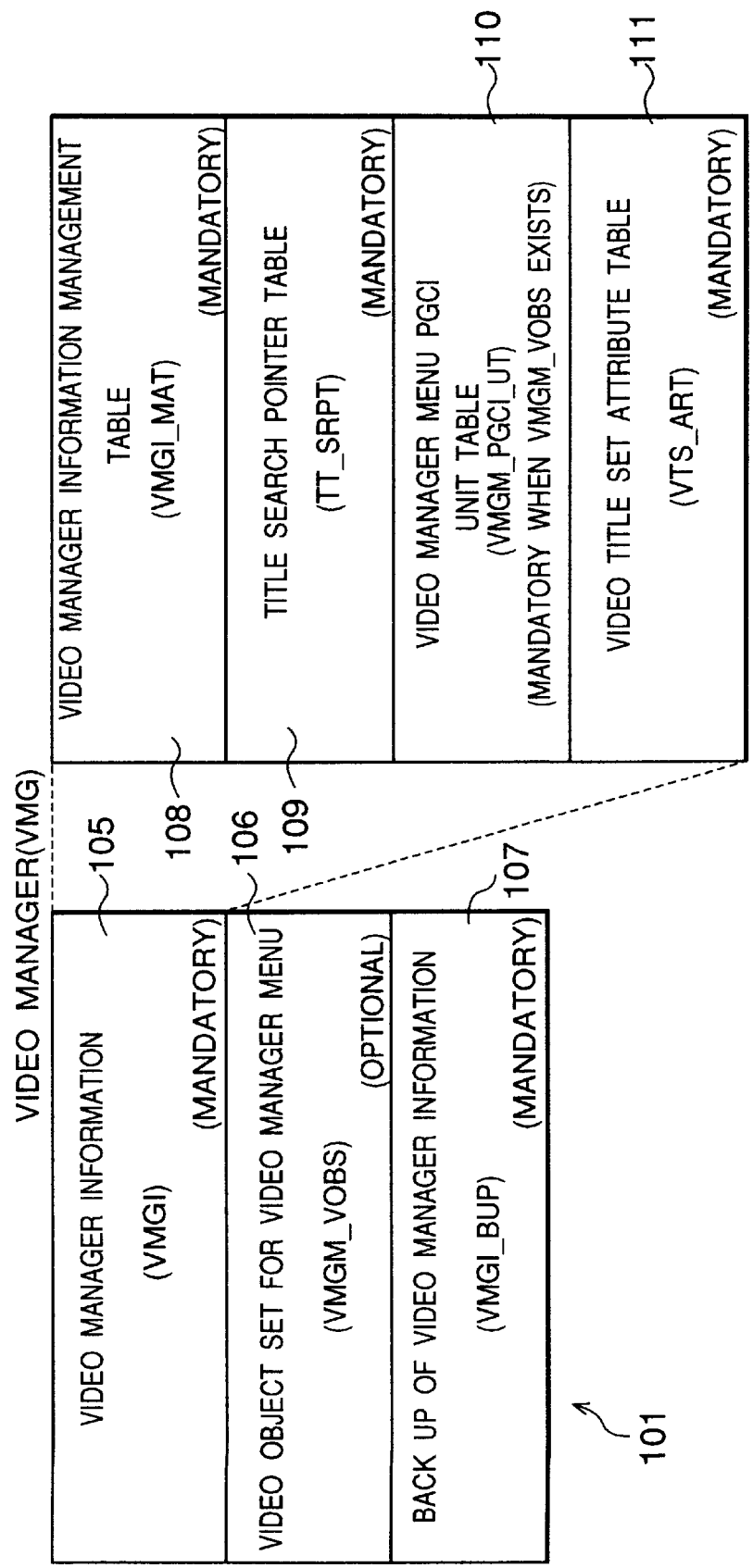
FIG. 5 shows a structure of a video manager shown in FIG. 4.

As shown in FIG. 5, the video manager 101 contains at least three items each corresponding to individual files 104. Specifically, the video manager 101 is made up of video manager information (VMGI) 105, a video object set (VMGM_VOBS) 106 for video manager menu, and backup (VMGI_BUP) 107 of video manager information. Here, the volume manager information (VMGI) 105 and the backup (VMGI_BUP) 107 of video manager information are determined to be indispensable items, and the video object set (VMGM_VOBS) 106 for video manager menu is determined to be an optional item. In the video object set (VMGM-VOBS) 106 for VMGM, the video data, audio data, and sub-picture data for a menu of the volumes of the optical disk managed by the video manager 101 are stored.

As in the case of video reproduction which will be explained later, the volume name of the optical disk and the explanation of the audio and sub-picture accompanied by the display of the volume name are displayed by the video object set (VMGM_VOBS) 106 for VMGM, and selectable items are displayed by the sub-picture. If video data of all matches a boxer X had fought until he won the world championship is reproduced by the video object set (VMGM_VOBS) 106, the fighting pose of Boxer X will be displayed along with the volume name showing his glorious fighting history, the theme song for him will be generated, and his fighting history will be displayed by the sub-picture. Further, questions are made to the user as to in which language (English or Japanese) the narration should be presented, and as to in which other language the subtitle should be presented by the sub-picture. Thus, the video object set (VMGM_VOBS) 106 for VMGM enables the user to enjoy seeing any match Boxer X has fought, while listing to the narration in, for example, English and reading the subtitle in, for example, Japanese.

Figure 6:
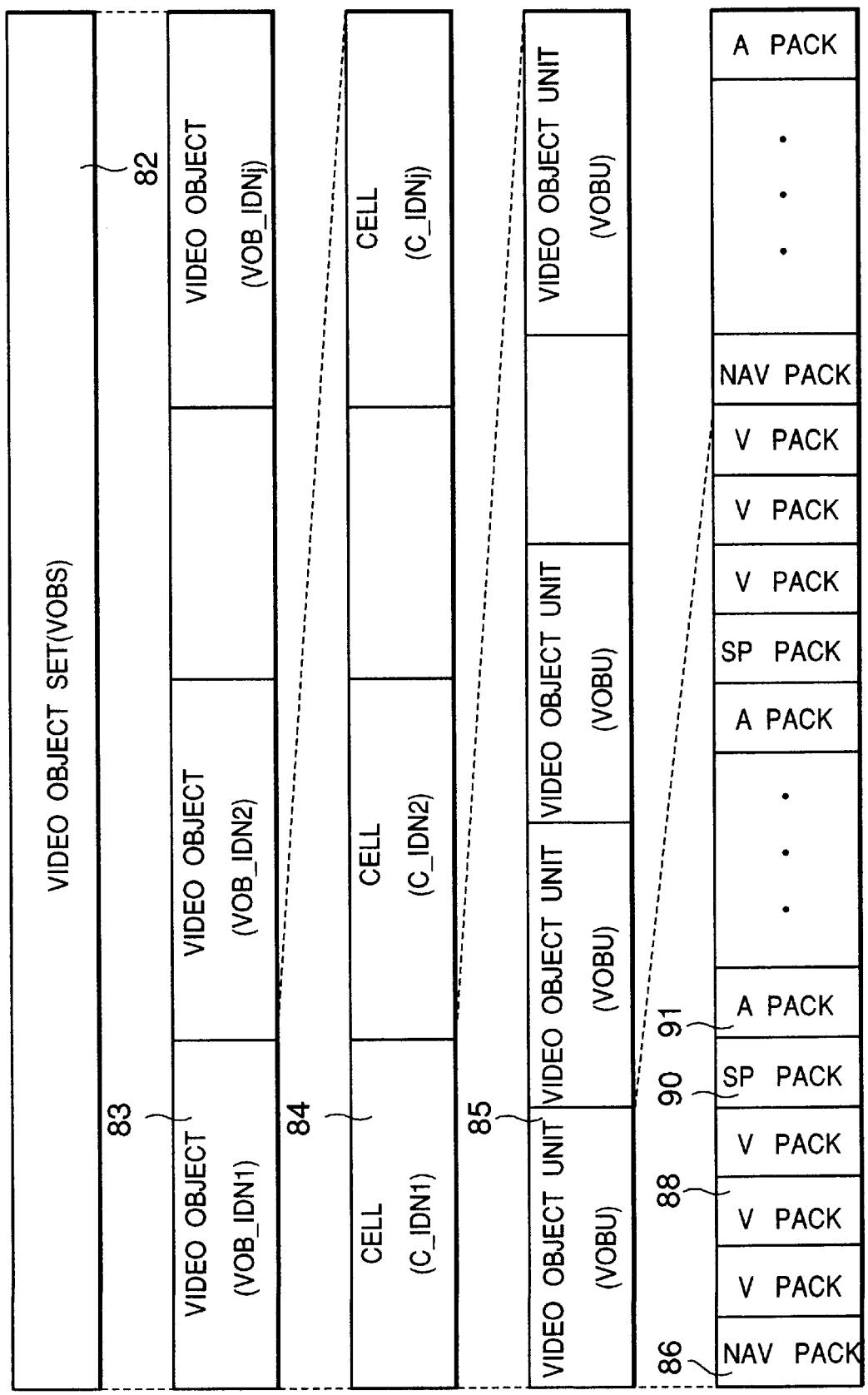
FIG. 6 shows a structure of a video object set (VOBS) shown in FIG. 5.

The structure of a video object set (VOBS) 82 will be described with reference to FIG. 6. FIG. 6 shows an example of a video object set (VOBS) 82. The video object set (VOBS) 82 is provided in three types 106, 141 and 142 for two menus and a title. Specifically, in the video object set (VOBS) 82, a video title set (VTS) 102 contains a video object set (VTSM_VOBS) 82 for a menu of video title sets and a video object set (VTSTT_VOBS) 142 for the titles of at least one video title set, as will be explained later. Each video object 82 set has the same structure except that their uses differ.

As shown in FIG. 6, a video object set (VOBS) 82 is defined as a set of one or more video objects (VOB) 83. The video objects 83 in a video object set (VOBS) 82 are used for the same application. A video object set (VOBS) 83 for menus is usually made up of a single video object (VOB) 83 and stores the data used to display a plurality of menu screens. In contrast, a video object set (VTSTT_VOBS) 82 for title sets is usually composed of a plurality of video objects (VOB) 83.

Taking the boxing match as example, a video object (VOB) 83 corresponds to the video data of each match played by Boxer X. Specifying a particular video object (VOB) enables, for example, Boxer X's eleventh match for a world championship to be reproduced on a video. The video object set (VTSM_VOBS) 82 for a menu of the video title sets 102 contains the menu data for the matches played by boxer X. According to the presentation of the menu, a particular match, for example, Boxer X's eleventh match for a world championship, can be specified. In the case of a usual single story movie, one video object (VOB) 83 corresponds to one video object set (VOBS) 82. One video stream is completed with one video object set (VOBS) 82. In the case of a collection of animated cartoons or an omnibus movie, a plurality of video streams each corresponding to individual stories are provided in a single video object set (VOBS) 82. Each video stream is stored in the corresponding video object. Accordingly, the audio stream and sub-picture stream related to the video stream are also completed with each video object (VOB) 83.

An identification number (IDN#j) is assigned to a video object (VOB) 83. By the identification number, the video object (VOB) 83 can be identified. A single video object (VOB) 83 is made up of one or more cells 84. Although a usual video stream is made up of a plurality of cells, a menu video stream, or a video object (VOB) 83 may be composed of one cell 84. A cell is likewise assigned an identification number (C_IDN#j). By the identification number (C_IDN#j), the cell 84 is identified.

As shown in FIG. 6, each cell 84 is composed of one or more video object units (VOBU) 85, usually a plurality of video object units (VOBU) 85. A video object unit (VOBU) 85 is defined as a pack train having a single navigation pack (NAV pack) 86 at its head. Specifically, a video object unit (VOBU) 85 is defined as a set of all the packs recorded, starting at a navigation pack (NAV pack) to immediately in front of the next navigation pack. The playback time of the video object unit (VOBU) corresponds to the playback time of the video data made up of one or more GOPs (Group of Pictures) contained in the video object (VOBU). The playback time is set at 0.4 seconds or more second and less than one second. In the MPEG standard, a single GOP is set at, usually, 0.5 seconds; it is compressed screen data for reproducing about 15 screens during that period.

When a video object unit includes video data as shown in FIG. 6, more than one GOP composed of video packs (V packs) 88, a sub-picture pack (SP pack) 90, and an audio pack (A pack) 91 all determined in the MPEG standard, are arranged to produce a video data stream. Regardless of the number of GOPs, a video object unit (VOBU) 85 is determined on the basis of the playback time of a GOP. The video object always has a navigation pack (NV pack) 86 at its head. Even when the playback data consists only of audio and/or sub-picture data, it will be constructed using the video object unit as a unit. Specifically, even if a video object unit is constructed only of audio packs, the audio packs to be reproduced within the playback time of the video object unit to which the audio data belongs will be stored in the video object unit, as with the video object of video data.

The video manager 101 will be explained with reference to FIG. 5. The video management information 105 placed at the head of the video manager 101 contains information on the video manager itself, the information used to search for titles, the information used to reproduce the video manager menu, and the information used to manage the video title sets (VTS) 102 such as the attribute information on video titles. The volume management information contains four tables 108, 109, 111, and 110 in the order shown in FIG. 27. Each of these tables 108, 109, 111, and 110 is aligned with the boundaries between logical sectors. A first table, a video manger information management table (VMGI_MAT) 108, is a mandatory table. Written in the first table are the size of the video manager 101, the start address of each piece of the information in the video manger 101, and the start address of and the attribute information about the video object set (VMGM_VOBS) 106 for a video manager menu. As explained later, the attribute information includes the video attribute information, the audio attribute information, and the sub-picture attribute information. According to these pieces of attribute information, the modes of the decoders 58, 60 and 62 are changed, thereby enabling the video object set (VMGM_VOBS) 106 to be reproduced in a suitable mode.

Written in a second table of the video manager 101, i.e., a title search pointer table (TT_SRPT) 109, are the start addresses of the video titles stored on the optical disk 10 that are selectable according to a title number entered from the key/display section 4 on the apparatus.

A video manager menu PGCI unit table (VMGM_PGCI_UT) 110 which is a third table of a video manager 101 is an essential factor if a video object (VMGM_VOB) 106 for a video manager menu is provided. The video object (VMGM_VOB) 106 for the video manager menu includes program chains corresponding to various languages and has described information relating to the program chains for the menu corresponding to the respective languages.

Described in a fourth table of the video manager 101 are a video title set attribution table (VTS_ATRT) 111, the attribute information determined in the video title set (VTS) 102 in the volumes of the optical disk.

Specifically, in this table, the following items are described is attribute information such as the number of video title sets (VTS) 102, video title set (VTS) 102 numbers, video attributes, such as a video data compression scheme, audio stream attributes, such as an audio coding mode, and sub-picture attributes, such as the type of sub-picture display.

The details of the contents of the video management information management table (VMGI_MAT) 108, video manager menu PGCI unit table (VMGM_PGCI_UT) 110 and title search pointer table (TT_SRPT) 109 will be described with reference to FIGS. 7 to 17.

As shown in FIG. 71 described in the video management information management table (VMGI_MAT) 108 are an identifier (VMG_ID) for the video manager 101, the end address (VMG_EA) of the VMG with relative logical block number from the first logical block of the VMG and the end address (VMGI_EA) of the VMGI size with relative logical block number from the first logical block of the VMG wherein one logical block is defined as 2048 bytes as described before, the version number (VERN) related to the standard for the optical disk, commonly known as a digital versatile disk (digital multipurpose disk, hereinafter, referred to as a DVD), and the category (VMG_CAT) of the video manger 101.

Described in the category (VMG_CAT) of the video manager 101, a flag indicating whether or not the DVD video directory inhibits copying. Further described in the table (VMGI_MAT) 108 are a volume set identifier (VLMS_ID), the number of video title sets (VTS_Ns), the identifier for a provider supplying the data to be recorded on the disk (PVR_ID), the start address (VMGM_VOBS_SA) of the video object set (VMGM_VOBS) 106 for a video manager menu, the end address (VMGI_MAT_EA) of a volume manager information management table (VMGI_MAT) 108, and the start address (TT_SRPT_SA) of a title search pointer table (TT_SRPT) 109. If the video object set (VMGM_VOBS) 141 for the VMG menu is absent, "00000000h" will be described in its start address (VMGM_VOBS_SA). The end address (VMGI_MAT_EA) of VMG_MAT 108 is described by the number of bytes, relative to the head byte of VMGI_MAT 108. The start address (TT_SRPT_SA) of the TT-SRPT 109 is described by the number of logical blocks, relative to the head logical block of VMGI 105.

Furthermore, in the table 108, the start address (VMGM_PGCI_UT_SA) of the video manager menu PGCI unit table (VMGM_PGCI_UT) and the start address (VTS_ATRT_SA) of the attribute table (VTS_ATRT) of video title sets (VTS) 102 are represented by the number of bytes, relative to the first byte in the VMGI manager table (VMGI_MAT) 108. Also described in the table 108 is the video attribute (VMGM_V_ATR) of the video manager menu (VMGM) video object set 106. Further described in the table 108 are the number (VMGM_AST_Ns) of audio streams in the video manager menu (VMGM), the attributes (VMGM_AST_ATR) of audio streams in the video manager menu (VMGM), the number (VMGM_SPST_Ns) of sub-picture streams in the video manager menu (VMGM), and the attributes (VMGM_SPST_ATR) of sub-picture streams in the video manager menu (VMGM). When the video manager menu (VMGM) is not present, "00000000h" is described in the video manager menu PGCI unit table (VMGM_PGCI_UT).

Figures 8, 9, 10:
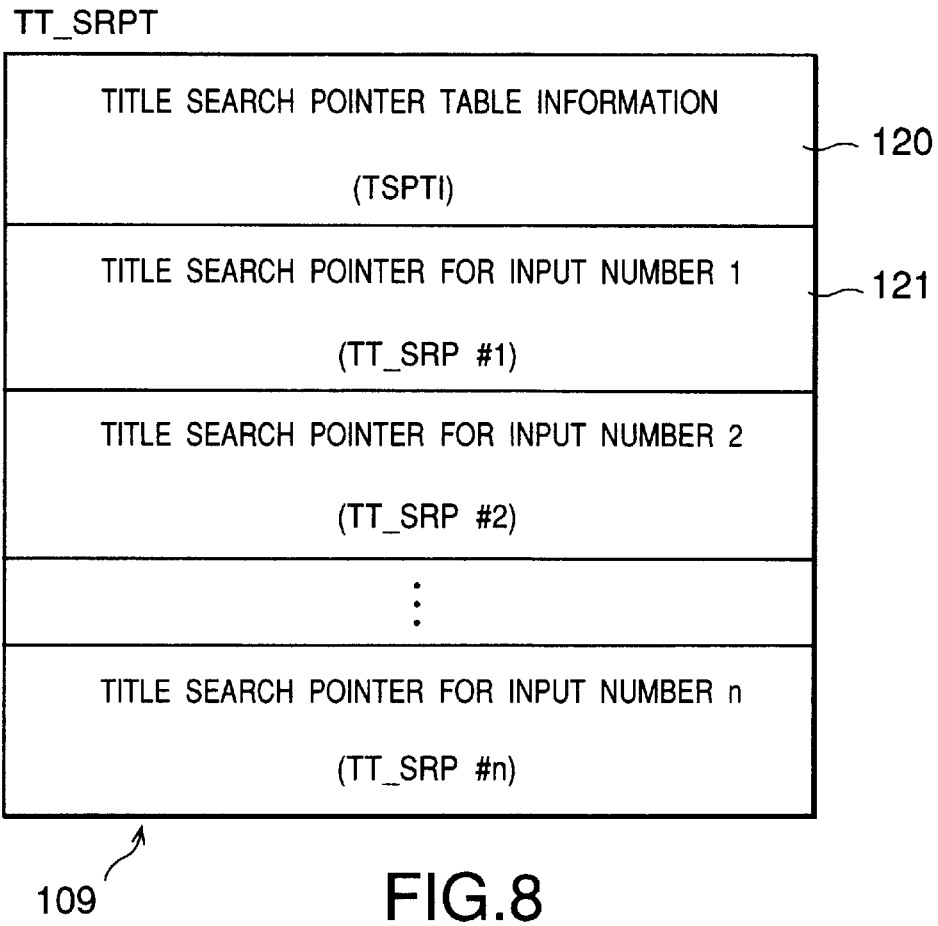
FIG. 8 shows a structure of a title search pointer table (TSPT) in the video manager (VMGI) shown in FIG. 6.
FIG. 9 shows parameters and contents of title search pointer table information (TSPTI) of the title search pointer table (TSPT) shown in FIG. 8.
FIG. 10 shows parameters and contents of a title search pointer (TT_SRP) corresponding to an input number of the title search pointer table (TSPT) shown in FIG. 8.

Explanation of the structure shown in FIG. 5 will be resumed. In the title search pointer table (TT_SRPT) 109 of FIG. 5, the title search pointer table information (TSPTI) is first descried as shown in FIG. 8. Then, as many title search pointers (TT_SRP) for input numbers 1 to n (n≦99) as are needed are described consecutively. When only the playback data for a single title, for example, only the video data for a single title, is stored in a volume of the optical disk, only a single title search pointer (TT_SRP) 121 is described in the table (TT_SRPT) 109.

The title search pointer table information (TSPTI) 120 contains the number (TT_SRP_Ns) of title search pointers (TT_SRPs) and the end address (TT_SRPT_EA) of the title search pointer (TT-SRP) 121 as shown in FIG. 9. The address (TT_SRPT_EA) is represented by the number of bytes, relative to the first byte in the title search pointer table (TT_SRPT) 109. As shown in FIG. 10, described in each title search pointer (TT_SRP) are: a title playback type (TT_PB_TY), number of angle (AGL_Ns), a video title set number (VTSN), the number of parts of title (TT_Ns), VTS title number (VTS_TTN) which is used to access the corresponding TTU in the VTS_PTT_SRP of the VTS which is indicated with VTSN, and the video start address (VTS_SA) of the video title set 102.

The contents of the title search pointer (TT_SRP) 121 specifies a video title set to be reproduced and a program chain (PGC) as well as a location in which the video title set 102 is to be stored. The start address (VTS_SA) of the video title set 102 is represented by the number of logical blocks in connection with the title set specified by the video title set number (VTSN).

Figure 11:
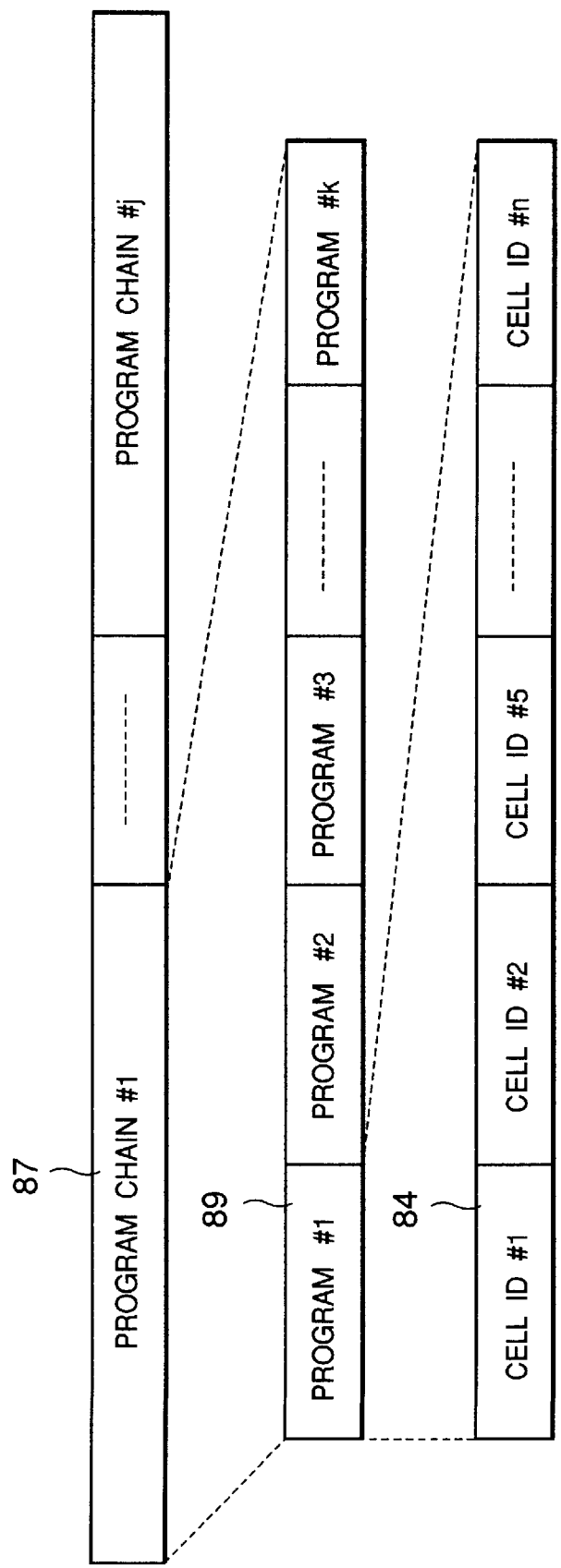
FIG. 11 is a view for describing the structure of a program chain stored in the file.

A program chain 87 is defined as a set of programs 89 that reproduce the story of a title, as shown in FIG. 11. In the case of a program chain for a menu, still picture programs or moving picture programs are reproduced one after another to complete a menu for a single title. In the case of a program chain for a title set, a program chain corresponds to a chapter in a story consisting of programs and the movie of a single title is completed by reproducing program chains consecutively. As shown in FIG. 11, each program 89 is defined as a set of aforementioned cells 84 arranged in the order in which they are to be reproduced.

Figures 12, 13, 14:
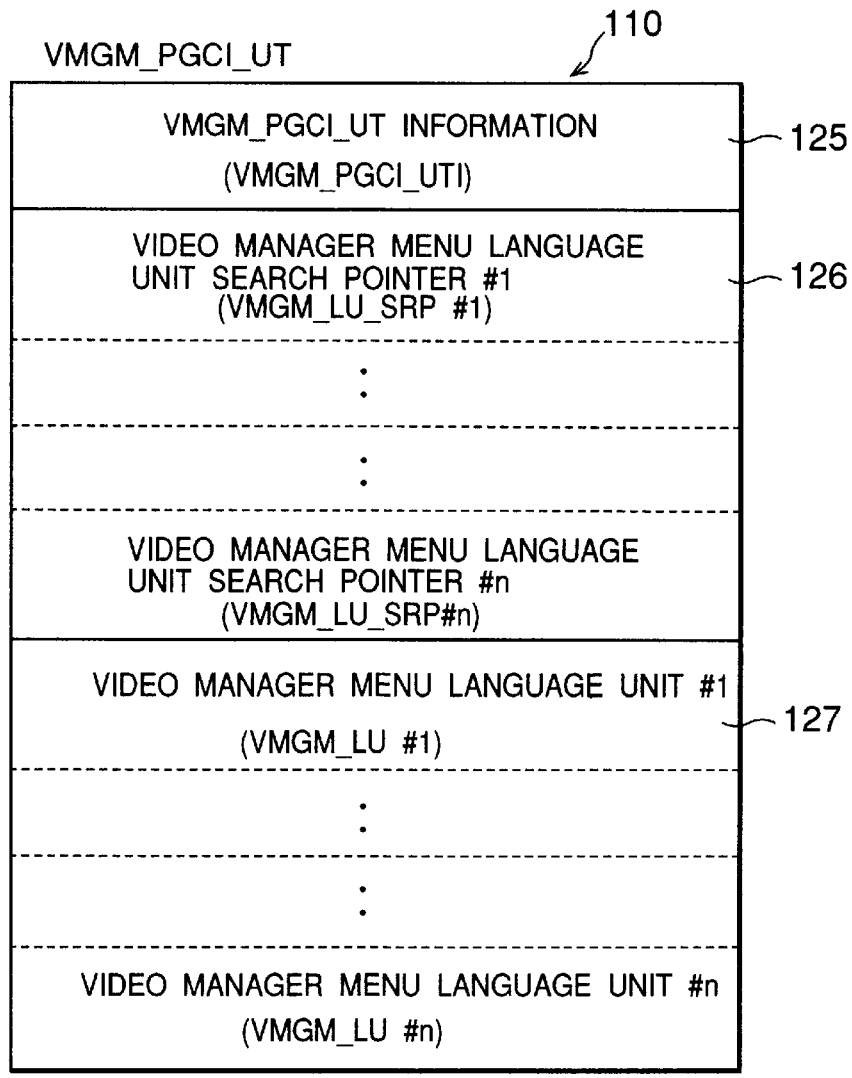
FIG. 12 shows a structure of a video manager menu PGCI unit table (VMGM_PGCI_UT) shown in FIG. 8.
FIG. 13 shows parameters and contents of VMGM_PGCI unit table information shown in FIG. 12.
FIG. 14 shows parameters and contents of a video manager menu language unit search pointer shown in FIG. 12.

In the video manager menu PGCI unit table (VMGM_PGCI_UT) 125 shown in FIG. 5, video manager menu PGCI unit table information (VMGM_PGCI_UTI) 180 is first described as shown in FIG. 12. Video manager menu language unit search pointers (VMGM_LU_SRP) 126 are successively described in the same numbers as the number n of languages. And the video manager menu language unit (VMGM_LU) 52 searched for by the search pointer is described. In this case, it is supposed that the menu defined by the video manager menu language unit (VMGM_LU) must contain only one PGC.

In the video manager menu PGCI unit table information (VMGM_PGCI_UTI) 110, the number (VMGM_LU_Ns) of VMGM language units (VMGM_LU) and the end address (VMGM_PGCI_UT_EA) of the VMGM_PGCI unit table (VMGM_PGCI_UT) 110 are described as shown in FIG. 13. In each of n video manager menu language unit search pointers (VMGM_LU_SRP) 126 prepared for respective languages, the language code (VMGM_LCD) of the video manager menu and the start address (VMGM_LU_SA) of the language unit (VMGM_LU) of the video manager menu (VMGM) are described as shown in FIG. 14. The end address (VMGM_PGCI_UT_EA) of the VMGM_PGCI_UT 110 and the start address (VMGM_LU_SA) of the VMGM_LU 127 are described by use of the logical block number from the head byte of the VMGM_PGCI unit table (VMGM_PGCI_UT) 110.

In each of n VMGM language units (VMGM_LU) 127 prepared for the respective languages, the video manager menu language unit information (VMGM_LUI) 130 and VMGM_PGCI search pointers (VMGM_PGCI_SRP) 131 of a number corresponding to the number of menu program chains are provided as shown in FIG. 37, and VMGM_PGC information items (VMGM_PGCI) 132 searched for by the search pointer and corresponding in number to the program chains for menu are provided.

Figures 15, 16, 17:
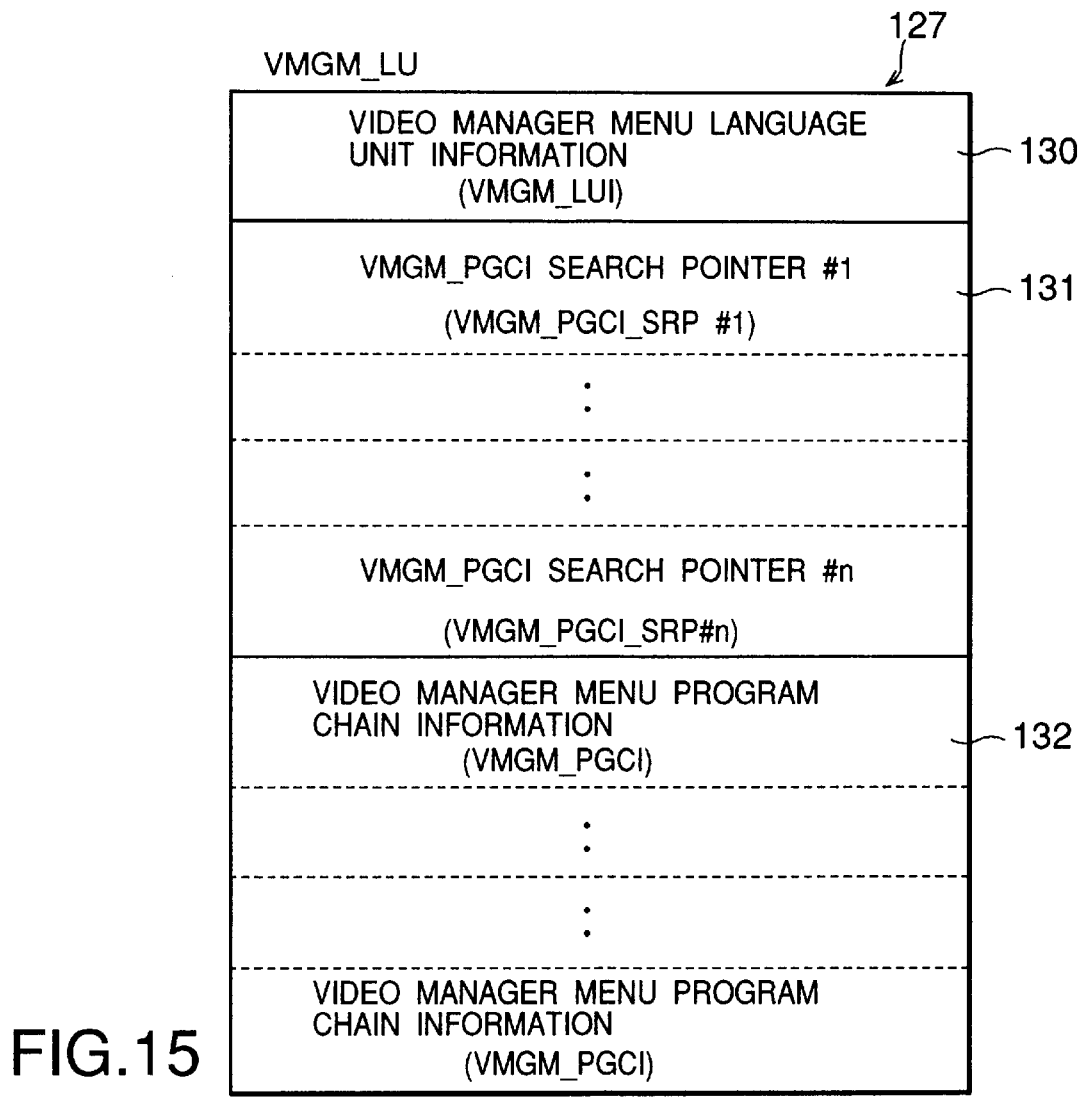
FIG. 15 shows a structure of a video manager menu language unit shown in FIG. 12.
FIG. 16 shows parameters and contents of video manager menu language unit information shown in FIG. 15.
FIG. 17 shows parameters and contents of video manager menu program chain information shown in FIG. 15.

In each language unit information (VMGM_LUI) 130, the number (VMGM_PGCI_SRP_Ns) of search pointers of VMGM_PGCI and the end address (VMGM_LUI_EA) of the language unit information (VMGM_LUI) are described as shown in FIG. 16. Further, in each VMGM_PGCI search pointer (VMGM_PGCI_SRP), the VMGM_PGC category (VMGM_PGC_CAT) and the start address (VMGM_PGCI_SA) of VMGM_PGCI are described as shown in FIG. 17. The end address (VMGM_LUI_EA) of VMGM_LUI and the start address (VMGM_PGCI_SA) of VMGM_PGCI are described by use of the relative logical block number from the head byte of VMGMLU. As the VMGM_PGC category (VMGM_PGC_CAT), information indicating that the program chain is an entry program chain or title menu is described.

Figures 18, 19, 20, 21:
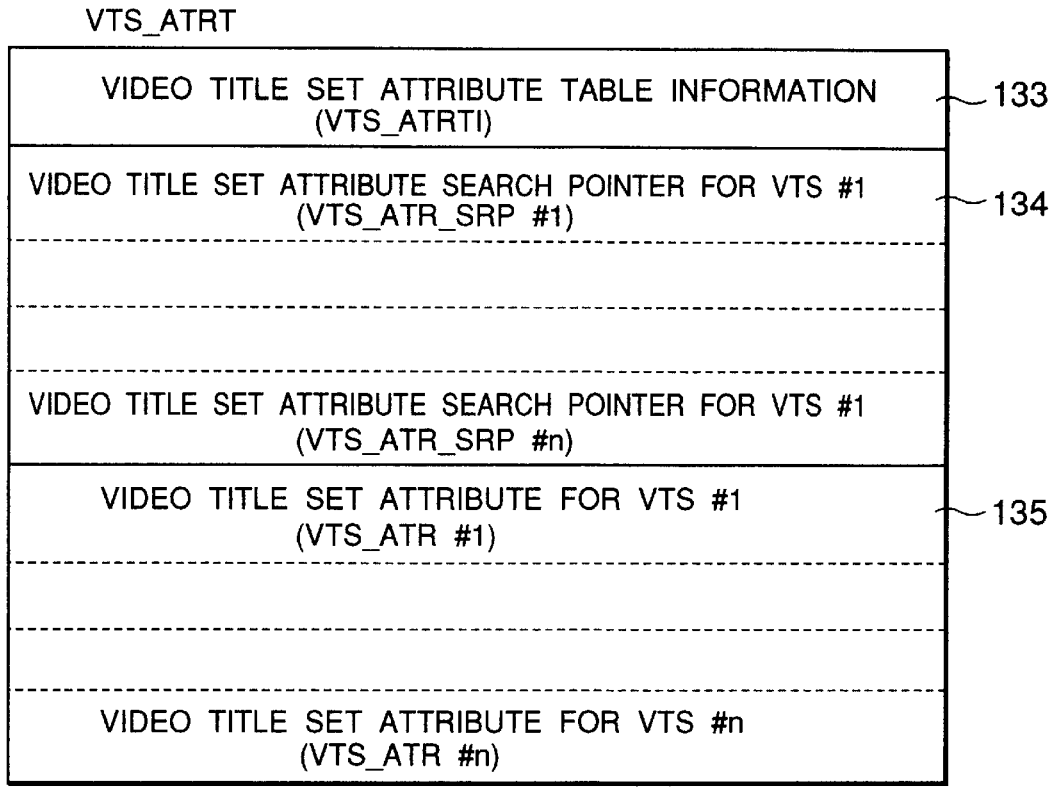
FIG. 18 shows a structure of a video title set attribute table shown in FIG. 5.
FIG. 19 shows parameters and contents of video title set attribute table information shown in FIG. 18.
FIG. 20 shows parameters and contents of a video title set attribute search pointer shown in FIG. 18.
FIG. 21 shows parameters and contents of video title set attribute shown in FIG. 18.

As shown in FIG. 18, the video title set attribute table (VTS_ATRT) 111 describing the attribute information on the video title set (VTS) 102 (shown in FIG. 4) contains video title set attribute table information (VTS_ATRTI) 133, n video title set attribute search pointers (VTS_ATR_SRP) 134, and n video title set attributes (VTS_ATR) 135, which are arranged in that order. The video title set attribute table information (VTS_ATRTI) 133 contains information on the table 111. In the video title set attribute search pointers (VTS_ATR_SRP) 134, description is made in the order corresponding to the title sets #1 to #n. Similarly, description is made of the pointers for searching for the video title set attributes (VTS_ATR) 135 written in the order corresponding to the title sets #1 to #n. Described in each of the video title set attributes (VTS_ATR) 135 is the attribute of the corresponding title set (VTS).

More specifically, the video title set attribute information (VTS_ATRTI) 133 contains a parameter (VTS_Ns) for the number of video titles and a parameter (VTS_ATRT_EA) for the end address of the video title set attribute table (VTS_ART) 135 as shown in FIG. 19. As shown in FIG. 20, in each video title set attribute search pointer (VTS_ATR_SRP) 134 there is described a parameter (VTS_ATR_SA) for the start address of the corresponding video title set attribute (VTS_ATR) 135. As shown in FIG. 21, the video title set attribute (VTS_ATR) 135 contains a parameter (VTS_ATR_EA) for the end address of the video title set attribute (VTS_ATR) 135, a parameter (VTS_CAT) for the category of the corresponding video title set, and a parameter (VTS_ATRI) for attribute information on the corresponding video title set. Because the attribute information on the video title set contains the same contents of the attribute information on the video title set described in the video title set information management table (VTS_MAT).

The structure of the logic format of the video title set (VTS) 102 shown in FIG. 5 will be explained with reference to FIG. 22. In each video title set (VTS) 102, four items 140, 141, 142 and 143 are described in the order shown in FIG. 22. Each video title set (VTS) 102 is made up of one or more video titles having common attributes. The video title set information (VTSI) contains the management information on the video titles 102, including information on playback of the video object set 142, information on playback of the title set menu (VTSM), and attribute information on the video object sets 102.

Each video title set (VTS) 102 includes the backup 143 of the video title set information (VTSI) 140.

Between the video title set information (VTSI) 140 and the backup (VTSI_BUP) 143 of the information, a video object set (VTSM_VOBS) 141 for video title set menus and a video object set (VTSTT_VOBS) 142 for video title set titles are arranged. Both video object sets (VTSM_VOBS and VTSTT_VOBS) 141 and 142 have the structure shown in FIG. 6, as explained earlier.

The video title set information (VTSI) 140, the backup (VTSI_BUP) 143 of the information , and the video object set (VTSTT_VOBS) 142 for video title set titles are items indispensable to the video title sets 102. The video object set (VTSM_VOBS) 141 for video title set menus is an option provided as the need arises.

Figure 22:
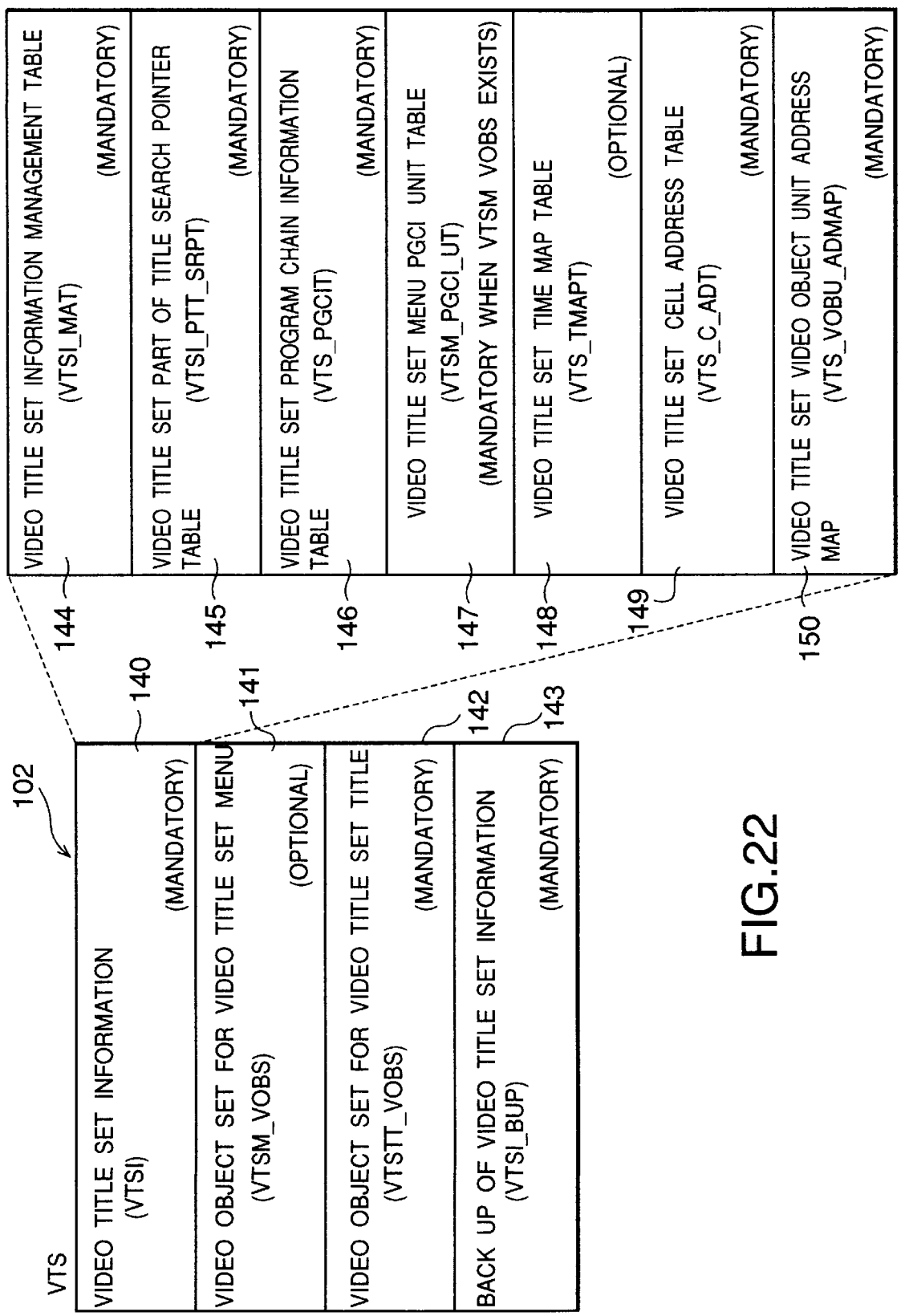
FIG. 22 shows a structure of a video title set shown in FIG. 4.

The video title set information (VTSI) 140 consists of seven tables 144, 145, 146, 147, 148, 149 and 150 as shown in FIG. 22. These seven tables 144, 145, 146, 147, 148, 149 and 150 are forced to align with the boundaries between logical sectors.

The video title set information management table (VTSI_MAT) 144, i.e., the first table, is a mandatory table. Described in the table 108 are the size of the video title set (VTS) 102, the start address of each piece of information in the video title set (VTS) 102, and the attributes of the video object sets (VOBS) 82 in the video title set (VTS) 102.

The video title set part-of-title search pointer table (VTS_PTT_SRPT) 145, which is the second table, is mandatory table. It is in this table that the selectable video titles, that is, program chain (PGC) or programs (PG) contained in the selectable video title set 102 are descried in accordance with the number that the user has entered from the key/display section 4. Entering the desired one of the entry numbers listed in the pamphlet coming with the optical disk 10 from the key/display section 4, the user can watch the video, starting with the section in the story corresponding to the entered number.

The video title set program chain information table (VTS_PGCIT) 146, which is the third table, is a mandatory table. Described in this table 146 is the VTS program chain information (VTS_PGCI) or information on VTS program chains.

The video title set menu PGCI unit table (VTSM_PGCI_UT) 147, which is the fourth table, is a mandatory item when the video object set (VTSM_VOBS) 141 for video title set menus is provided. Described in the table 147 are information on program chains for reproducing the video title set menu (VTSM) provided for each language. By referring to the video title set menu PGCI unit table (VTSM_PGCI_UT) 147, a program chain for the specified language in the video object set (VTSM_VOBS) 141 can be acquired and reproduced as a menu.

The video title set time search map table (VTS_MAPT) 148, which is the fifth table, is an optional table provided as the need arises. Described in the table 148 is information on the recording location of the video data in each program chain (PGC) in the title set 102 to which the map table (VTS_MAPT) belongs, for a specific period of time of display.

The video title set cell address table (VTS_C_ADT) 149, which is the sixth table, is a mandatory item. Described in the table 149 are the addresses of each cell 84 constituting all the video objects 83 or the addresses of cell pieces constituting cells in the order the identification numbers of the video objects 83 are arranged. Here, a cell piece is a piece constituting a cell. Cells undergo an interleaving process in cell pieces and are arranged in a video object 83.

The video object title set video object unit address map (VTS_VOBU_ADMAP) 150, which is the seventh table, is a mandatory item. Described in the table 150 are the start addresses of all the video object units 85 in the video title set are described in the order of arrangement.

The video title information management table (VTSI_MAT) 144, video title set part-of-title search pointer table (VTS_PTT_SRPT) 145, video title set program chain information table (VTS_PGCIT) 146 and video title set menu PGCI unit table (VTSMPGCI_UT) 147, all shown in FIG. 22, will be described with reference to FIG. 23 to 44.

FIG. 23 shows the contents of the video title information manager table (VTSI_MAT) 144, in which the video title set identifier (VTS_ID), end addresses (VTS_EA, VTSI_EA) of the video title set 102 and the video title set information, respectively, the version number (VERN) of the DVD video specification, the category (VTS_CAT) of the video title set 102, and the end address (VTSI_MAT_EA) of the video title information manager table (VTSI_MAT) 144 are described in that order.

Furthermore, described in the table (VTSI_MAT) 144 are the start address (VTSM_VOBS_SA) of the video object set (VTSM_VOBS) 141 for the VTS menu (VTSM) and the start address (VTSTT_VOB_SA) of the video object for the title in the video title set (VTS). If the video object set (VTSM_BOBS) 141 for the VTS menu (VTSM) is absent, "00000000h" will be described in the start address (VTSM_VOBS_SA). The end address (VTSI_MAT_EA) of VTSI_MAT is expressed by the number of logical blocks, relative to the first byte in the video title set information management table (VTSI_MAT) 144. The start address (VTSTM_VOB_SA) of VTSM_VOBS and the start address (VTSTT_VOB_SA) of VTSTT_VOB are expressed by logical blocks (RLBN) relative to the head logical block in the video title set (VTS) 102.

In the table (VTSI_MAT) 144, the start address (VTS_PTT_SRPT_SA) of the video title set information part-of-title search pointer table (VTS_PTT_SRPT) 145 is represented by the number of blocks, relative to the head logical block in the video title set information (VTSI) 140. Furthermore, in the table (VTSI_MAT) 144, the start address (VTS_PGCIT_SA) of the video title set program chain information table (VTS_PGCIT) 146 and the start address (VTS_PGCI_UT_SA) of the PGCI unit table (VTS_PGCI_UT) 147 of video title set menus represented by the number of blocks, relative to the head logical lock in the video title set information (VTSI) 140, nd the start address (VTS_MAPT_SA) of the time search ap table (VTS_MAPT) 148 in the video title set (VTS) is described in logical sectors which follows the first logical sector in the video title set (VTS) 102. Similarly, the VTS address table (VTS_C_ADT) 149 and the address map (VTS_VOBU_ADMAP) 150 for VTS_VOBU are described in logical sectors which follows the head logical sector in the video title set (VTS) 102.

Described in the table (VTSI_MAT) 144 are the video attribute (VTSM_V_ATR) of the video object set (VTSM_VOBS) 141 for the video title set menu (VTSM) in the video title set (VTS) 102, the number of audio streams (VTSM_AST_Ns), the attributes (VTSM_AST_ATR) of the audio streams, the number of sub-picture streams (VTSM_SPST_Ns), and the attributes (VTSM_SPST_ATR) of the sub-picture streams. Similarly, further described in the table (VTSI_MAT) 144 are the video attribute (VTS_V_ATR) of the video object set (VTSM_VOBS) 142 for the video title set (VTSTT) for the video title set (VTS) in the video title set (VTS) 102, the number of audio streams (VTS_AST_Ns), the attributes (VTS_AST_ATR) of the audio streams, the number of sub-picture streams (VTS_SPST_Ns), and the attributes (VTS_SPST_ATR) of the sub-picture streams. Also described in this table (VTSI_MAT) 144 are the attribute (VTS_MU_AST_ATR) of the multi-channel audio stream in the video title set (VTS).

At most eight audio streams are provided, and at most 32 sub-picture streams are provided. Attribute is described in each of these streams. In the sub-picture stream attribute (VTS_SPST_ATR) it is described whether the sub-picture is a language or not.

Figures 24, 25, 26, 27:
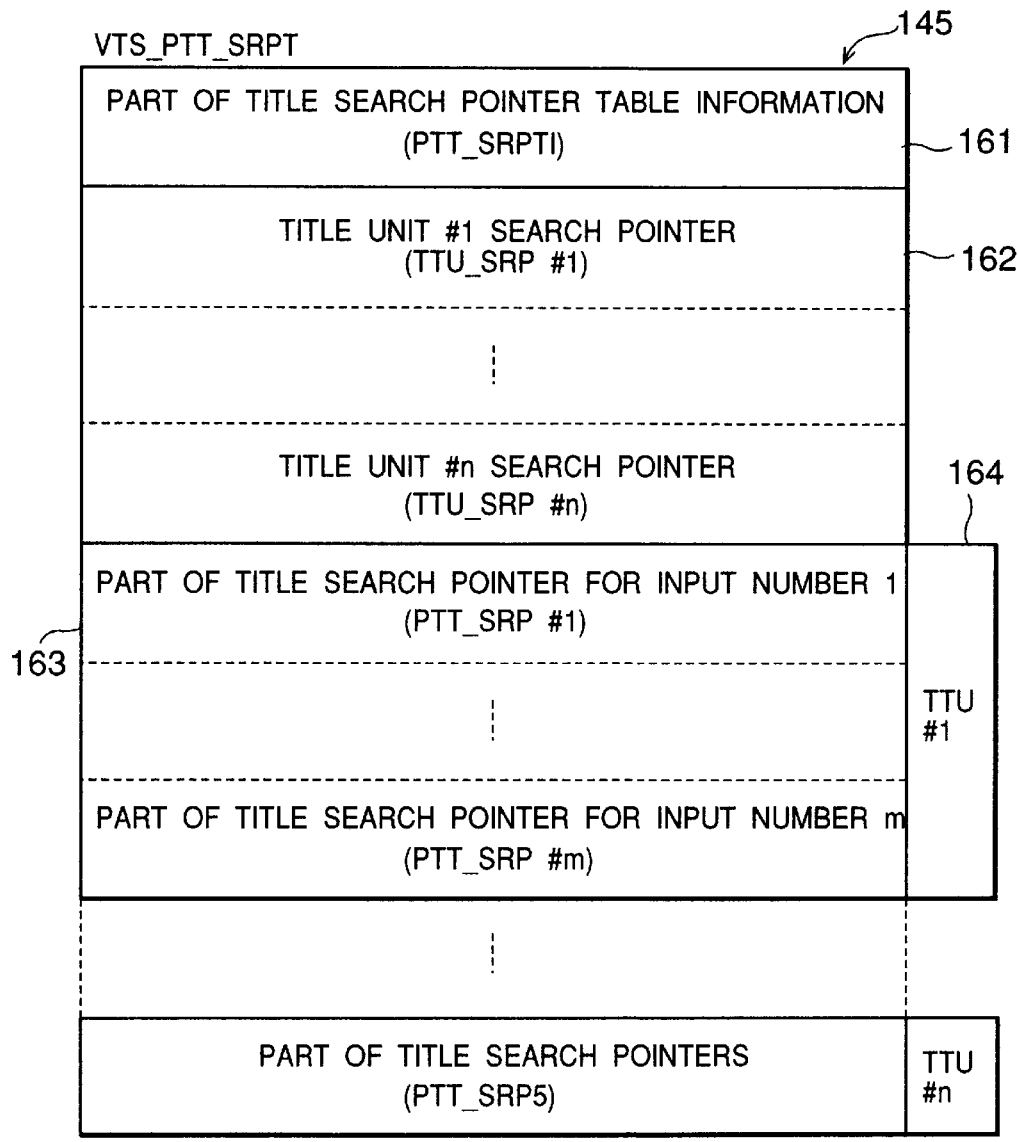
FIG. 24 shows a structure of a video title set part of title search pointer table (VTS_PTT_SRPT) shown in FIG. 22.
FIG. 25 shows parameters and contents of part of title search pointer information (PTT_SRPTI) shown in FIG. 24.
FIG. 26 shows parameters and contents of a title unit search pointer (TTU_SRP) shown in FIG. 24.
FIG. 27 shows parameters and contents of a part of title search pointer (PTT_SRP) shown in FIG. 24.

The video title set part-of-title search pointer table (VTS_PTT_SRPT) 145 shown in FIG. 22 has the structure shown in FIG. 24. As seen from FIG. 24, the table 145 has three items. Described in the first item is part-of-title search pointer table information (PTT_SRPTI) 161. Described in the second item are n search pointers (TTU_SRP#n) 162 for title units #n. Described in the third item are m part-of-title search pointers (PTT_SRP#m) 163 for m input numbers #m, for every title unit #n (TTU#n) 164. In the part-of-title search pointer table information (PTT_SRPTI) 161, there are described the number (VTS_TTU_Ns) of title search pointers in the video title set (VTS) and the end address (VTS_PTT_SRPT_EA) of the table (VTS_PTT_SRPT) 145, as is illustrated in FIG. 25. The maximum number of title search pointers which can be described is 99. The end address (VTS_PTT_SRPT_EA) is described as the number of relative logical blocks, relative to the head byte of the table VTS_PTT_SRPT. Described in the title unit #n search pointer (TTU_SRP#n)162 is a start address (TTU_SA) of the title unit (TTU) which is collection of the title search pointer #m (PTT_SRP#m), as shown in FIG. 26. The start address (TTU_SA), which corresponds to the start address of the first title search pointer #1 table (PTT_SRPT) 163, is also described as the number of relative logical blocks, relative to the head byte of the VTS_PTT_SRPT. Described in the title search pointer (PTT_SRP#m) 163 are the program chain number (PGC_N) and program number PG_N which are designated by the title search pointer #m (PTT_SRP#m), as is illustrated in FIG. 27.

Figure 28:
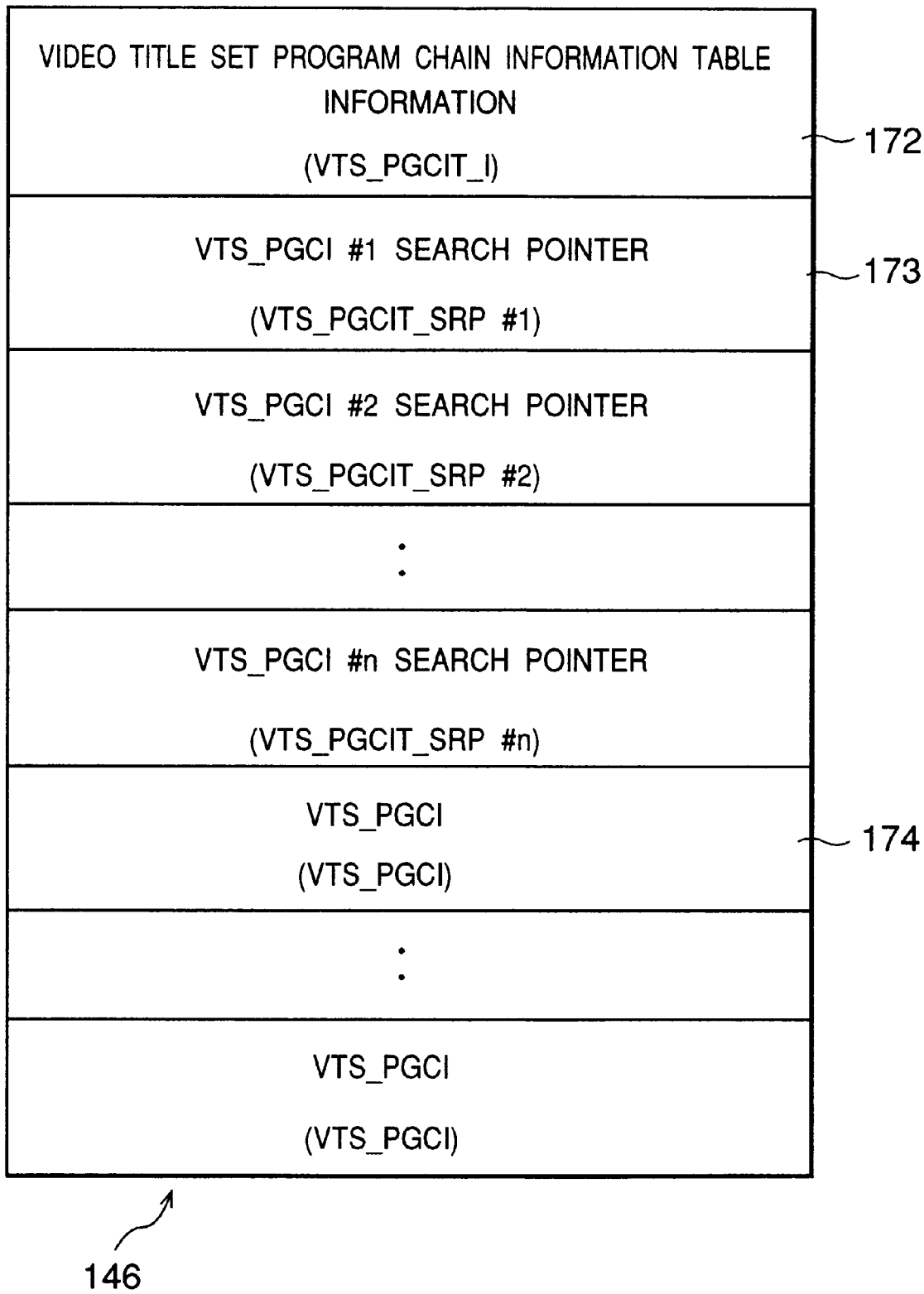
FIG. 28 shows a structure of a table (VTS_PGCIT) of video title set program chain information shown in FIG. 22.

The VTS program chain information table (VTS_PGCIT) 146 of FIG. 22 has a structure as shown in FIG. 28. In the information table (VTS_PGCIT) 146 there is described information on the VTS program chains (VTS_PGC). The first item of this information is information (VTS_PGCIT_I) 172 on the information table (VTS_PGCIT) 146 of VTS program chains (VTS_PGC). In the information table (VTS_PGCIT) 146, the information (VTS_PGCIT_I) 172 is followed by as many VTS_PGCI search pointers (VTS_PGCIT_SRP) used to search for VTS program chains (VTS_PGC) as the number (from #1 to #n) of VTS program chains in the information table (VTS_PGCIT) 146. At the end of the table, there are provided as many pieces of information (VTS_PGCI) 174 on the respective VTS program chains (VTS_PGC) as the number (from #1 to #n) of VTS program chains (VTS_PGC).

Figures 29, 30, 31:
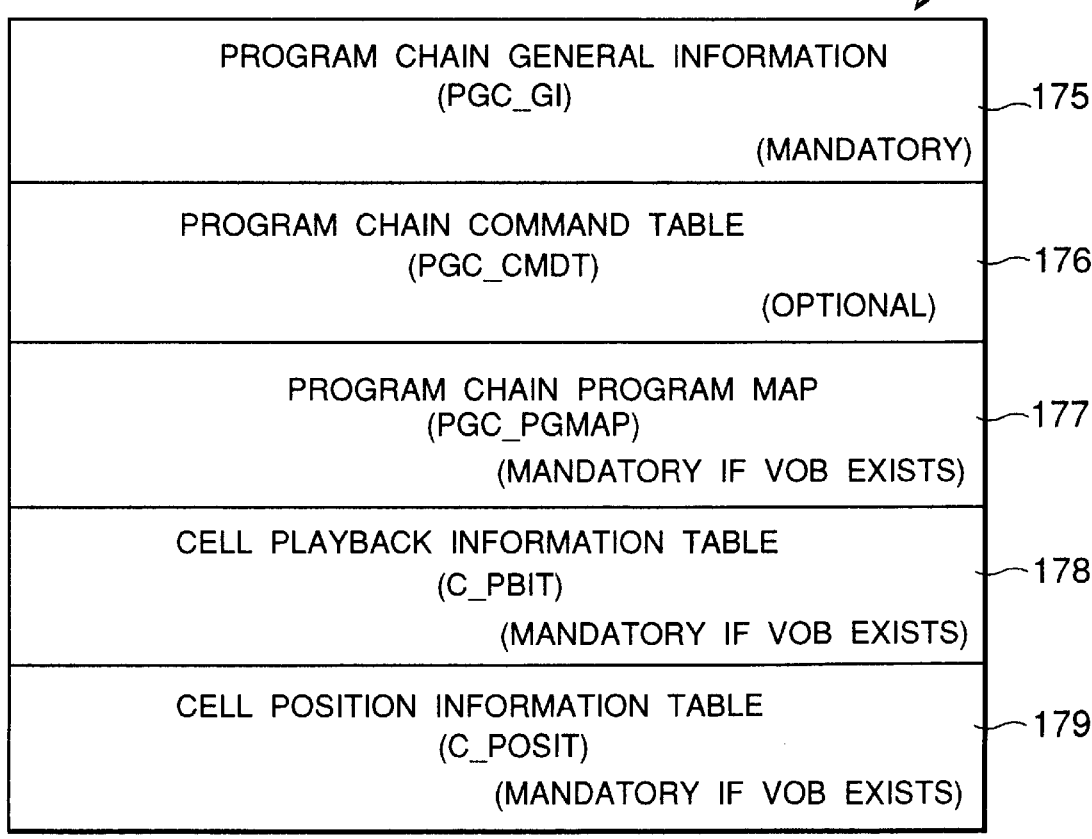
FIG. 29 shows parameters and contents of information (VTS_PGCITI) of a table (VTS_PGCIT) of video title set program chain information shown in FIG. 28.
FIG. 30 shows parameters and contents of a search pointer (VTS_PGCIT_SRP) of the table (VTS_PGCIT) of the video title set program chain information shown in FIG. 28.
FIG. 31 shows a structure of program chain information (VTS_PGCI) for video title set corresponding to the program chain of video title set program chain information (VTS_PGCI) shown in FIG. 28.

The information (VTS_PGCIT_I) 172 in the VTS program chain information table (VTS_PGCIT) 146, as shown in FIG. 29, contains the number (VTS_PGC_Ns) of VTS program chains (VTS_PGC) and the end address (VTS_PGCIT_EA) of the table information (VTS_PGCIT_I) 172 expressed by the number of bytes, relative to the first byte of the information table (VTS_PGCIT) 146.

Furthermore, as shown in FIG. 30, the VTS_PGCIT search pointer (VTS_PGCIT_SRP) 103 contains the attributes (VTS_PGC_CAT) of the program chains (VTS_PGC) in the video title set (VTS) 172 and the start address (VTS_PGCI_SA) of the VTS_PGC information (VTS_PGCI) expressed by the number of bytes, relative to the first byte of the VTS_PGC information table (VTS_PGCIT) 146. Here, the VTS_PGC attribute (VTS_PGC_CAT) contains, for example, an attribute indicating whether an entry program chain (Entry PGC) is the first one to be reproduced. Usually, an entry program chain (PGC) is described before program chains (PGC) that are not entry program chains (PGC).

As shown in FIG. 31, five items are described in the PGC information (VTS_PGCI) 174 for one PGC. The first item is a program chain general information (PGC_GI) 175. The second item is a program chain navigation command Table (PGC_CMDT) 176. The third, fourth and fifth mandatory items 178, 178 and 179 are described if a video object exists following to navigation command table (PGC_NV_CMDT). The third item is a program chain program map (PGC_PGMAP) 177, the fourth item is a cell playback information table (C_PBIT) 178, and the fifth item is a cell position information table (C_POSIT) 179.

As shown in FIG. 32, the contents (PGC_CNT) of the program chain (PGC), and a PGC playback time (PGC_PB_TM) are described in the program chain general information (PGC_GI) 175.

The contents (PGC_CNT) of PGC contain the description of the program chain structure, that is, the number of programs, the number of cells, etc. The playback time (PGC_PB_TIME) of PGC contains the total playback time of the programs in the PGC. The playback time is the time required to continuously playback the programs in the PGC, regardless of the playback procedure.

Further described in the program chain general information (PGC_GI) 175 are, as shown in FIG. 32, PGC user operation control (PGC_UOP_CTL), PGC sub-picture stream control (PGC_SPST_CTL), PGC audio stream control (PGC_AST_CTL), and PGC navigation control (PGC_NV_CTL). In the PGC user operation control (PGC_UOP_CTL), there is described a user operation which is prohibited during the reproduction of the PGC. Using the described contents of PGC navigation controls, PCGs are played back successively. This user operation is calling of a menu, changing of a sub-picture or an audio stream, or the like. Described in the PGC sub-picture stream number which can be used in the PGC, and similarly, described in the PGC audio stream control (PGC_AST_CTC) is audio stream number which can be used in the PGC.

Further described in the program chain general information (PGC_GI) 175 are PGC sub-picture palette (PGC_SP_PLT), the start address (PGC_NV_CMDT_SA) of PGC navigation command table (PGC_NV_CMDT) 176, the start address (PGC_PGMAP_SA) of PGC program map (PGC_PGMAP) 177, the start address (C_PBIT_SA) of the cell information table (C_PBIT) 178, and the start address (C_POSIT_SA) of cell position information table (C_POSIT) 179. Described in the PGC sub-picture palette (PGC_SP_PLT) are 16 color palettes for all sub-pictures of the PGC. The start addresses of the PGC_NV command table (PGC_NV_CMDT) 176, PGC program map (PGC_PGMAP) 177 and cell position information table (C_POSIT) 179 are described in the form of the numbers of logical blocks, relative to the head byte of the PGC. If neither the cell playback information table (C_PBIT) 178 nor the cell position information table (C_POSIT) 179 exists, zeroes (0s) will be described in their start addresses.

The program chain program map (PGC_PGMAP) 177 of the PGC information (VTS_PGCI) 174 shown in FIG. 31 is a map representing the structure of the program in the PGC, as can be understood from FIG. 33. Described in the map (PGC_PGMAP) 177 are the entry cell numbers (ECELLN), the start cell numbers of the individual programs, in ascending order as shown in FIG. 34. In addition, program numbers are allocated, starting at 1, in the order in which the entry cell numbers are described. Consequently, the first entry number in the map (PGC_PGMAP) 177 must be #1.

The cell playback information table (C_PBIT) 178 defines the order in which the cells in the PGC are played back. In the cell playback information table (C_PBIT) 178 there are described pieces of the cell playback information (C_PBIT) consecutively as shown in FIG. 35. Basically, cells are played back in the order of cell number. The cell playback information (C_PBIT) contains a cell category (C_CAT) as playback information (P_PBI) as shown in FIG. 36. Written in the cell category (C_CAT) are a cell block mode indicating whether the cell is one in the block and if it is, whether the cell is the first one, a cell block type indicating whether the cell is not part of the block or is one in an angle block, an STC discontinuity flag indicating whether the system time clock (STC) must be set again, a cell playback mode, a cell navigation control and an inter-cell command number. Here, a cell block is defined as a set of cells with a specific angle. The change of the angle is realized by changing the cell block. Taking baseball for example, the changing from an angle block of shooting scenes from the infield to an angle block of shooting scenes from the outfield corresponds to the change of the angle.

As shown in FIG. 36, the playback information (P_PBI) of the cell playback information table (C_PBIT) 178 contains the cell playback time (C_PBTM) representing the total playback time of the PGC. When the PGC has an angle cell block, the playback time of the angle cell number 1 represents the playback time of the angle block. Also described in the cell playback information table (C_PBIT) 178 are the start address (C_FVOBU_SA) of the first video object unit (VOBU) 85 in the cell expressed by the number of logical blocks, relative to the first logical block in the video object unit (VOBU) 85 in which the cell is recorded and the start address (C_LVOBU_SA) and end address (C_LVOBU_EA) of the end video object unit (VOBU) 85 in the cell expressed by the number of logical blocks, relative to the first logical block in the video object unit (VOBU) 85 in which the cell is recorded.

The cell position information table (C_POSI) 179 specifies the identification numbers (VOB_ID) of the video objects (VOB) in the cell used in the PGC and the cell identification number (C_ID). In the cell position information table (C_POSI), pieces of cell position information (C_POSI) corresponding to the cell numbers written in the cell playback information table (C_PBIT) 178 as shown in FIG. 37 are described in the same order as in the cell playback information table (C_PBIT). The cell position information (C_POSI) contains the identification numbers (C_VOB_IDN) of the video object units (VOBU) 85 in the cell and the cell identification number (C_IDN) as shown in FIG. 38.

Further, the structure of the video title set PGCI unit table (VTSM_PGCI_UT) 147 shown in FIG. 22 will be explained with reference to FIGS. 37 to 44. The video title set PGCI unit table (VTSM_PGCI_UT) 147 has substantially the same structure as the VMGM_PGCI unit table 110 shown in FIG. 12. That is, in the VMGM_PGCI unit table (VTSM_PGCI_UT) 147, VTS menu PGCI unit table information (VTSM_PGCI_UTI) 180 is first described as shown in FIG. 39, then VTS menu language unit search pointers (VMGM_LU_SRP) 181 of a necessary number n corresponding to the number n of languages are successively described, and the VTS menu language unit (VTSM_LU) 182 searched for by the search pointer is described.

Figures 39, 40, 41:
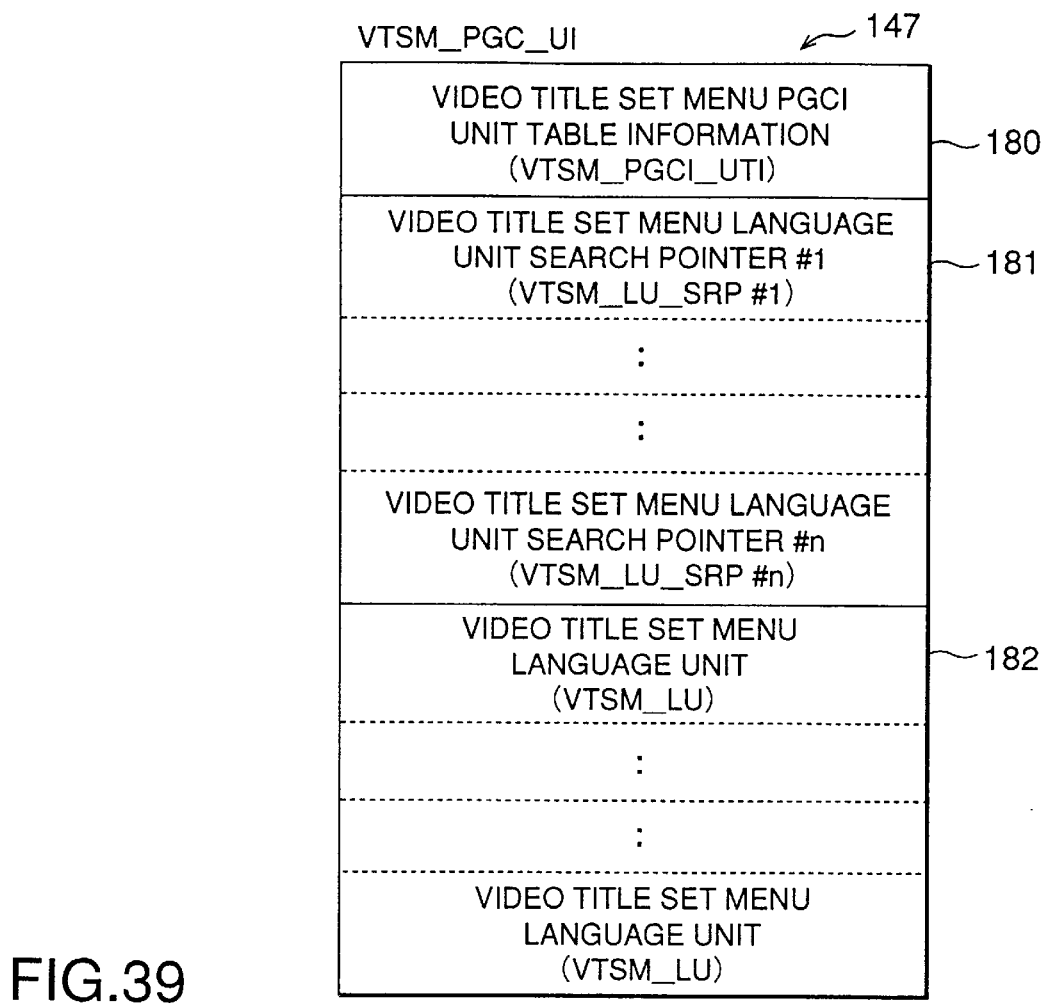
FIG. 39 shows a structure of a video title set menu PGC unit table shown in FIG. 22.
FIG. 40 shows parameters and contents of video title set PGCI unit table information shown in FIG. 39.
FIG. 41 shows parameters and contents of a video title set language search pointer shown in FIG. 39.

In the VTS menu PGCI unit table information (VTSM_PGCI_UTI) 180, the number (VTSM_LU_Ns) of VTSM language units (VTSM_LU) and the end address (VTSM_PGCI_UT_EA) of the VTSM_PGCI unit table (VMGM_PGCI_UT) 147 are described as shown in FIG. 40. In each of n video manager menu language unit search pointers (VTSM_LU_SRP) 181 prepared for respective languages, the language code (VTSM_LCD) of the VTS menu and the start address (VTSM_LU_SA) of the VTS menu (VTSM) language unit (VTSM_LU) 182 are described as shown in FIG. 41. The end address (VTSM_PGCI_UT_EA) of VTSM_PGCI_UT 110 and the start address (VTSM_LU_SA) of VTSM_LU 352 are described by use of the logical block number from the first block of the VTSM_PGCI unit table (VTSM_PGCI_UT) 147.

Figures 42, 43, 44:
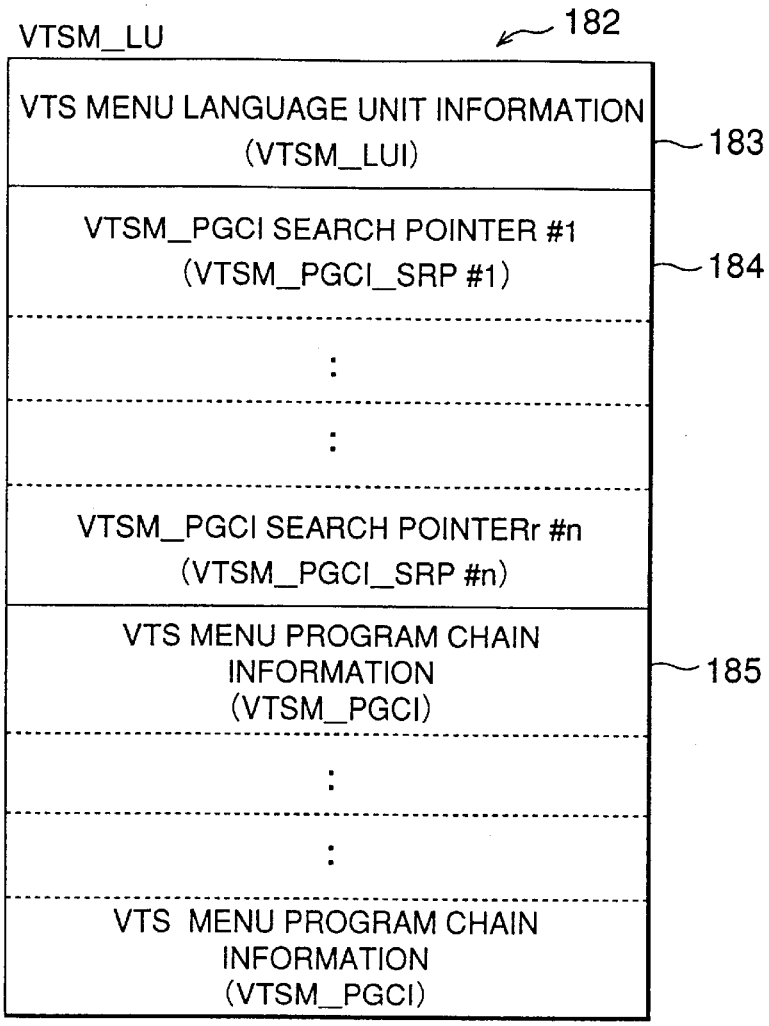
FIG. 42 shows a structure of a video title set menu language unit shown in FIG. 39.
FIG. 43 shows parameters and contents of video title set menu language unit information shown in FIG. 42.
FIG. 44 shows parameters and contents of a video title set PGCI search pointer shown in FIG. 42.

In each of n VTSM language units (VTSM_LU) 182 prepared for respective languages, VTSM menu language unit information (VTSM_LUI) 183 and VTSM_PGCI search pointers (VTSM_PGCI_SRP) 184 of a number corresponding to the number of menu program chains are provided as shown in FIG. 42, and VTSM_PGC information items (VTSM_PGCI) 185 searched for by the search pointers and corresponding in number to the menu program chains are provided as shown in FIG. 42.

In each language unit information (VTSM_LUI) 183, the number (VMGM_PGCI_Ns) of VMGM_PGCIs and the end address (VTSM_LUI_EA) of the language unit information (VTSM_LUI) are described as shown in FIG. 43. Further, in the VTSM_PGCI search pointer (VTSM_PGCI_SRP), the VTSM_PGC category (VTSM_PGC_CAT) and the start address (VTSM_PGCI_SA) of VTSM_PGCI are described as shown in FIG. 44. The end address (VTSM_LUI_EA) of VTSM_LUI and the start address (VTSM_PGCI_SA) of VTSM_PGCI are described by the number of logical blocks, relative to the head byte of VTSM_LU. As the VTSM_PGC category (VTSM_PGC_CAT), information indicating that the program chain is an entry program chain or title menu is described.

Figure 45:
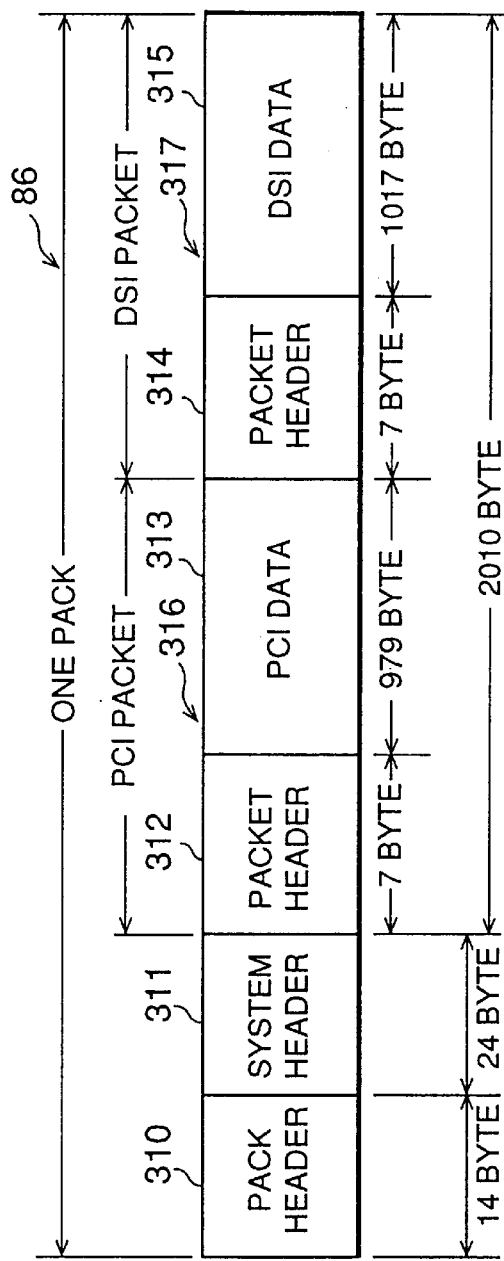
FIG. 45 shows a structure of a navigation pack shown in FIG. 6.

As explained with reference to FIG. 6, a cell 84 is a set of video object units (VOBU) 85. A video object unit (VOBU) 85 is defined as a pack train starting with a navigation (NV) pack 86. Therefore, the start address (C_FVOBU_SA) of the first video object unit (VOBU) 85 in a cell 84 is the start address of the NV pack 86. As shown in FIG. 45, the NV pack consists of a pack header 310, a system header 311, and two packets of navigation data—a presentation control information (PCI) packet 316 and a data search information (DSI) packet 317. As many bytes as shown in FIG. 45 are allocated to the respective sections so that one pack may contain 2048 bytes corresponding to one logical sector. The NV pack is placed immediately in front of the video pack containing the first data item in the group of pictures (GOP). Even when the object unit 85 contains no video pack, an NV pack is placed at the head of the object unit containing audio packs or/and sub-picture packs. As with an object unit containing object units, even with an object unit containing no video pack, the playback time of the object unit is determined on the basis of the unit in which video is reproduced.

Here, GOP is determined in the MPEG standard and is defined as a data train constituting a plurality of screens as explained earlier. Specifically, GOP corresponds to compressed data. Expanding the compressed data enables the reproduction of a plurality of frames of image data to reproduce moving pictures. The pack header 310 and system header 311 are defined in the MPEG 2 system layer. The pack header 310 contains a pack start code, a system clock reference (SCR), and a multiplex rate. The system header 311 contains a bit rate and a stream ID. The packet header 312, 314 of each of the PCI packet 316 and DSI packet 317 contains a packet start code, a packet length, and a stream ID as determined in the MPEG2 system layer.

Figure 46:
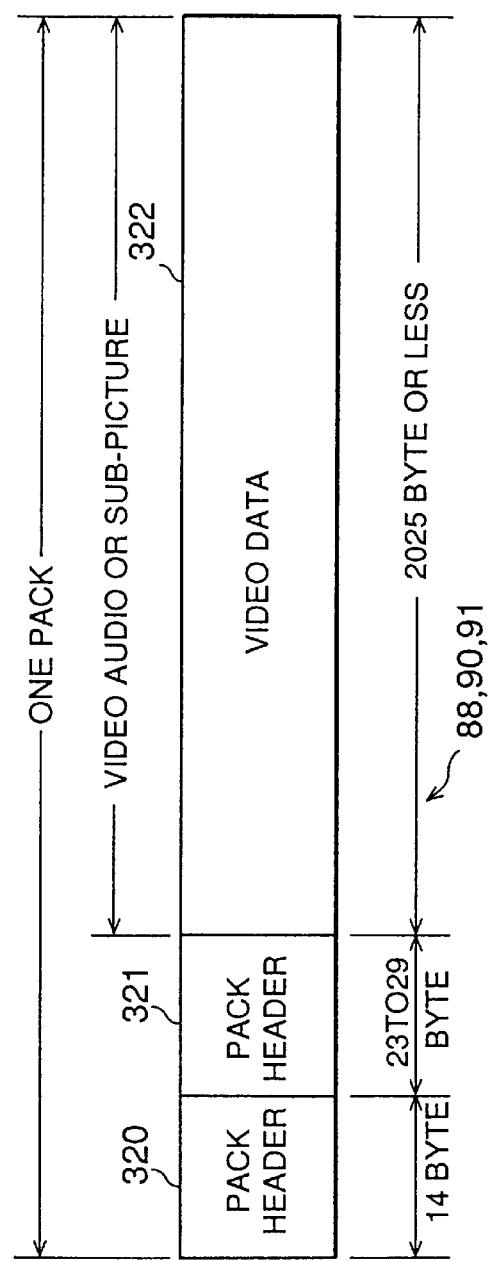
FIG. 46 shows a structure of a video, audio or sub-picture pack shown in FIG. 6.

As shown in FIG. 46, another video, audio, or sub-picture pack 88, 89, 80 and 291 consists of a pack header 320, packet header 321, and a packet 322 containing the corresponding data as determined in the MPEG2 system layer. Its pack length is determined to be 2048 bytes. Each of these packs is aligned with the boundaries between logical blocks.

The PCI data (PCI) 313 in the PCI packet 316 is navigation data used to make a presentation, or to change the contents of the display, in synchronization with the playback of the video data in the VOB unit (VOBU) 85. Specifically, as shown in FIG. 47, the PCI data (PCI) 313 contains PCI general information (PCI_GI) as information on the entire PCI and angle information (NSMLS_ANGLI) as each piece of jump destination angle information in angle change. The PCI general information (PCI_GI) contains the address (NV_PCK_LBN) of the NV pack (NV_PCK) 86 in which the PCI 113 is recorded as shown in FIG. 48. The address is expressed in the number of blocks, relative to the logical sector of VOBU 85 in which the PCI 313 is recorded. The PCI general information (PCI_GI) contains the category (VOBU_CAT) of VOBU 85, the start playback time (VOBU_S_PTM) of VOBU, and the end playback time (VOBU_EPTM) of VOBU. Here, the start PTS (VOBU_SPTS) of VOBU 85 indicates the playback start time (start presentation time) of the video data in the VOBU 85 containing the PCI 313. The playback start time is the first playback start time in the VOBU 85. Normally, the first picture corresponds to I picture (intra-picture) data in the MPEG standard. The end PTS (VOBU_EPTS) in the VOBU 85 indicates the playback end time (end presentation time) of the VOBU 85 containing the PCI 313. There is described in the PCI general information (PCI_GI), end PTM of sequence end in VOBU (VOBU_SE_E_PM) and cell elapse time (C_ELTM).

DSI data (DSI) 315 in the DSI packet 317 shown in FIG. 45 is navigation data used to search for the VOB unit (VOBU) 85. Described in the DSI data (DSI) 315 are DSI general information (DSI_JGI), seamless information (SML_PBI), angle information (SML_AGLI), VOBU unit search information (VOBU_SRI), and synchronizing playback information (SYNCI), as shown in FIG. 49.

The DSI information (DSI_GI) contains information about the entire DSI 315. Specifically, as shown in FIG. 50, the DSI general information (DSI_GI) contains the system clock reference (NV_PCK_SCR) for the NV pack 86. The system clock reference (NV_PCK_SCR) is stored in the system time clock (STC) built in each section of FIG. 1. On the basis of the STC, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NV_PCK) 86 containing the DSI 315 expressed by the number of logical sectors (RLSN), relative to the first logical sector in the VOB set (VOBS) 82 containing the DSI 315, and the address (VOBU_EA) of the last pack in the VOB unit (VOBU) 85 containing the DSI 315 expressed by the number of logical sectors (RLSN), relative to the first logical sector in the VOB unit (VOBU).

Furthermore, the DSI general information (DSI_GI) contains the end address (VOBU_IP_EA) of the V pack (V_PCK) 88 containing the last address of the first I picture in the VOBU expressed by the number of logical sectors (RLSN), relative to the first logical sector in the VOB unit (VOBU) containing the DSI 315, and the identification number (VOBU_IP_IDN) of the VOBU 83 containing the DSI 315 and the identification number (VOBU_C_IDN) of the cell in which the DSI 315 is recorded.

The VOBU search information (VOBU_SRI) of the DSI contains the addresses of a specified number of navigation packs. Video fast-forward etc. are effected, referring to the addresses. The synchronizing information (SYNCI) includes address information on the sub-pictures and audio data reproduced in synchronization with the playback start time of the video data in the VOB unit (VOBU) containing DSI 315. Specifically, as shown in FIG. 51, the start address (A_SYNCA) of the target audio pack (A_PCK) 91 is expressed by the number of logical sectors (RLSN), relative to the NV pack (NV_PCK) 86 in which DSI 315 is recorded. When there are more than one audio stream (8 audio streams, at most), as many pieces of synchronizing information (SYNCI) as audio streams are described. Furthermore, the synchronizing information (SYNCI) includes the address (SP_SYNCA) of the NV pack (NV_PCK) 86 of the VOB unit (VOBU) 85 containing the target audio pack (SP_PCK) 91. The address is expressed by the number of logical sectors (RLSN), relative to the NV pack (NV_PCK) 86 in which DSI 315 is recorded. When more than one sub-picture stream (32 sub-picture streams, at most) exist, there described as many pieces of synchronizing information (SYNCI) as sub-picture streams.

Figure 52:
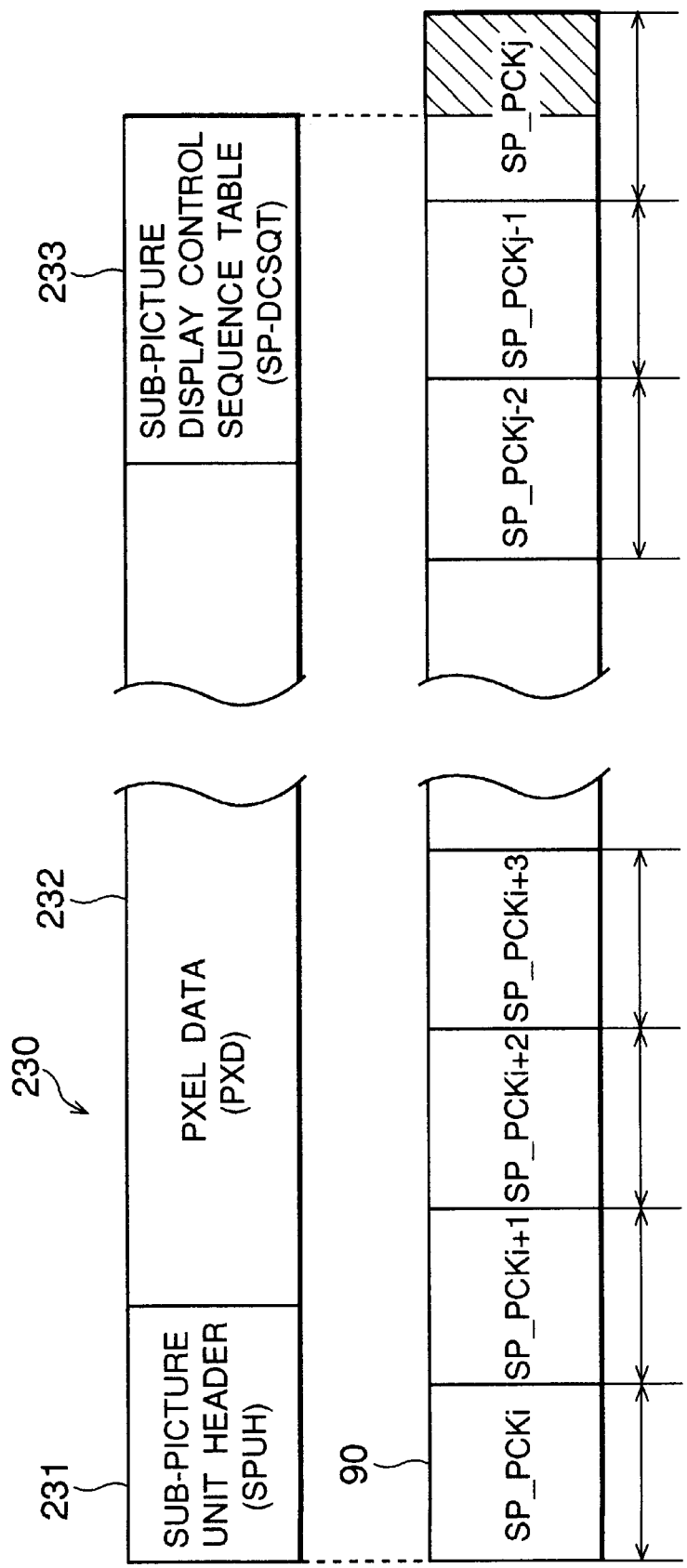
FIG. 52 shows the relationship between a sub-picture pack and the sub-picture data unit (SPU) shown in FIG. 6.

As described above with reference to FIG. 6, video data is compressed and stored in the video pack 88, while audio data is compressed or not compressed before it is stored in the audio pack 91. Similarly, sub-picture data is usually run-length-compressed and stored in the sub-picture data pack 90. The packs 88, 90 and 91 are, as a pack sequence, sequentially supplied to the video decoder 58, the audio decoder 60 and the sub-picture decoder 62 shown in FIG. 1. The sub-picture pack sequence is decoded by the sub-picture decoder 62 in units of sub-picture unit SPU which is an aggregate of integer number of sub-picture packs. That is, sub-picture data is formed into a unit such that a sub-picture data unit 230 has a structure as shown in FIG. 52. A sub-picture unit header (SPUH) 231 is provided for the leading end of the sub-picture data unit 230. Pixel data (PXD) 232 corresponding to an actual sub-picture image is provided to follow unit data 231. Moreover, a display control sequence table (SP_DCSQT) 233 is provided to follow pixel data 232. The sub-picture data units 232 are run-length-compressed or not compressed before they are stored in integer number of sub-picture packs #i to #j90, as shown in FIG. 52. Although each of the sub-picture packs #i to #j90 has a length of 2048 bytes as shown in FIG. 52, the sub-picture pack #j90 is adjusted to have 2048 bytes if the length of the sub-picture pack #j90 forming the trailing end of the sub-picture data unit 230 is shorter than 2048 bytes. The length of the pack is adjusted such that a stuffing byte is inserted into the packet header 321 if the number of data items to be adjusted is 1 to 7 bytes and a padding packet is added to the sub-picture data packet 322 if the number of data items is 8 bytes or larger.

Figure 53:
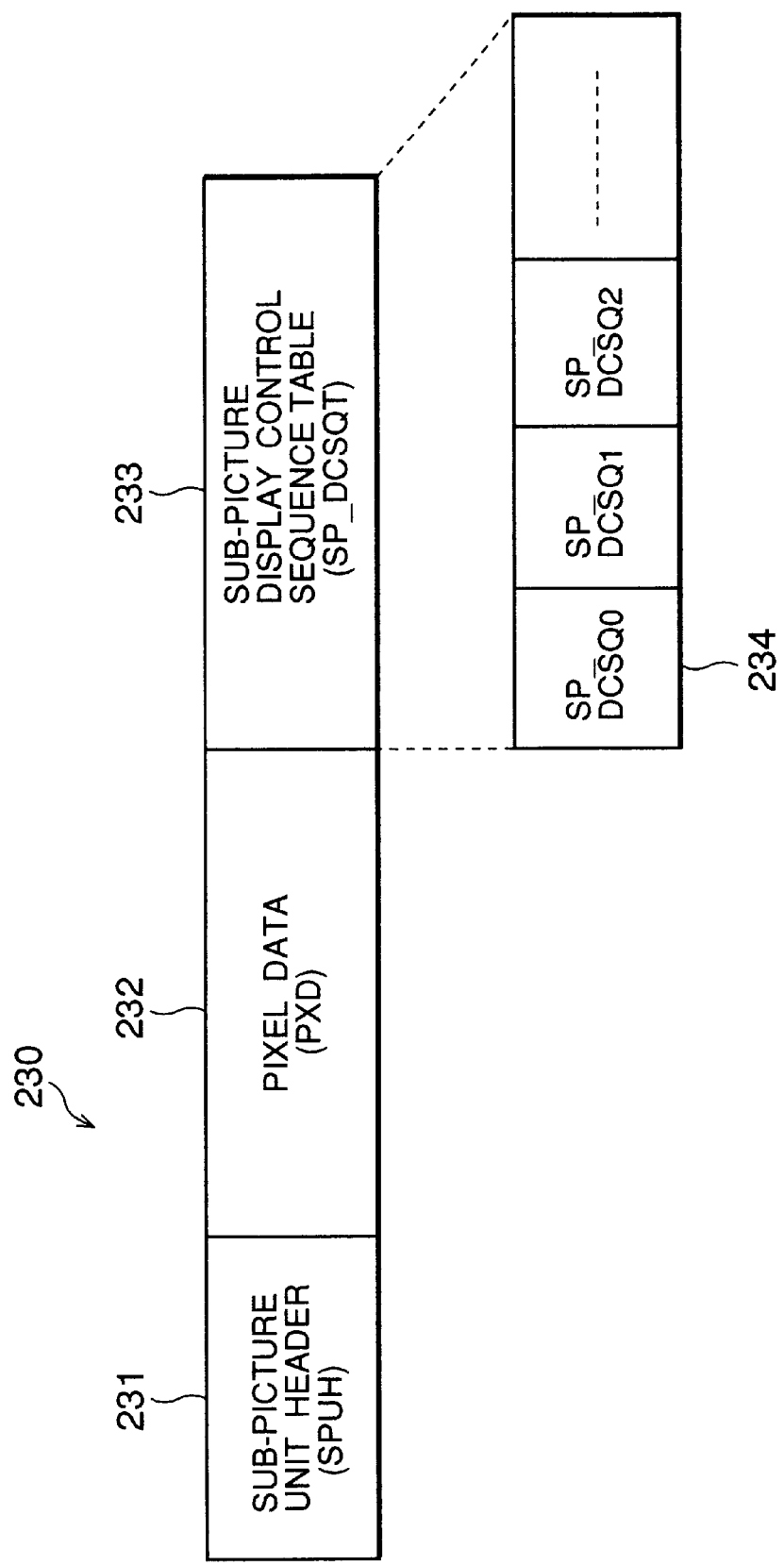
FIG. 53 shows the structure of data in the sub-picture data unit (SPU) shown in FIG. 52.

The sub-picture unit header (SPUH) 230 shown in FIG. 53 has the size (SPDSZ) of the sub-picture unit and start address (SPDCSQTA) of the display control sequence table (SP_DCSQT) described therein, as shown in FIG. 54. As shown in FIG. 53, the display control sequence table (SP_DCSQT) includes 0-th to n-th display control sequences (SP_DCSQ) 234. Each display control sequence (SP_DCSQ) 234 has contents relating to display control of pixel data. That is, as shown in FIG. 55, the display control sequence (SP_DCSQ) 234 has start time (SP_DCSQ_STM) of the display control sequence (SP_DCSQ) 234, address (SP_NXT_DCSQ_SA) of the next display control sequence (SP_DCSQ) 234 and display sequence command (SP_DCCMDn) described therein.

Execution start time of SP_DCSQ is, in the start time (SP_DCSQ_STM) of SP_DCSQ, described as relative display time (PTM) from presentation time stamp (PTS) described in the sub-picture pack. Zero is described in the start time (SP_DCSQ_STM) of first SP_DCSQ. Next start address continued from the leading byte of the sub-picture unit as the number of relative bytes is described in the address (SP_NXT_DCSQ_SA) of SP_DCSQ.

The display sequence command (SP_DCCMD), as shown in FIG. 56, has nine commands. That is, a first command is a command (FSTA_DSP) for setting the start timing of forcible display of pixel data regardless of whether the sub-picture is displayed or not displayed. A second command is a command (STA_DSP) for starting display of the updated sub-picture unit. A third command is a command (STP_DSP) for stopping display of the sub-picture unit. The sub-picture is again displayed when command STA_DSP is again executed even if STP_DSP is executed and thus it is stopped. A fourth command is a command (SET_COLOR) for setting the color of each pixel of pixel data. The command (SET_COLOR) contains the code of a color pallet. A fifth command is a command (SET_CONTR) for setting the mixture ratio of the main image and pixel data. The command (SET_CONTR) has the contrast of each pixel described therein. If the command (SET_CONTR) is not included in the display control sequence (SP_DCSQ) of the sub-picture unit, the mixture ratio set for the previous sub-picture unit is maintained. A sixth command is a command (SET_DAREA) for setting the display region for pixel data. A seventh command is command (SET_DSPXA) for setting the address of pixel data for use in the display. The address is described as the number of relative bytes from the leading byte of the sub-picture unit. An eighth command is a command (CHG_COLCON) for setting change of the color and contrast of pixel data. A ninth command (CMD_END) is a command for completing display control command.

Figure 57:
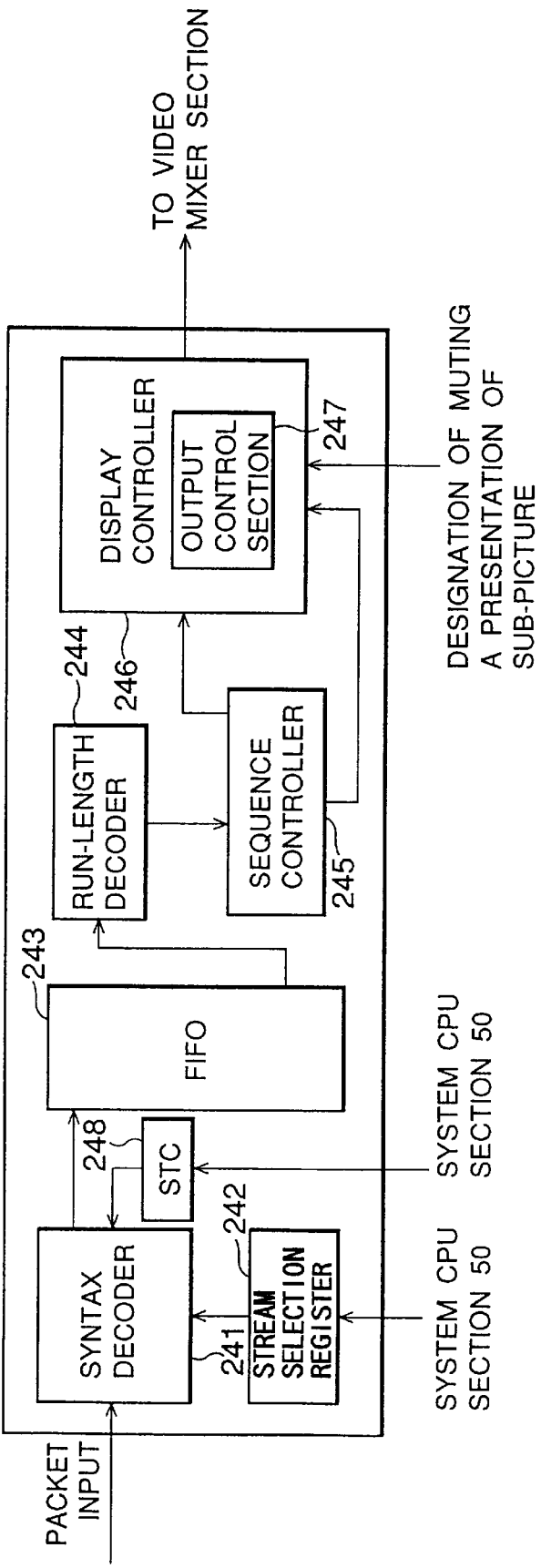
FIG. 57 is a block diagram showing the structure of a circuit in the sub-picture decoder 62 shown in FIG. 1.

The sub-picture decoder 62 shown in FIG. 1 includes a circuit shown in FIG. 57 for processing the sub-picture data unit 230. That is, the sub-picture decoder 62 has a syntax decoder 241 to which sub-picture data packets 322, from which a pack header 320 and a packet header 321 are removed from each sub-picture pack 90 in the previous circuit, are sequentially supplied. The syntax decoder 241 is controlled with STC (system time clock) 248 set by a system CPU 50 and a stream selection register 242. That is, a reference is made to SCR to be described in the pack header 320 by the system CPU 50 so that the STC (system time clock) 248 is set. Moreover, ID of the sub-picture stream is set to the stream selection register 242. Therefore, if PTS (presentation time stamp) described in the sub-picture data packet 322 coincides with the time of the STC 248, only the sub-picture packet 322 forming the sub-picture stream corresponding to the set ID is selected to be output to a FIFO 243 so as to be processed in the following circuit. That is, the sub-picture packet 322 output from the FIFO 243 is suspended from the run-length compression by the run-length decoder 244, namely, expanded so as to be output to a sequence controller 245. In the sequence controller 245, the unit header 231 of the sub-picture data unit 230 is acquired so that the display control sequence table (SP_DCSQT) 233 is acquired. In accordance with the display control sequence (DCSQ) 234 described in the table 233, the command is decoded and the command is supplied to an output controller 247 in the display controller 246. Expanded pixel data 232 (PXD) is supplied from the sequence controller 245, the pixel data 232 (PXD) being used such that a sub-picture signal is supplied from the display controller 246 to a video mixer (not shown) in accordance with an output control state set to an output controller 247 by the system CPU 50 or an output control state set with a command supplied from the sequence controller 245 to the output controller 247. The video mixer is supplied with a video signal obtained by decoding the video pack 88 from the video decoder 58. The sub-picture signal is mixed with the foregoing video signal so as to be supplied to a monitor 6.

Hereinafter, the operation of reproducing the movie data from the optical disk 10 with the logic format shown in FIGS. 4 to 56 will be explained with reference to FIG. 1. In FIG. 1, the solid-line arrows indicate data buses and the broken-line arrows represent control buses.

Figure 58:
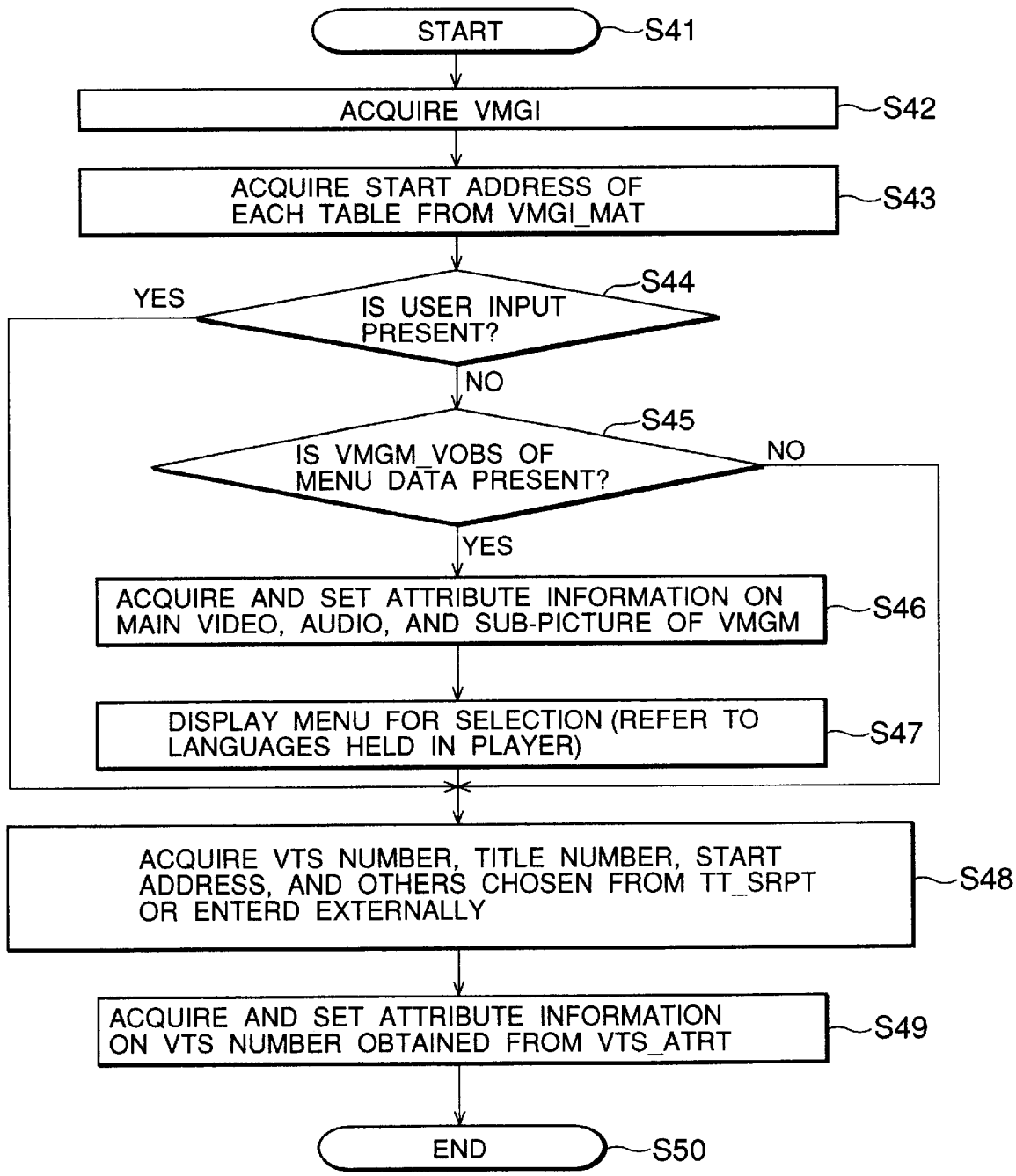
FIG. 58 shows an operation flow from the start of the operation of the apparatus to the acquisition of the video title set.

To begin with, the operation of acquiring the video title set (VTS) 102 by the use of the video manager (VMG) 101 will be explained by reference to FIG. 58. With the optical disk apparatus of FIG. 1, when the power supply is turned on and an optical disk 10 is loaded, the system CPU section 50 reads the initial operation program from the system ROM/RAM section 52 and operates the disk drive section 30, which then starts a search operation as shown in step S41. Namely, the disk drive section 30 starts to read the data from the lead-in area 27 and then from the adjoining volume and file structure area 100, in which a volume structure and a file structure are determined in accordance with ISO-9660. Specifically, to read the data from the volume and file structure area 100 located in a specific position on the optical disk 10 set in the disk drive section 30, the system CPU section 50 gives a read instruction to the disk drive section 30 to read the contents of the volume and file structure area 100, and stores the data temporarily in the data RAM section 56 via the system processor section 54. The system CPU section 50 extracts information about the recording position and recording size of each file and management information necessary for other managing actions via the path table and directory record stored in the data RAM section 56, and transfers and stores these pieces of information in specific locations in the system ROM/RAM section 52.

Then, as shown in step S42, the system CPU section 50 acquires a video manager (VMG) 101 composed of files, starting with file number 0, by reference to the information about the recording position and recording capacity of each file in the system ROM/RAM section 52. Specifically, referring to the recording position and recording capacity of each file acquired from the system ROM/RAM section 52, the system CPU section 50 gives a read instruction to the disk drive section 30, acquires the positions and sizes of a plurality of files constituting the video manager 101 existing on the root directory, reads the video manager (VMG) 101, and stores it in the data RAM section 56 via the system processor section 54. Thereafter, the system CPU section 50 in the video manager (VMG) 101 stored in the data RAM section 56, as shown in step S43, acquires the start addresses of the individual tables (TT_SRPT, VMGM_PGCI_UT, VTS_ART) written in the video management information table (VMGI_MAT) 108, thereby enabling the acquisition of each table. Here, when the user looks at a title brochure in which titles have been written, gets a number specifying a video title set, and enters the number directly from the key/display section 4 as shown in step S44, control will be passed to step S48. When there is no input entered by the user from the key/display section 4, it will be confirmed as shown in step S45 whether or not a VMGM video object set (VMGM_VOBS) 106 is present as menu data in the video management information table (VMGI_MAT) 108. If there is no VMGM video object set (VMGM_VOBS) 106, the user may enter a video title set or a predetermined video title set may be selected, and control will be passed to step S48.

If a VMGM video object set (VMGM_VOBS) 106 is present, the video attribute information (VMGM_V_ATR) on VMGM and the attribute information (VMGM_AST_ATR, VMGM_SPST_ATR) on audio and sub-picture streams will be acquired from the video management information table (VMGI_MAT) 108. Thereafter, as shown in step S47, a menu will be displayed as shown in step S47, which will be explained in detail later by reference to FIG. 59. According to the menu representation, the user selects the video title set (VTS) 102 from the key/display section 4. Once the video title set (VTS) 102 has been selected, the video title set number (VTSN) corresponding to the selected video title set, title number (VTS_TTN), and the start address (VTS_SA) of the video title set are acquired from the title search pointer table (TT_SRPT) 109 in the video manager (VMG) 101. Furthermore, the system CPU 50 obtains attribute information (VTS_V_ATR, VTS_AST_ATR, VTS_SPST) of the acquired video title set number (VTSN) from the video title set attribute table (VTS_ATRT) 111. On the basis of these pieces of attribute information (VTS_V_ATR, VTS_AST_ATR, VTS_SPST), the parameters necessary for playback of the video manager menu are set in the video decoder section 58, audio decoder section 60, and sub-picture decoder section 62, respectively. Furthermore, according to the pieces of attribute information, the video processing section 201, audio processing section 202, audio mixing section 203, and sub-picture processing section 207 in the D/A and data-reproducing section 64 are set. By the above series of procedures, the preparation to acquire the video title set 106 has been completed as shown in step S50.

Figure 59:
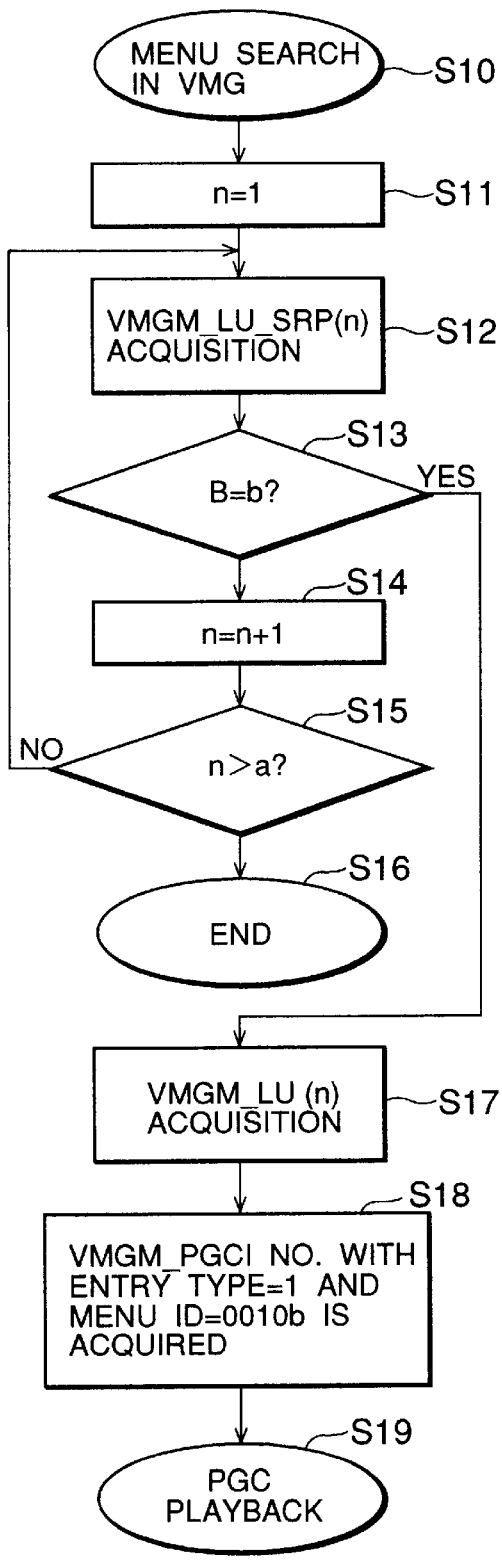
FIG. 59 is a flow chart illustrating a video manager menu search operation.

Now, the operation going on as far as the video manager menu for choosing a video title is displayed will be described by reference to FIG. 59. When the menu search process is started as shown in step S10, the volume manager information management table (VMGI_MAT) 108, the first table in the video manager 101, will be searched. By the searching operation, the start address (VMGM_PGCI_UT_SA) of the VMGM_PGCI unit table (VMGM_PGCI_UT) 110 for the video manager menu (VMGM) is acquired. Then, the VMGM_PGCI unit table 110 is acquired. From the table information (VMGM_PGCI_UTI) in the table (VMGM_PGCI_UT) 110, the number (a) of language units (VMGM_LU_Ns) on the video manager menu is acquired. Then, as shown in step S11, the acquisition of the search pointer (VMGM_LU_SRP) of the first #1 (n=1) VMGM_LU is determined. The search pointer (VMGM_LU_SRP) of the VMGM_LU is acquired as shown in step S12. Then, as shown in step S13, it is determined whether the language code (=b) (VMGM_LCD) written in the search pointer (VMGM_LU_SRP) of VMGM_LU coincides with the language code (=B) specified in the reproducing apparatus, or the default language code. If the language codes do not coincide with each other, the number of the search pointer will be incremented (n=n+1) as shown in step S14 and it will be determined whether the incremented number n has exceeded the number (a) of language units (VMGM_LU_Ns) in the video manager menu. If the number n has been set equal to or larger than the number (a) of language units (VMGM_LU_Ns) in the video manager menu, the searching operation for the video manager menu (VMGM) will be terminated as shown in step S16. If the number n is smaller than the number (a) of language units (VMGM_LU_Ns) in the video manager menu, control will be returned to step S13, where the n-th search pointer (VMGM_LU_SRP) of VMGM_LU will be acquired and step S13 to step S15 will be executed again.

If in step S13, the language code (=b) (VMGM_LCD) written in the search pointer (VMGM_LU_SRP) of VMGM_LU coincides with the language code (=B) specified in the reproducing apparatus, or the default language code, the VMGM language unit (VMGM_LU) 127 corresponding to the language code written in the search pointer (VMGM_LU_SRP) of VMGM_LU will be acquired as shown in step S17. The number (VMGM_PGCI_Ns) of VMGM_PGCI is extracted from the VMGM language unit information (VMGM_LUI). Next, as shown in step S18, the VMGM_PGC category (VMGM_PGC_CAT) is acquired from the VMGM_PGCI search pointer (VMGM_PGCI_SRP) 131. Thus, the VMGM_PGC number corresponding to the menu ID (="0010") as well as to the entry type (=1) is acquired from the VMGM_PGC category (VMGM_PGC_CAT). Here, the menu ID (="0010") corresponds to the VMGM title menu. The start address (VMGM_PGC_SA) of the VMGM_PGC corresponding to the acquired VMGM_PGC number is obtained from the VMGM_PGCI search pointer (VMGM_PGCI_SRP) and as shown in step S19, the relevant PGC is acquired from the VMGM video object set (VMGM_VOBS) 106, thereby reproducing the PGC.

As a result, the VMG menu is displayed. For example, titles of movie series appear. When the first title set is chosen, the title set corresponding to the first one is acquired as follows.

The start address (VTS_SA) of the video title set 102 is acquired from the title search pointer 121 having the entry number #1 shown in FIG. 8. Then, the video title set information (VTSI) 140 on the title set shown in FIG. 22 is obtained. From the management table (VTSI_MAT) 144 of the video title set information (VTSI) 140, the end address (VTSI_MAT_EA) of the video title set information management table (VTSI_MAT) 144 shown in FIG. 23 is acquired. Furthermore, on the basis of the number of audio streams and the number of sub-picture streams (VTS_AST_Ns, VTS_SPST_Ns) and the attribute information (VTS_V_ATR, VTS_A_ATR, VTS_SPST_ATR) on the audio and video data, each section of the reproducing apparatus of FIG. 1 is set. Specifically, according to the attribute information, the audio processing section 202, audio mixing section 203, and sub-picture reproducing section 207 in the D/A and reproducing section 64 are set.

Figure 60:
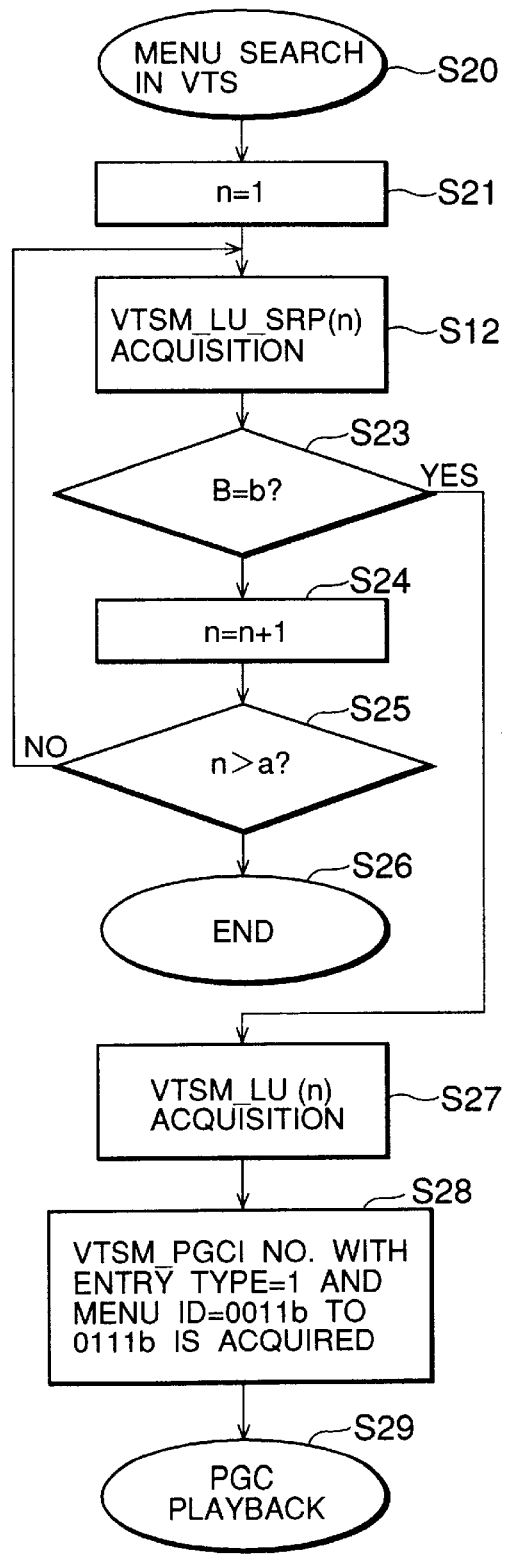
FIG. 60 is a flow chart illustrating a video title set menu search operation.

When the video title set menu (VTSM) is present, the video title set menu will be displayed according to the flow shown in FIG. 60. Specifically, when the menu search process is started as shown in step S20, this enables the start address (VTSM_PGCI_UT_SA) of the VTSM_PGCI unit table (VTS_PGCI_UT) 146 for the video title set menu (VTSM) to be acquired from the video title set information management table (VTSI_MAT) 144. Then, the VTSM_PGCI unit table 146 is acquired. From the table information (VTSM_PGCI_UTI) 146, the number (a) of language units (VTSM_LU_Ns) on the video title menu is acquired. Then, as shown in step S21, the acquisition of the search pointer (VTSM_LU_SRP) 181 of the first #1 (n=1) VTSM_LU is determined. The search pointer (VTSM_LU_SRP) 181 of the VTSM_LU 182 is acquired as shown in step S22. Then, as shown in step S23, it is determined whether the language code (=b) (VTSM_LCD) written in the search pointer (VTSM_LU_SRP) 181 of VTSM_LU 182 coincides with the language code (=B) specified in the reproducing apparatus, or the default language code. If the language codes do not coincide with each other, the number of the search pointer will be incremented (n=n+1) as shown in step S24 and it will be determined whether the incremented number n has exceeded the number (a) of language units (VTSM_LU_Ns) in the video title set menu. If the number n has been set equal to or larger than the number (a) of language units (VTSM_LU_Ns) in the video title set menu, the searching operation for the video title set menu (VTSM) will be terminated as shown in step S26. If the number n is smaller than the number (a) of language units (VTSM_LU_Ns) in the video title set menu, control will be returned to step S22, where the n-th search pointer (VTSM_LU_SRP) 181 of VTSM_LU will be acquired and step S23 to step S25 will be executed again.

If in step S23, the language code (=b) (VTSM_LCD) written in the search pointer (VTSM_LU_SRP) 181 of VTSM_LU coincides with the language code (=B) specified in the reproducing apparatus, or the default language code, the VTSM language unit (VTSM_LU) 182 corresponding to the language code written in the search pointer (VTSM_LU_SRP) 181 of VTSM_LU will be acquired as shown in step S27. The number (VTSM_PGCI_Ns) of VTSM_PGCI is extracted from the VTSM language unit information (VTSM_LUI). Next, as shown in step S28, the VTSM_PGC category (VTSM_PGC_CAT) is acquired from the VTSM_PGCI search pointer (VTSM_PGCI_SRP) 184. Thus, the VTSM_PGC number corresponding to the menu ID (="0011" to "0111") as well as to the entry type (=1) is acquired from the VTSM_PGC category (VTSM_PGC_CAT). Here, the menu ID (="0011" to "0111") corresponds to the VTSM audio menu for selecting an audio language or VTSM program menu for selecting a program or the other menu. The start address (VTSM_PGC_SA) of the VTSM_PGC corresponding to the acquired VTSM_PGC number is obtained from the VTSM_PGCI search pointer (VTSM_PGCI_SRP) and as shown in step S29, the relevant PGC is acquired from the VTSM video object set (VTSM_VOBS) 141, thereby reproducing the PGC. Thus, the VTS menu is displayed. Once the user has chosen a part of the title from the menu by pressing the corresponding key on the key/display section 4, for example, the language selection menu, a submenu, appears. Specifically, since 32 sub-picture streams have been prepared as sub-pictures as explained earlier, the movie suppliers can display one of, for example, English, Japanese, German, and French sub-pictures. Furthermore, a menu that allows selection of one from eight audio streams can be prepared as another submenu. This makes it possible to choose any one of audio streams associated with dubbing. Selecting a choice from the menu causes the program chain corresponding to the choice to be reproduced.

When the menu (VTSM) for video title sets (VTS) has a simple structure, the start address (VTSM_VOB_SA) of the video object set (VTSM_VOB) 141 for video title set menus may be acquired from the video title set information management table (VTSI_MAT) 144 of FIG. 34 and the menu for video title sets may be displayed according to the video object set (VTSM_VOB) 141.

Figure 61:
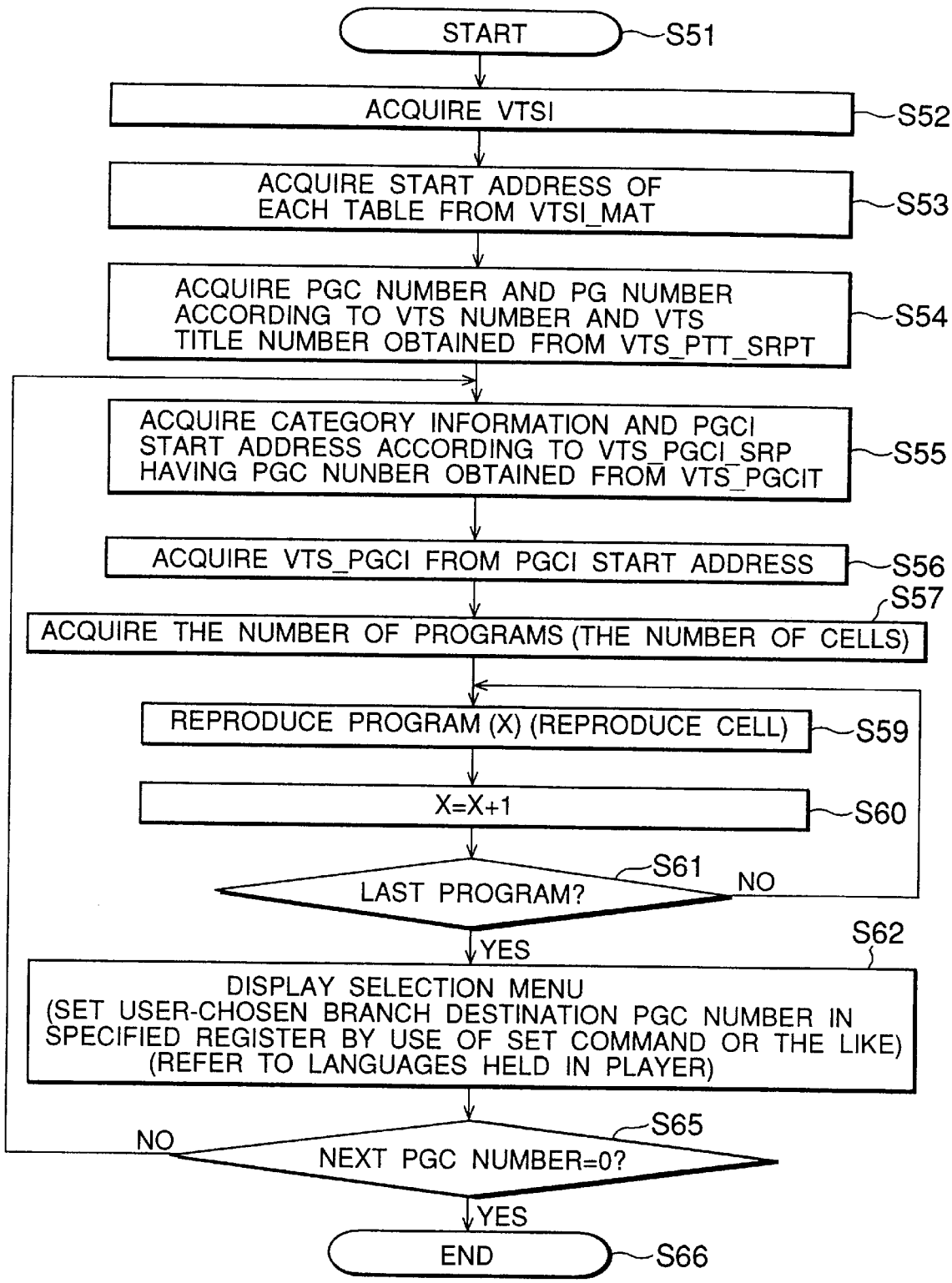
FIG. 61 is flow chart illustrating a procedure for acquiring a video title set and reproducing a PGC.

Now, the operation of retrieving and reproducing a program chain after the title has been chosen will be explained by reference to the flows shown in FIG. 61. Specifically, when the user specifies a program chain (PGC) from the key/display section 4, referring to the menu, the desired program chain will be searched for by the following procedure. This procedure applies to not only the retrieval of a program chain for titles in a video title set, but also the retrieval of a program chain for menus, each of which is a relatively complex menu made up of a program chain. As shown in FIG. 61, after a searching operation has been started as shown in step S51, the system CPU section 50 acquires video title set information 140 as shown in step S52 as explained earlier. Then, as shown in step S53, the start address of each table is obtained from the acquired video title set information 140. The table (VTS_PTT_SRPT) 145 is acquired according to the start address (VTS_PTT_SRPT_SA) of the video title set part-of-title search pointer table (VTS_PTT_SRPT) 145 among these obtained start addresses. Next, as shown in step S54, on the basis of the number (VTSN) of the video title set 296 obtained by reference to the title search pointer (TT_SRP) 279 of the video manager (VMG) 101 and the VTS title number (VTS_TTN), the PGC number corresponding to the part of the title specified by the user and the PG number are acquired.

By referring to the VTS-PGCI table (VTS_PGCIT) 146, the VTS_PGC search pointer #n (VTS_PGCI_SRP #n) 303 corresponding to the acquired PGC number is obtained. On the basis of the pointer #n (VTS_PGCI_SRP #n) 303, the category (VTS_PGC_CAT) of the VTS_PGC and the start address (VTS_PGCI_SA) of the VTS_PGC information (VTS_PGCI #n) 304 pointed out by the pointer are acquired. As shown in step S56, according to the start address (VTS_PGCI_SA) of the VTS_PGC information (VTS_PGCI #n) 304, the VTS_PGC information (VTS_PGCI #n) 304 is acquired. As shown in step S57, on the basis of the PGC general information (PGC_GI) 175 in the acquired VTS_PGC information (VTS_PGCI #n) 304, the contents (PGC_CNT) of the PGC are acquired. Then, from the PGC_CNT, the number of programs in the PGC and the number of cells are obtained.

After all of the pre-navigation commands (PRE_NV_CMD) have been executed, the PGC program map (PGC_MAP) 306 and cell playback information (C_PBIT) are acquired and as shown in step S59, the playback of the specified program (x), or the playback of cells, is started. Once the playback of a program has been completed as a result of cell playback, the program number is updated (x=x+1) as shown in step S60, and it is confirmed as shown in step S61 whether any updated program number is present. Namely, it is verified whether the program reproduced before playback is the last program. If there is a program having the updated program number, control will be passed to step S59, where the updated program will be reproduced. If the reproduced program is the last program, the selection menu for choosing a program to be next reproduced will be displayed as shown in step S62. The menu may have the choices appear in a sub-picture with the cell playback kept in a halt, or with moving pictures appearing on the screen by repeating the cell playback.

When the user has chosen a subsequent PGC from the selection menu, the PGC number at the branch destination chosen by the user is set in the register specified by the set command or the like. At this time, the language previously held in the apparatus, or the player, is referred to and an audio stream and a video stream are set. Once the next PGC number has been determined, it is confirmed whether there is any subsequent PGC number as shown in step S65. If a subsequent PGC is present, control will be passed again to step S55. If there is no PGC number, the playback of PGC will be terminated as shown in step S66.

Figure 62:
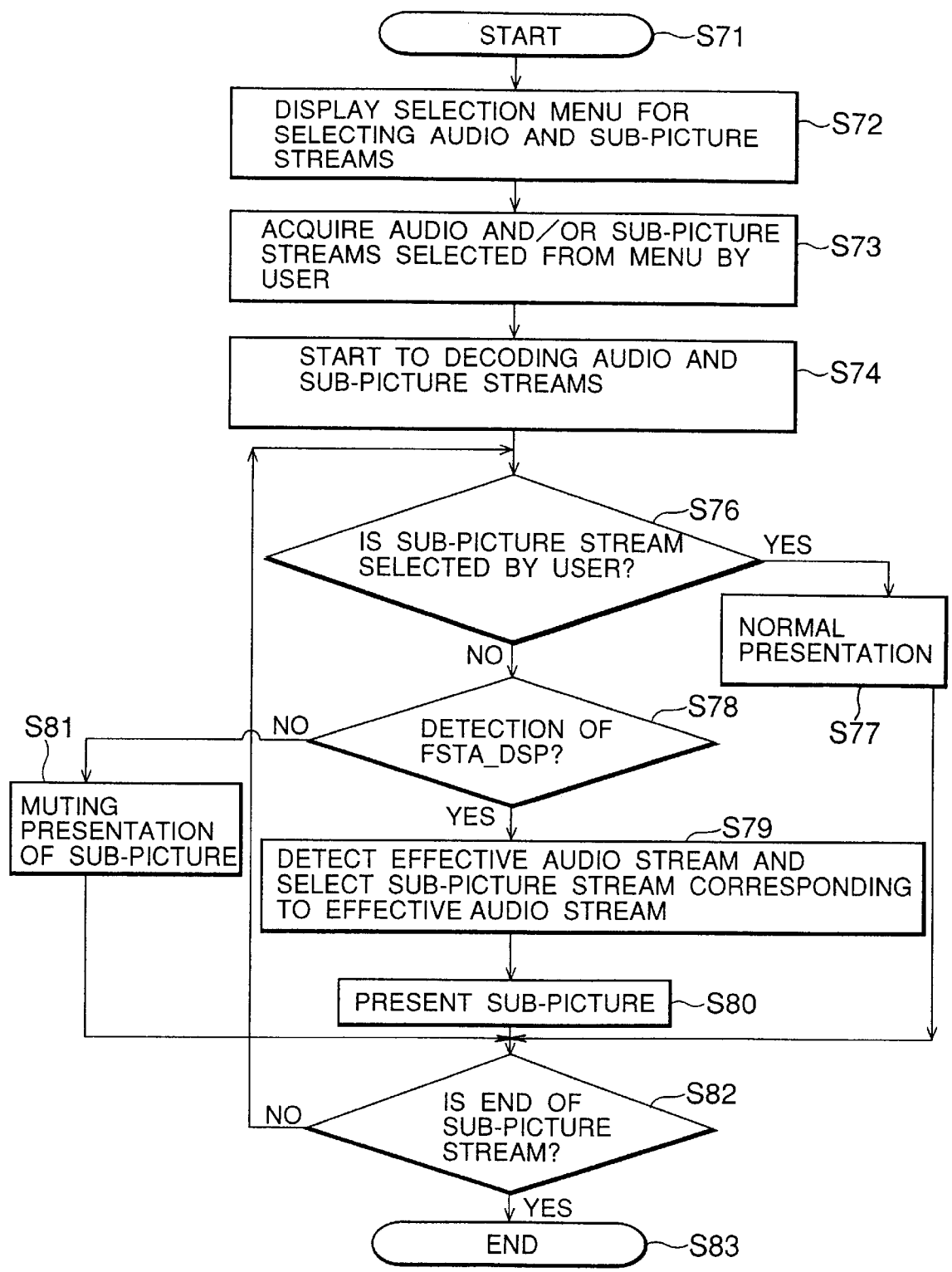
FIG. 62 is a flow chart of a reproducing process of the sub-picture data unit.

When display control command (SP_DCCMD) is described in the display control sequence (DCSQ) described in the display control sequence table (SP_DCSQT) 233 of the sub-picture data unit 230, a sub-picture is presented forcibly through a process, for example, shown in FIG. 62.

When the sub-picture data unit 230 has started the process in step S71 shown in FIG. 62, a menu for selecting the audio stream and the sub-picture stream is displayed in step S72 as described with reference to FIGS. 59 and 60. If key operation and key input from the display portion 4 to select the audio stream and the sub-picture stream are performed in step S73 in accordance with the foregoing menu, the stream selection register 242 and the output controller 247 of the display controller 246 shown in FIG. 57 are set by the CPU 50. If output of the sub-picture is not selected, the sub-picture stream in the same language as that of the selected audio stream is set to the stream selection register 242. If the output of the sub-picture is not selected, the output controller 247 is set to be a state where no sub-picture signal is output from the display controller 246, that is, a picture output mute state.

After the stream has been selected, decoding of the stream is started in step S74. That is, sub-picture packs 90 including non-selected streams are sequentially supplied from a data RAM 56 to the sub-picture decoder 62 through the system processor 54. In the sub-picture decoder 62, the sub-picture data packets 322 are cut from the sub-picture pack 90. The cut sub-picture data packets 322 are sequentially supplied to the syntax decoder 241. The syntax decoder 241 makes a reference to the PTS described in the sub-picture data packet 322 with the SCR 248 to output the sub-picture data packet 322 having the stream corresponding to the ID set to the stream selection register 242 to the run-length decoder 244 through the FIFO 243. If a user has not selected display of the sub-picture and as well as if the language of the selected audio stream or the audio stream is not selected, the ID of a sub-picture stream corresponding to the default language for the apparatus is set to the stream selection register 242. The sub-picture data packet 322 supplied to the run-length decoder 244 is expanded in the run-length decoder 244. The expanded sub-picture data unit 230 is supplied to the sequence controller 245. In the sequence controller 245, a reference is made to the start address (SPDCSQTA) of the display sequence table with the unit header (SPUH) 231 in the sub-picture data unit 230 to acquire the sub-picture display sequence table (SP_DCSQ). Reproduction control information described in the sequence table (SP_DCSQ) is supplied to the output controller 247. Moreover, pixel data (PXD) in the sub-picture data unit 230 is supplied to the display controller 246. The display controller 246 controls output of pixel data (PXD) supplied by the output controller 247.

If the user has selected output of the sub-picture in step S76, the display control command SP_DCCMD is supplied to the output controller 247 at the start time of SP_DCSQ described in the sub-picture display sequence table (SP_DCSQ). In accordance with the command (STA_DSP) for setting the start timing to display pixel data as the display control command SP_DCCMD, output of pixel data (PXD) to the video mixer is started. Thus, the sub-picture is displayed on the monitor 6 together with the main picture so that usual output of a picture is executed in step S57. As described above, the sub-picture is displayed on the monitor 6 with pixel data (PXD) in the sub-picture data units 230 which have been sequentially supplied. However, if the sub-picture display sequence table (SP_DCSQ) in the sub-picture data unit 230 includes the command (STP_DSP) for setting the timing for stopping display of pixel data as the display control command SP_DCCMD, display of the sub-picture is interrupted. By repeating the foregoing process, the sub-picture is displayed, if necessary.

If the user has not selected output of the sub-picture in step S76, an instruction to mute the output of the sub-picture is supplied from the system CPU 50 to the output controller 247. Thus, the output controller 247 mutes the output of the sub-picture pixel data in step S81. Therefore, the sub-picture is not displayed in the main picture on the monitor 6. If command (FSTA_DSP) for forcibly setting the display start timing of pixel data is, in step S78, detected, as the display control command SP_DCCMD, in the sub-picture display sequence table (SP_DCSQ) during the mute of the display of the sub-picture, a reference is made to the language of the selected audio stream or the default language in step S79. Thus, output of pixel data (PXD) of the sub-picture stream corresponding to the language to the video mixer is permitted. In step S80 the sub-picture is displayed on the monitor 6. Then, the process is returned to step S76 so that display is continued until the command (STP_DSP) for setting the timing for stopping the display of pixel data is detected as the display control command SP_DCCMD. If the command (FSTA_DSP) is not detected in step S78, the mute state of display of the sub-picture is, as a matter of course, maintained in step S81. In step S82 the operations in steps S76 to S82 are repeated until completion of the sub-picture stream is detected. If completion of the sub-picture stream is detected, the sequential process for the forcible presentation of the picture is completed in step S83.

Figure 63A:
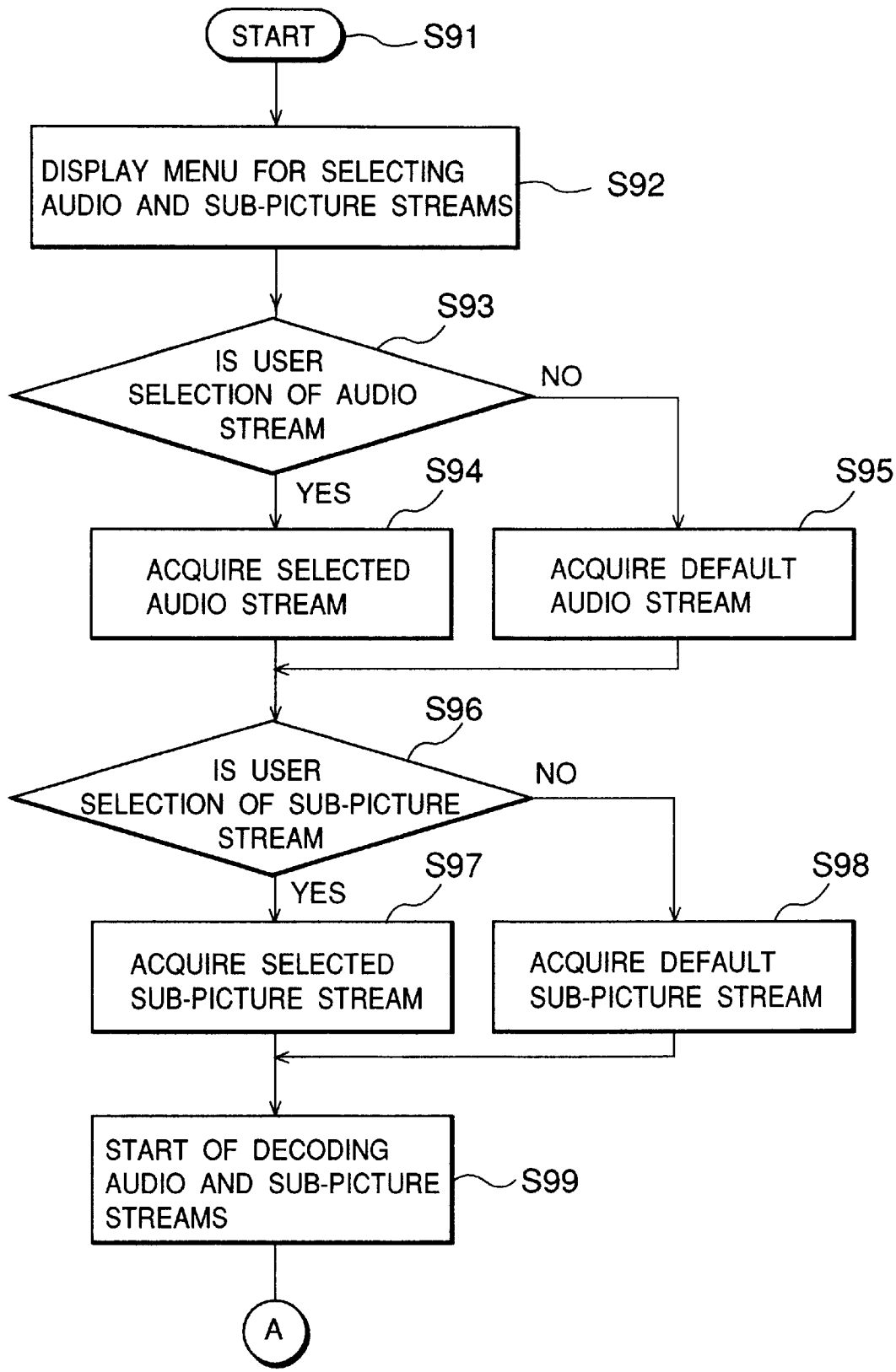
FIG. 63A and FIG. 63B are an another flow chart of a reproducing process of the sub-picture data unit.
Figure 63B:
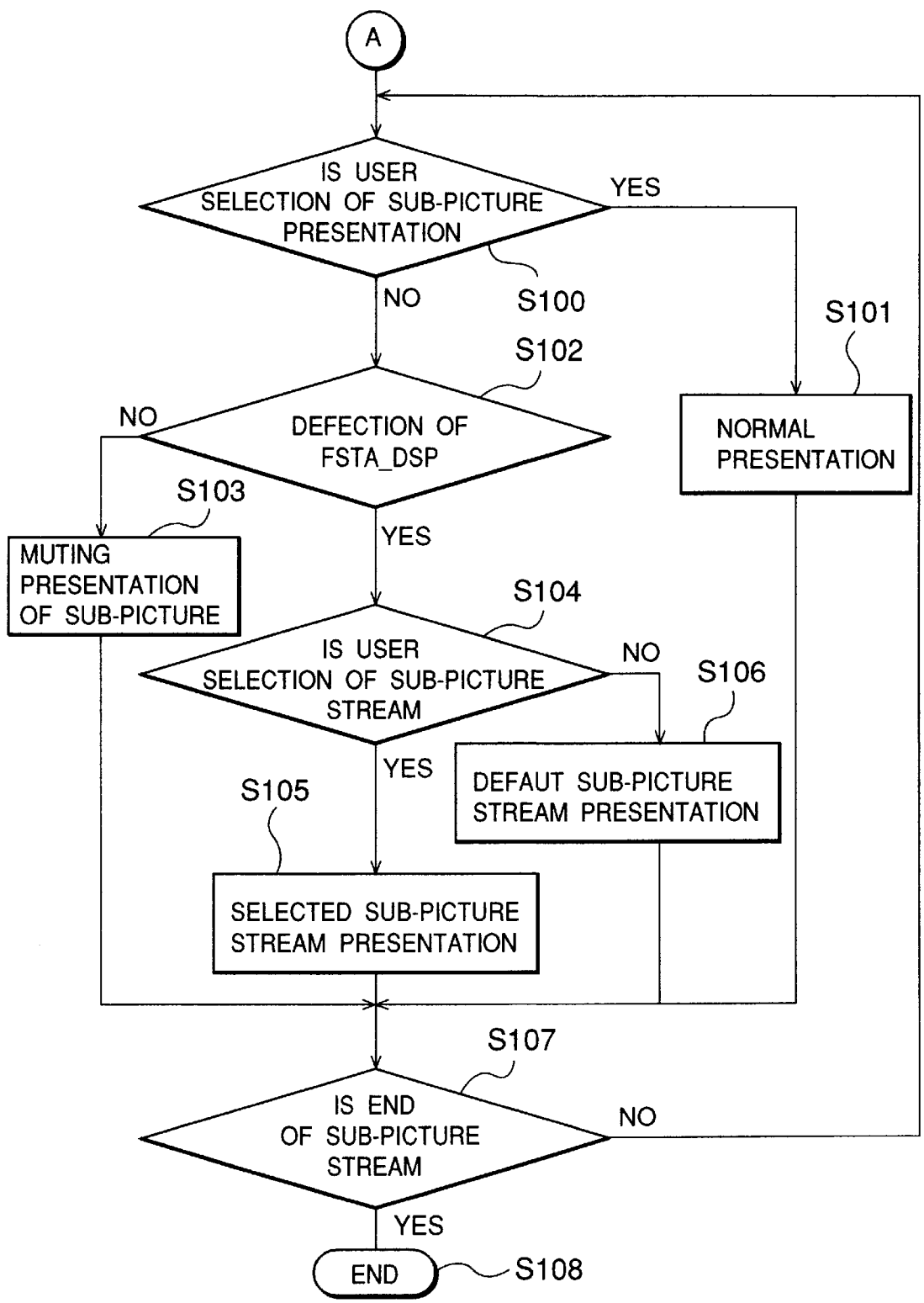

The forcible presentation shown in FIG. 62 has the structure such that an English sub-picture stream is selected and thus the English sub-picture is displayed if a sub-picture stream corresponding to the audio stream, for example, the English audio stream has been selected. Another structure may be employed in which a sub-picture stream, the presentation of which is forcibly performed, is selected as shown in FIGS. 63A and 63B if a user has selected the sub-picture stream or if a default sub-picture stream has been provided for the apparatus or an optical disk. The forcible picture presentation process according to this embodiment will now be described with reference to FIGS. 63A and 63B.

If the process of the sub-picture data unit 230 has been started in step S91 shown in FIG. 63A, the menu for selecting the audio stream and the sub-picture stream is displayed in step S92 as described with reference to FIGS. 59 and 60. If key operation has been performed or key input for selecting the audio stream has been performed from the display portion 4 in step S93 in accordance with the above-mentioned menu, the system CPU 50 acquires the selected audio stream in step S94 so that the stream selection register in the audio decoder 60 and the output control unit for the display controller similar to those shown in FIG. 57 are set by the system CPU 50. If the audio stream is not selected in step S95, the default audio stream formed in accordance with a language code previously set to the player is acquired by the system CPU 50 in step S95. Thus, the stream selection register and the output control unit for the display controller are similarly set by the system CPU 50. The default audio stream may previously be provided by a provider for the inside portion of the format of the optical disk. If a key operation has been performed or if key input for selecting the sub-picture stream has been performed from the display portion 4 in accordance with the menu in step S96, the system CPU 50, in step S97, acquires the selected sub-picture stream. Then, the stream selection register 242 and the output control unit 247 for the display controller 246 shown in FIG. 57 are set by the system CPU 50. If the sub-picture stream is not selected in step S95, the default sub-picture stream formed in accordance with the language code and previously provided for the player or the disk is, in step S98, acquired by the system CPU 50. Similarly, the stream selection register 242 and the output control unit 247 of the display controller 246 are set by the system CPU 50. Similarly to the default audio stream, the default sub-picture stream may be provided for the inside portion of the format of the optical disk by the provider.

If the presentation of the sub-picture is not selected, the output control unit 247 is set to be a state where the sub-picture signal is not output from the display controller 246, that is, a state of muting the presentation.

After the selection of the stream has been completed, decoding of the stream is started in step S99. That is, sub-picture packs 90 are sequentially supplied from the data RAM 56 to the sub-picture decoder 62 through the system processor 54. In the sub-picture decoder 62, the sub-picture data packets 322 are obtained from the sub-picture pack 90 by cutting. The sub-picture data packets 322 obtained by cutting are sequentially supplied to the syntax decoder 241. The syntax decoder 241 makes a reference to the PTS described in the sub-picture data packet 322 with the SCR 248 to output the sub-picture data packet 322 having the stream corresponding to the ID of the stream set to the stream selection register 242 to the run-length decoder 244 through the FIFO 243. If the user selects and causes the sub-picture to be displayed in step S100, a usual presentation is performed in step S101.

Also in a case where the user does not select the presentation of the sub-picture and thus the presentation of the sub-picture is not performed, the ID of the selected or default sub-picture stream is set to the stream selection register 242. The sub-picture data packets 322 supplied to the run-length decoder 244 is expanded in the run-length decoder 244. The expanded sub-picture data unit 230 is supplied to the sequence controller 245. In the sequence controller 245, a reference is made to start address (SPDCSQTA) of the display sequence table in accordance with the unit header (SPUH) 231 in the sub-picture data unit 230 so that the sub-picture display sequence table (SP_DCSQ) is acquired. Reproduction control information described in the sequence table (SP_DCSQ) is supplied to the output control unit 247. Moreover, pixel data (PXD) in the sub-picture data unit 230 is supplied to the display controller 246. The display controller 246 controls output of pixel data (PXD) supplied by the output control unit 247.

If presentation of the sub-picture has been selected by the user in step S100, display control command (SP_DCCMD) is supplied to the output control unit 247 at the start time SP_DCSQ described in the sub-picture display sequence table (SP_DCSQ). The display control command SP_DCCMD causes output of pixel data (PXD) to the video mixer to be started in accordance with a command (STA_DSP) for setting timing at which display of pixel data is started. Thus, the sub-picture is displayed on the monitor 6 together with the main picture. As a result, a usual presentation of the picture is performed in step S101. Pixel data (PXD) in the sub-picture data units 230 which have been sequentially supplied causes the sub-picture to be displayed on the monitor 6. If the sub-picture display sequence table (SP_DCSQ) in the sub-picture data unit 230 has a command (STP_DSP) for setting the timing at which display of pixel data is stopped as the display control command SP_DCCMD, display of the sub-picture is stopped. The foregoing operation is repeated so that the sub-picture is displayed if necessary.

If the user has not selected the presentation of the sub-picture in step S100, an instruction to mute presentation of the sub-picture is supplied from the system CPU 50 to the output control unit 247. The output control unit 247 mutes output of sub-picture pixel data in step S103. As a result, the sub-picture is not displayed in the main picture on the monitor 6. If a command (FSTA_DSP) for setting the timing at which display of pixel data is forcibly started is, in step S102, detected in the sub-picture display sequence table (SP_DCSQ) as the display control command SP_DCCMD during muting of the presentation of the sub-picture, whether or not the sub-picture has been selected is confirmed in step S104. Then, a reference is made to the selected language in step S105 or a reference is made to the default language in step S106 so that output of pixel data (PXD) of the sub-picture stream corresponding to the language to the video mixer is permitted. As a result, the sub-picture is displayed on the monitor 6. After the display has been performed, the operation returns to step S100 so that the display is continued until a command (STP_DSP) for setting the timing at which display of pixel data is stopped is detected as the display control command (SP_DCCMD). That is, if the command (FSTA_DSP) is not detected in step S102, muting of the display of the sub-picture is, as a matter of course, maintained in step S103. The operations from step S100 to step S107 are repeated until completion of the sub-picture stream is detected in step S107. When completion of the sub-picture stream is detected, the sequential process for forcibly performing presentation is completed in step S83.

When the command for performing the forcible presentation shown in FIGS. 63, 64A and 64B is performed, other commands shown in FIG. 56, for example, display timing (STA_DSP) and display stop timing (STP_DSP) are performed so that the sub-picture is forcibly displayed in an adequate display region with proper contrast and hue. That is, the forcible presentation command (FTS_DSP) is performed together with the other commands shown in FIG. 56.

Referring to FIGS. 64 to 69, explained next will be a method of recording data on the optical disk 10 on and from which the video data is recorded and reproduced in the logic formats shown in FIGS. 4 to 56 and a recording system to which the recording method is applied.

Figure 64:
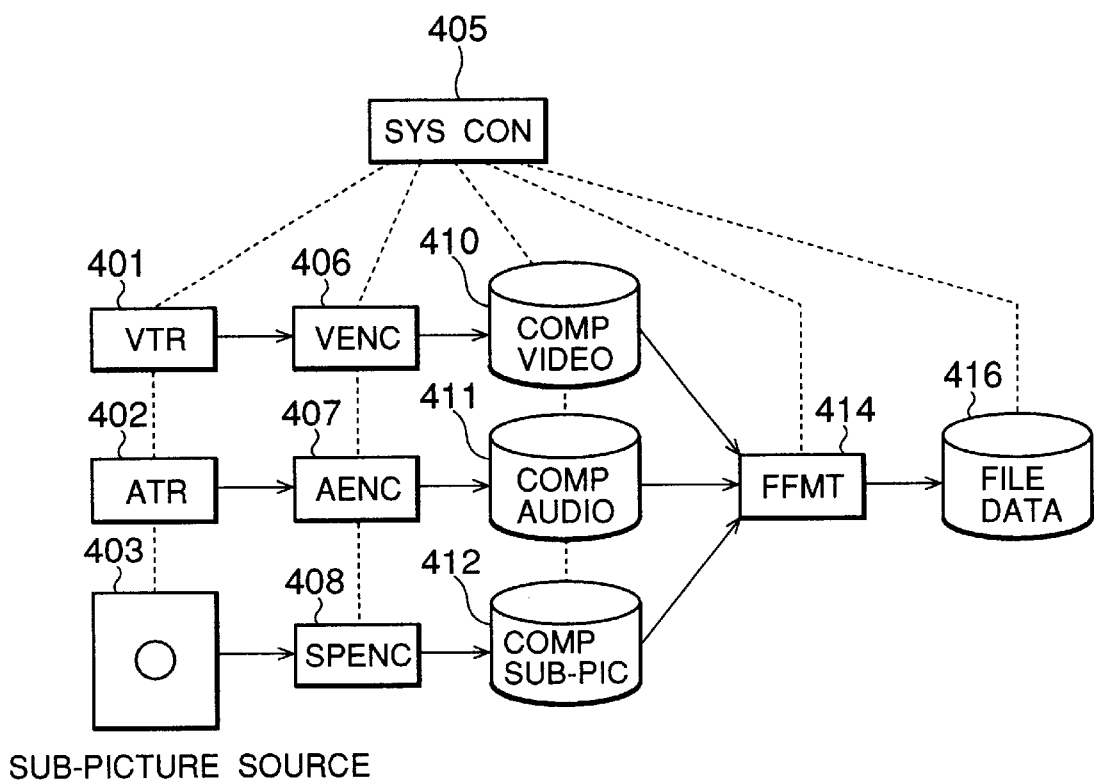
FIG. 64 is a block diagram illustrating an encoder system for encoding video data and generating a video file.

FIG. 64 shows an encoder system that creates a video file 104 of a title set 102 whose video data is encoded. In the system of FIG. 64, for example, a videotape recorder (VTR) 401, an audiotape recorder (ATR) 402, and a sub-picture source 403 are used as sources of the main video data, audio data, and sub-picture data. Under the control of a system controller (Sys con) 405, they create the main video data, audio data, and sub-picture data, which are supplied to a video encoder (VENC) 406, an audio encoder (AENC) 407, and a sub-picture encoder (SPENC) 408, respectively. Under the control of the system controller (Sys con) 405, these encoders 406, 407, and 408 perform A/D conversion of the main video data, audio data, and sup-picture data and encode them by the respective compression schemes. The encoded main video data, audio data, and sub-picture data (Comp Video, Comp Audio, Comp Sub-pict) are stored in memories 410, 411, and 412.

The main video data, audio data, and sub-picture data (Comp Video, Comp Audio, Comp Sub-pict) are outputted to a file formatter (FFMT) 414 under the control of the system controller (Sys con) 405, which converts them so that they may have a file structure of video data for the system as explained earlier. Then, under the control of the system controller (Sys con) 405, the setting conditions for each data item and the management information including attributes are stored in a memory 416 in the form of files.

Explained next will be a standard flow of an encoding process in the system controller (Sys con) 405 that creates a file from video data.

Figure 65:
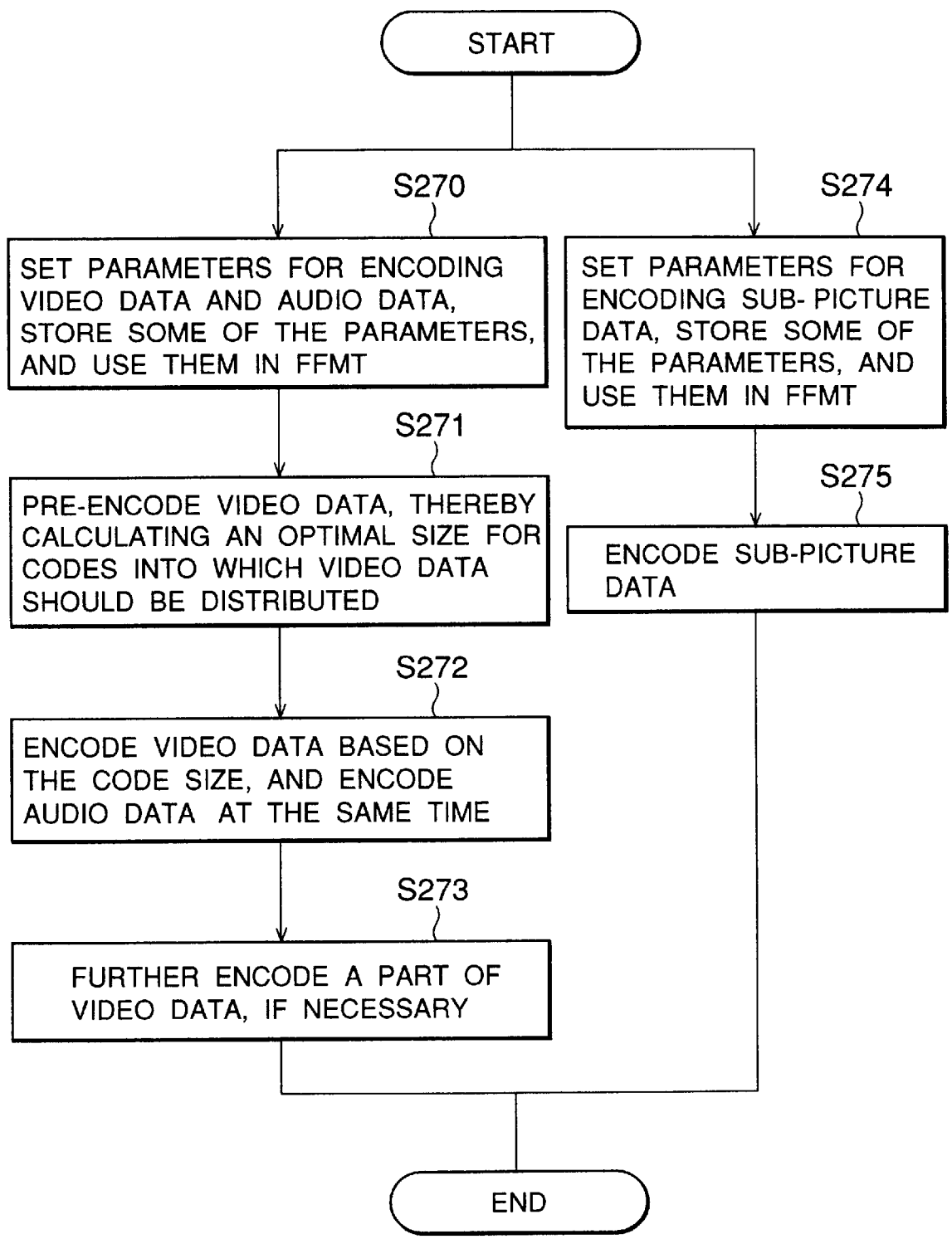
FIG. 65 is a flow chart illustrating an encoding process in the encoder system shown in FIG. 64.

According to the flow of FIG. 65, the main video data and audio data are encoded and the encoded main video data and audio data (Comp Video, Comp Audio) are supplied. Specifically, when the encoding process is started, as shown in step S270 of FIG. 65, the parameters necessary for encoding the main video data and audio data are set. Part of the set parameters are stored in the system controller (Sys con) 405 and at the same time, are used at the file formatter (FFMT) 414. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the reencoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data are set. As shown in step S274, part of the parameters are stored in the system controller (Sys con) 405 and used in the file formatter (FFMT) 414. On the basis of the parameters, the sub-picture data is encoded as shown in step S275. By the process, the sub-picture data is encoded.

Figure 66:
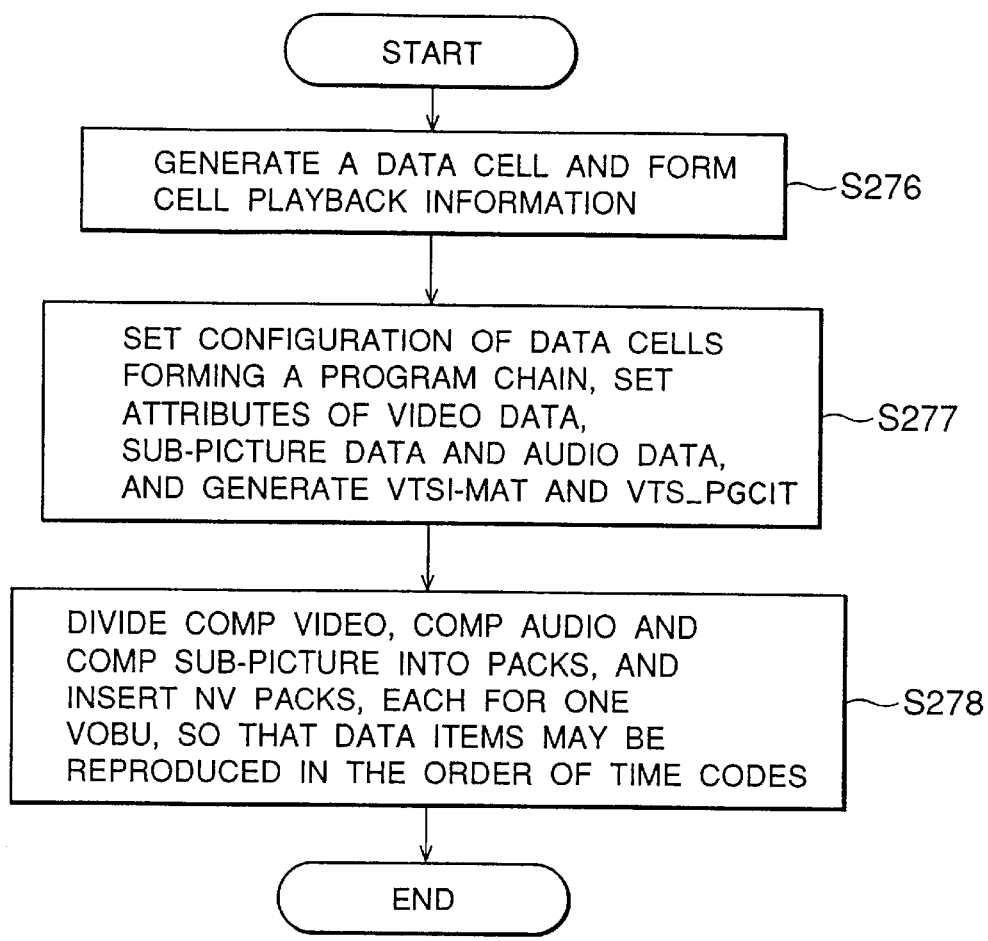
FIG. 66 is a flow chart illustrating a process of forming a video data file by combining video data, audio data and sub-picture data encoded by the flow of FIG. 65.

According to the flow of FIG. 66, the encoded main video data, audio data, and sub-picture data (Com Video, Com Audio, Comp Sub-pict) are combined and converted so as to form a video data title set structure as explained in FIGS. 4 and 22. Specifically, as shown in step S276, a cell is set as the smallest unit of the video data and cell playback information on the cell (C_PBI) is created. Then, as shown in step S277, the structure of the cells constituting a program chain and the main video, sub-picture, and audio attributes (the information obtained in encoding the respective data items is used as part of these attributes) are set. Then, as shown in FIG. 22, a video title set information management table information (VTSI_MAT) 144 including information on program chains and a video title set program chain table (VTS_PGCIT) 146 are created. At this time, as the need arises, a video title set direct access pointer table (VTS_DAPT) is also created. The encoded main video data, audio data, and sub-picture data (Com Video, Comp Audio, Comp Sub-pict) are subdivided into specific packs. An NV pack is placed at the head of each VOBU so that playback can be effected in the order of time code of each data item. With the NV packs arranged this way, each data cell is positioned so that a video object (VOB) may be composed of a plurality of cells as shown in FIG. 6. A set of such video objects is formatted into the title set structure.

In the flow of FIG. 66, the program chain information (PGI) is obtained in the process of step S277 by using the database in the system controller (Sys con) 405 or entering data again as the need arises.

Figure 67:
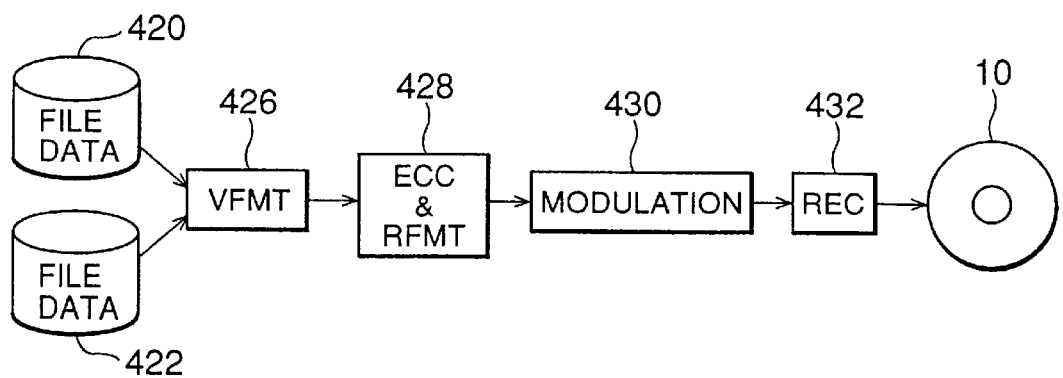
FIG. 67 is a block diagram showing a disk formatter system for recording a formatted video file on the optical disk.

FIG. 67 shows a disk formatter system that records on an optical disk the title set formatted as described above. In the disk formatter system of FIG. 67, the memories 420, 422 in which the created title set is stored supply these file data items to a volume formatter (VFMT) 426. The volume formatter (VFMT) 426 extracts the management information from the title sets 284, 286, produces a video manager 101, and creates the logic data to be recorded on the disk 10 in the arrangement of FIG. 4. A disk formatter (DFMT) 428 adds error correction data to the logic data created at the volume formatter (VFMT) 426, thereby reconverting the logic data into physical data to be recorded on the disk. A modulator 430 converts the physical data created at the disk formatter (DFMT) 428 into the recording data to be recorded actually on the disk. Then, a recorder 432 records the modulated recording data on the disk 10.

Figure 68:
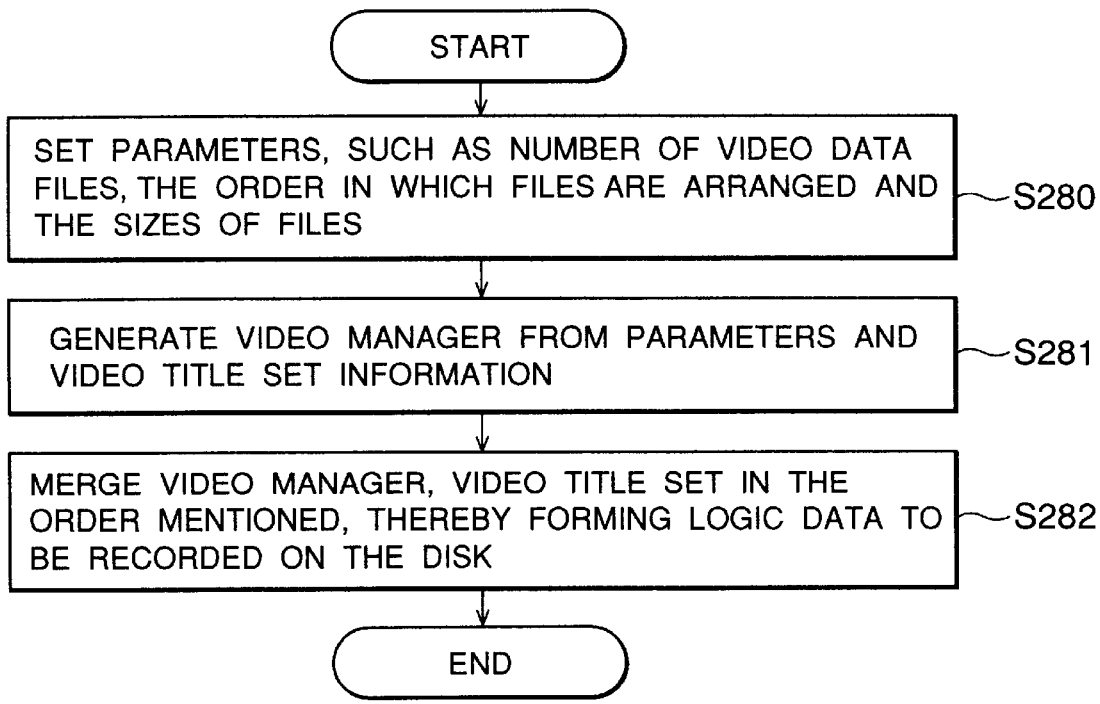
FIG. 68 is a flow chart for producing logic data to be recorded on the disk, in the disk formatter shown in FIG. 67.

A standard flow for creating the aforementioned disk will be described with reference to FIGS. 68 and 69. FIG. 68 shows the flow of creating the logic data to be recorded on the disk 10. Specifically, as shown in step S280, parameter data items, including the number of video data files, their arrangement, and the size of each video data file, are set first. Next, as shown in step S281, a video manager 101 is created from the set parameters and the video title set information 140 in each video title set 102. Thereafter, as shown in step S282, the video manager 101 and video title set 102 are arranged in that order according to the corresponding logical block number, thereby creating the logic data to be recorded on the disk 10.

Figure 69:
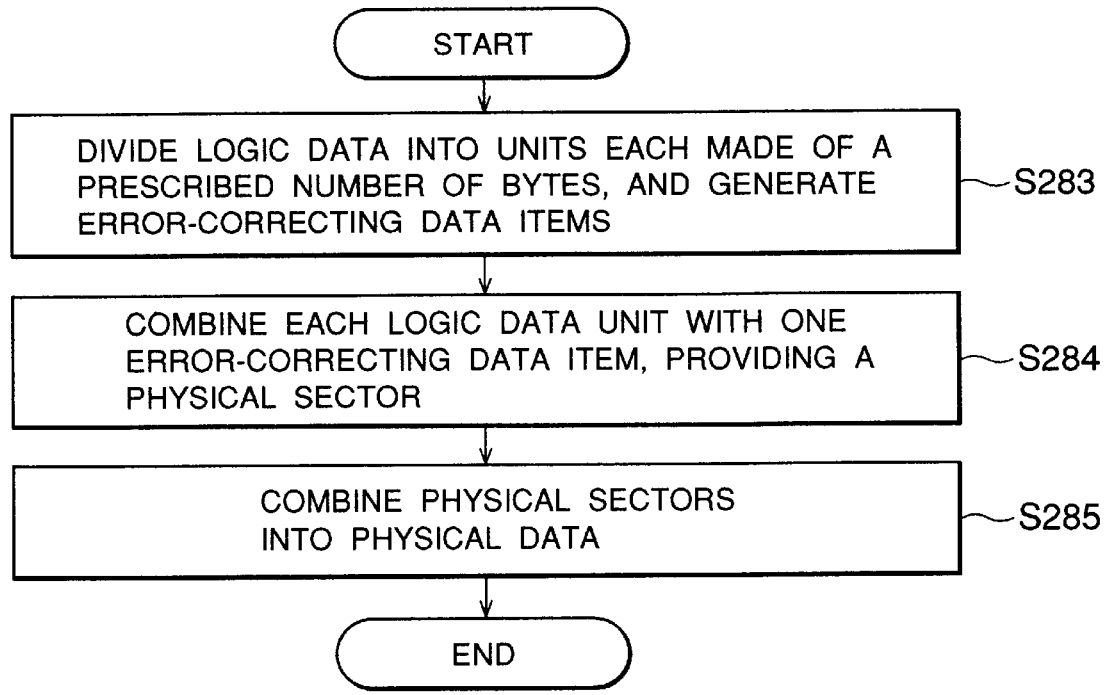
FIG. 69 is a flow chart for producing, from the logic data, physical data to be recorded on the disk.

Thereafter, the flow of creating the physical data to be recorded on the disk as shown in FIG. 69 is executed. Specifically, as shown in step S283, the logic data is divided into units of a specific number of bytes, thereby forming error correction data. Next, as shown in step S284, the logic data divided into units of a specific number of bytes are combined with the created error correction data to form physical sectors. Thereafter, as shown in step S85, physical data is created by combining physical sectors. In this way, the modulating process based on certain rules is performed on the physical data created in the flow of FIG. 69, thereby forming the recording data. Thereafter, the recording data is recorded on the disk 10.

Figure 70:
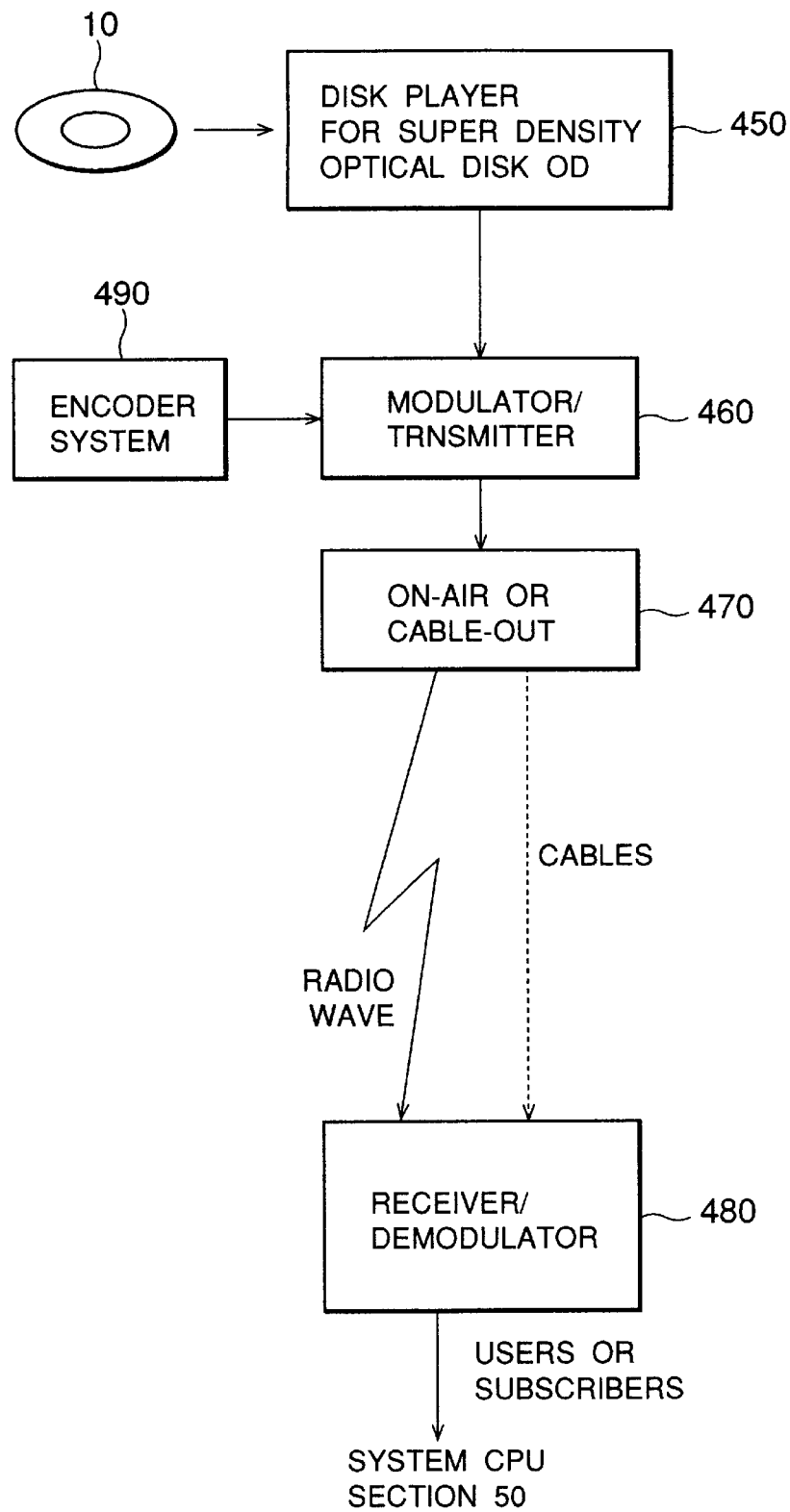
FIG. 70 schematically shows a system for transferring the video title set shown in FIG. 22 through a communication system.

The above-described data structure can be applied not only to a case where the data is recorded on recording mediums, such as optical disks, and then the disks are distributed to the users, who play back them, but also to a communication system as shown in FIG. 70. Specifically, according to the procedures shown in FIGS. 64 to 67, an optical disk 10 in which a video manager 101 and video title sets 102 as shown in FIG. 4 are stored may be loaded into a reproducing apparatus 450, from whose system CPU section 50 the encoded data is taken out digitally and transmitted by a modulator/transmitter 460 to the users or the cable subscribers by radio or via a cable. Furthermore, the encoding system 490 and format system shown in FIGS. 63 and 66 may encode and format the data, respectively, on the provider side, such as a broadcasting station, and the formatted data may be transmitted by the modulator/transmitter 460 to the users or the cable subscribers by radio or via cables. In such a communication system, the information in the video manager 101 is modulated at the modulator/transmitter 460 and then supplied to or is directly supplied to the users free of charge. When a user is interested in the title, the modulator/transmitter 460 transmits the title set 102 at the user's or subscriber's request by radio or via a cable. Under the control of the video manager 101, the video title set information 140 is first transferred and then the title video object 141 in the video title set reproduced according to the title set information 140 is transferred. At this time, if necessary, the video title set menu video object 141 is also transmitted. The transferred data is received by a receiver/demodulator 480 on the user side and is processed as decoded data at the system CPU section 50 of the reproducing apparatus on the user or subscriber side of FIG. 1 in the same manner as in the above-described reproducing process, whereby the video data is reproduced.

As described above, the recording medium according to the present invention is able to forcibly reproduce the sub-picture in accordance with the state of reproduction. Thus, video data can be provided with which a problem in that a user cannot understand the story can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for reproducing data from an optical disk, said optical disk comprising:

(a) a video stream including a plurality of video packs, each of said video packs having compressed video data;

(b) a first audio stream including a plurality of audio packs, each of said audio packs having encoded audio data; and (c) first and second sub-picture streams, each of said subpicture streams including a plurality of sub-picture packs having sub-picture data, said first sub-picture stream having a first language and said second sub-picture stream having a second language;

wherein each of said first and second sub-picture streams comprises a plurality of sub-picture data units, each of said plurality of sub-picture data units corresponding to a reproduction unit of the corresponding sub-picture stream and a sequential portion of said plurality of sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display control command, and wherein the display control command of at least one among the plurality of sub-picture data units is a forcible display command;

said apparatus comprising:

(d) retrieving means for retrieving the video, audio and sub-picture packs from said optical disk;

(e) sub-picture stream selecting means for indicating one of said first and second sub-picture streams in a sub-picture selecting mode and for indicating a predetermined one among the first and second sub-picture streams in a sub-picture non-selecting mode;

(f) decoding means for (f1) decoding the sub-picture data units of the first sub-picture stream into a plurality of first sub-picture signals for presenting information of the first sub-picture stream in the first language and for (f2) decoding the sub-picture data units of the second sub-picture stream into a plurality of second sub-picture signals for presenting information of the second sub-picture stream in the second language;

(g) mode setting means for setting one of a sub-picture presentation mode and a sub-picture non-presentation mode; and (h) control means for (h1) controlling said decoding means, when the presentation mode is set, to output those among the first and second sub-picture signals which correspond to the indicated one of the first and second sub-picture streams, for (h2) controlling said decoding means, when the non-presentation mode is set, to output those among the first and second sub-picture signals which correspond to said at least one among the plurality of sub-picture data units of the indicated one of the first and second sub-picture streams having the forcible display command, and for (h3) preventing said decoding means, when the non-presentation mode is set, from outputting those among the first and second sub-picture signals which correspond to those among the plurality of sub-picture data units that do not have the forcible display command.

2. An apparatus according to claim 1, wherein at least one of the subpicture unit headers includes a size of the corresponding subpicture data unit and a start address of the corresponding display control sequence table, wherein said corresponding display control sequence table includes a second display control sequence having a second command and a start time of executing the second command, and wherein a sub-picture pack corresponding to said subpicture unit header includes a presentation time stamp, said start time of executing the display command being defined in relation to the presentation time stamp.

3. An apparatus according to claim 1, wherein said optical disk further comprises a second audio stream including a plurality of second audio packs, each of said second audio packs having encoded audio data;

wherein said first audio stream has the first language and the second audio stream has the second language;

said apparatus further comprising audio stream selecting means for selecting one of said first and second audio streams in an audio selecting mode;

wherein said sub-picture selecting means determines the predetermined one of the first and second sub-picture streams as the one among the first and second sub-picture streams having the language of the selected one of the first and second audio streams.

4. An apparatus according to claim 1, wherein said optical disk further comprises menu data including sub-picture selecting menus for displaying sub-picture selection items for optionally selecting one of the sub-picture streams, each said sub-picture selecting menu having a menu language and a corresponding language code, and said menu data comprising video and sub-picture packs;

wherein said sub-picture stream selecting means includes means for choosing one of the sub-picture selection items from the sub-picture selecting menus to select one of the sub-picture streams.

5. An apparatus according to claim 3, wherein said optical disk further comprises menu data including audio selecting menus for displaying audio selection items for optionally selecting one of the audio streams, each said audio selecting menu having a menu language and a corresponding language code, and said menu data comprising video and sub-picture packs;

wherein said audio stream selecting means includes means for choosing one of the audio selection item from the audio selecting menus to select one of the audio streams.

6. An apparatus for reproducing data from an optical disk, said optical disk comprising:

(a) a video stream including a plurality of video packs, each of said video packs having compressed video data;

(b) first and second audio streams, each of said audio streams including a plurality of audio packs, each of said audio packs having encoded audio data, the first audio stream having the first language and the second audio stream having the second language; and (c) first and second sub-picture streams, each of said subpicture streams including a plurality of sub-picture packs having sub-picture data, said first sub-picture stream having the first language and the second sub-picture stream having the second language;

wherein each of said first and second sub-picture streams comprises a plurality of sub-picture data units, each of said plurality of sub-picture data units corresponding to a reproduction unit of the corresponding sub-picture stream and a sequential portion of said plurality of sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display control command, and wherein the display control command of at least one among the plurality of sub-picture data units is a forcible display command;

said apparatus comprising:

(d) retrieving means for retrieving the video, audio and sub-picture packs from said optical disk;

(e) audio stream selecting means for selecting one of said first and second audio stream;

(f) sub-picture stream selecting means for indicating one of said first and second sub-picture streams in a sub-picture selecting mode and for indicating a default one among the first and second sub-picture streams in a sub-picture non-selecting mode, said default one among the first and second sub-picture streams being the one having the language of the selected one of the first and second audio streams;

(g) decoding means for (g1) decoding the sub-picture data units of the first sub-picture stream into a plurality of first sub-picture signals for presenting information of the first sub-picture stream in the first language and for (g2) decoding the sub-picture data units of the second sub-picture stream into a plurality of second sub-picture signals for presenting information of the second sub-picture stream in the second language;

(h) mode setting means for setting one of a sub-picture presentation mode and a sub-picture non-presentation mode; and (i) control means for (i1) controlling said decoding means, when the presentation mode is set, to output those among the first and second sub-picture signals which correspond to the indicated one of the first and second sub-picture streams, for (i2) controlling said decoding means, when the non-presentation mode is set, to output those among the first and second sub-picture signals which correspond to said at least one among the plurality of sub-picture data units of the indicated one of the first and second sub-picture streams having the forcible display command, and for (i3) preventing said decoding means, when the non-presentation mode is set, from outputting those among the first and second sub-picture signals which correspond to those among the plurality of sub-picture data units that do not have the forcible display command.

7. An apparatus according to claim 6, wherein at least one of the subpicture unit headers includes a size of the corresponding subpicture data unit and a start address of the corresponding display control sequence table, wherein said corresponding display control sequence table includes a second display control sequence having a second command and a start time of executing the second command, and wherein a sub-picture pack corresponding to said subpicture unit header includes a presentation time stamp, said start time of executing the display command being defined in relation to the presentation time stamp.

8. An apparatus according to claim 6, wherein said optical disk further comprises menu data including sub-picture selecting menus for displaying sub-picture selection items for optionally selecting one of the sub-picture streams, each said sub-picture selecting menu having a menu language and a corresponding language code, and said menu data comprising video and sub-picture packs;

wherein said sub-picture stream selecting means includes means for choosing one of the sub-picture selection items from the sub-picture selecting menus to select one of the sub-picture streams.

9. An apparatus according to claim 6, wherein said optical disk further comprises menu data including audio selecting menus for displaying audio selection items for optionally selecting one of the audio streams, each said audio selecting menu having a menu language and a corresponding language code, and said menu data comprising video and sub-picture packs;

wherein said audio stream selecting means includes means for choosing one of the audio selection item from the audio selecting menus to select one of the audio streams.

10. A method of reproducing data from an optical disk, said optical disk comprising:

(a) a video stream including a plurality of video packs, each of said video packs having compressed video data;

(b) a first audio stream including a plurality of audio packs, each of said audio packs having encoded audio data; and (c) first and second sub-picture streams, each of said sub-picture streams including a plurality of sub-picture packs having sub-picture data, said first sub-picture stream having a first and said second sub-picture stream having a second language;

wherein each of said first and second sub-picture streams comprises a plurality of sub-picture data units, each of said plurality of sub-picture data units corresponding to a reproduction unit of the corresponding sub-picture stream and a sequential portion of said plurality of sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display control command, and wherein the display control command of at least one among the plurality of sub-picture data units is a forcible display command;

said method comprising:

(e) retrieving the video, audio and sub-picture packs from said optical disk;

(f) decoding the sub-picture units of the first sub-picture stream into a plurality of first sub-picture signals for presenting information of the first sub-picture stream in the first language and decoding the sub-picture units of the second sub-picture stream into a plurality of second sub-picture signals for presenting information of the second sub-picture stream in the second language;

(g) indicating one of said first and second sub-picture streams in a selecting mode and indicating a default one of said first and second sub-picture streams in a non-selecting mode;

(h) setting one of a sub-picture presentation mode and a sub-picture non-presentation mode; and (i) outputting, when the presentation mode is set, those among the first and second sub-picture signals which correspond to the indicated one of the first and second sub-picture streams; outputting, when the non-presentation mode is set, those among the first and second sub-picture signals which correspond to said at least one among the plurality of sub-picture data units of the indicated one of the first and second sub-picture stream having the forcible display command; and preventing, when the non-presentation mode is set, output of those among the first and second sub-picture signals which correspond to those among the plurality of sub-picture data units that do not have the forcible display command.

11. A method according to claim 10, wherein at least one of the subpicture unit headers includes a size of the corresponding subpicture data unit and a start address of the corresponding display control sequence table, wherein said corresponding display control sequence table includes a second display control sequence having a second command and a start time of executing the second command, and wherein a sub-picture pack corresponding to said subpicture unit header includes a presentation time stamp, said start time of executing the display command being defined in relation to the presentation time stamp.

12. A method according to claim 10, wherein said optical disk further comprises a second audio stream including a plurality of second audio packs, each of said second audio packs having encoded audio data;

wherein said first audio stream has the first language and the second audio stream has the second language;

said apparatus further comprising audio stream selecting means for selecting one of said first and second audio streams in an audio selecting mode;

wherein said sub-picture selecting means selects a predetermined one of the first and second sub-picture streams in the sub-picture non-selecting mode, said predetermined one of the first and second sub-picture streams having the language of the selected one of the first and second audio streams, and wherein said control means causes said decoding means in response to the forcible display command to output the one of the sub-picture signals corresponding to said predetermined one of the first and second sub-picture streams in the non-selecting mode, even if the sub-picture non-presentation mode is selected.

13. A method according to claim 10, wherein said optical disk further comprises menu data including sub-picture selecting menus for displaying sub-picture selection items for optionally selecting one of the sub-picture streams, each said sub-picture selecting menu having a menu language and a corresponding language code, and said menu data comprising video and sub-picture packs;

wherein said sub-picture selecting step includes a step of choosing one of the sub-picture selection items from the sub-picture selecting menus to select one of the sub-picture streams.

14. A method according to claim 10, wherein said optical disk further comprises menu data including audio selecting menus for displaying audio selection items for optionally selecting one of the audio streams, each said audio selecting menu having a menu language and a corresponding language code, and said menu data comprising video and sub-picture packs;

wherein said audio stream selecting step includes a step of choosing one of the audio selection item from the audio selecting menus to select one of the audio streams.

15. A method of reproducing data from an optical disk, said optical disk comprising:

(a) a video stream including a plurality of video packs, each of said video packs having compressed video data;

(b) first and second audio streams including a plurality of audio packs, each of said audio packs having encoded audio data, the first audio stream having a first language and the second audio stream having a second language; and (c) first and second sub-picture streams, each of said sub-picture streams including a plurality of sub-picture packs having sub-picture data, said first and second sub-picture streams having the first and second sub-picture language information, respectively;

wherein each of said first and second sub-picture streams comprises a plurality of sub-picture data units, each of said plurality of sub-picture data units corresponding to a reproduction unit of the corresponding sub-picture stream and a sequential portion of said plurality of sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display control command, and wherein the display control command of at least one among the plurality of sub-picture data units is a forcible display command;

said method comprising:

(e) retrieving the video, audio and sub-picture packs from said optical disk;

(f) decoding the sub-picture units of the first sub-picture stream into a plurality of first sub-picture signals for presenting information of the first sub-picture stream in the first language and decoding the sub-picture units of the second sub-picture stream into a plurality of second sub-picture signals for presenting information of the second sub-picture stream in the second language;

(g) selecting one of said first and second audio streams;

(h) indicating one of said first and second sub-picture streams in a selecting mode and indicating a default one of said first and second sub-picture streams in a non-selecting mode, said default one among the first and second sub-picture streams being the one having the language of the selected one of the first and second audio streams;

(i) setting one of a sub-picture presentation mode and a sub-picture non-presentation mode; and (j) outputting, when the presentation mode is set, those among the first and second sub-picture signals which correspond to the indicated one of the first and second sub-picture streams; outputting, when the non-presentation mode is set, those among the first and second sub-picture signals which correspond to said at least one among the plurality of sub-picture data units of the indicated one of the first and second sub-picture stream having the forcible display command; and preventing, when the non-presentation mode is set, output of those among the first and second sub-picture signals which correspond to those among the plurality of sub-picture data units that do not have the forcible display command.

16. A method according to claim 15, wherein at least one of the subpicture unit headers includes a size of the corresponding subpicture data unit and a start address of the corresponding display control sequence table,
wherein said corresponding display control sequence table includes a second display control sequence having a second command and a start time of executing the second command, and
wherein a sub-picture pack corresponding to said subpicture unit header includes a presentation time stamp, said start time of executing the display command being defined in relation to the presentation time stamp.

17. A method according to claim 16, wherein said optical disk further comprises menu data including sub-picture selecting menus for displaying sub-picture selection items for optionally selecting one of the sub-picture streams, each said sub-picture selecting menu having a menu language and a corresponding language code, and said menu data comprising video and sub-picture packs;
wherein said sub-picture stream selecting step includes a step of choosing one of the sub-picture selection items from the sub-picture selecting menus to select one of the sub-picture streams.

18. A method according to claim 16, wherein said optical disk further comprises menu data including audio selecting menus for displaying audio selection items for optionally selecting one of the audio streams, each said audio selecting menu having a menu language and a corresponding language code, and said menu data comprising video and sub-picture packs;
wherein said audio stream selecting step includes a step of choosing one of the audio selection item from the audio selecting menus to select one of the audio streams.

19. An apparatus for reproducing data from an optical disk, said optical disk comprising:
(a) a video stream including a plurality of video packs, each of said video packs having compressed video data;
(b) a first audio stream including a plurality of audio packs, each of said audio packs having encoded audio data; and
(c) first and second sub-picture streams, each of said sub-picture streams including a plurality of sub-picture packs having sub-picture data, said first sub-picture stream having a first language a nd said second sub-picture streams having a second language;
wherein each of said first and second sub-picture streams comprising sub-picture data units, each said sub-picture data unit corresponding to a reproduction unit of the corresponding sub-picture stream and a sequence portion of plurality of said sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display command, and
wherein the display control command of at least one among the plurality of sub-picture data units is a forcible display command;

said apparatus having a predetermined language code and comprising:
(d) retrieving means for retrieving the video, audio and sub-picture packs from said optical disk;
(e) sub-picture stream selecting means for indicating one of said one of said first and second sub-picture streams in a sub-picture selecting mode and for indicating a default one among the first and second sub-picture streams in a sub-picture non-selecting mode, said default one among the first and second sub-picture streams being one having the language corresponding to the predetermined language code of the apparatus;
(f) decoding means for (f1) decoding the sub-picture data units of the first sub-picture stream into a plurality of first sub-picture signals for presenting information of the first sub-picture stream in the first languages and (f2) decoding the sub-picture data units of the second sub-picture stream into a plurality of sub-picture signals for presenting information of the second sub-picture stream in the second language;
(g) mode setting means for setting one of a sub-picture presentation mode and a sub-picture non-presentation mode; and
(h) control means for (h1) controlling said decoding means, when the presentation mode is set, to output those among the first and second sub-picture signals which correspond to the indicated one of the first and second sub-picture streams, for (h2) controlling said decoding means, when the non-presentation mode is set, to output those among the first and second sub-picture signals, in accordance with the forcible display command and the start time in the display control sequence, which correspond to said at least one among the plurality of sub-picture data units of the indicated one of the first and second sub-picture streams having the forcible display command, and for (h3) preventing said decoding, means, when the non-presentation mode is set, from outputting those among the first and second sub-picture signals which correspond to those among the plurality of sub-picture data unit that do not have the forcible display command.

20. An apparatus for reproducing data from an optical disk, said optical disk comprising:
(a) a video stream including a plurality of video packs, each of said video packs having compressed video data;
(b) first and second audio streams, each of said audio streams including a plurality of audio packs, each of said audio packs having encoded audio data, the first audio stream having the first language and the second audio stream having the second language; and
(c) first and second sub-picture streams, each of said sub-picture streams including a plurality of sub-picture packs having sub-picture data, said first sub-picture stream having a first language and said second sub-picture streams having a second language;
wherein each of said first and second sub-picture streams comprising sub-picture data units, each said sub-picture data unit corresponding to a reproduction unit of the corresponding sub-picture stream and a sequence portion of plurality of said sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display command, and wherein the display control command of at least one among the plurality of sub-picture data units is a forcible display command;

said apparatus having a predetermined language code and comprising:

(d) retrieving means for retrieving the video, audio and sub-picture packs from said optical disk;

(e) audio stream selecting means for selecting one of said first and second audio streams in an audio stream selecting mode;

(f) sub-picture stream selecting means for indicating one of said one of said first and second sub-picture streams in a sub-picture selecting mode, for indicating a predetermined one among the first and second sub-picture streams in a sub-picture non-selecting mode, predetermined one among the first and second sub-picture streams being the one having the language of the selected one of the first and second audio streams and for indicating a default one among the first and second sub-picture streams in the sub-picture no-selecting mode and in an audio stream non-selecting mode, the default one among the first and second sub-picture streams being one having the predetermined language corresponding to the language code of the apparatus;

(g) decoding means for (g1) decoding the sub-picture data units of the first sub-picture stream into a plurality of first sub-picture signals for presenting information of the first sub-picture stream in the first languages and (g2) decoding the sub-picture data units of the second sub-picture stream into a plurality of sub-picture signals for presenting information of the second sub-picture stream in the second language;

(h) mode setting means for setting one of a sub-picture presentation mode and a sub-picture non-presentation mode; and (i) control means for (i1) controlling said decoding means, when the presentation mode is set, to output those among the first and second sub-picture signals which correspond to the indicated one of the first and second sub-picture streams, for (i2) controlling said decoding means, when the non-presentation mode is set, to output those among the first and second sub-picture signals, in accordance with the forcible display command and the start time in the display control sequence, which correspond to said at least one among the plurality of sub-picture data units of the indicated one of the first and second sub-picture streams having the forcible display command, and for (i3) preventing said decoding means, when the non-presentation mode is set, from outputting those among the first and second sub-picture signals which correspond to those among the plurality of sub-picture data unit that don not have the forcible display command.

21. A method of reproducing data from an optical disk, said optical disk comprising:

(a) a video stream including a plurality of video packs, each of said video packs having compressed video data;

(b) a first audio stream including a plurality of audio packs, each of said audio packs having encoded audio data; and (c) first and second sub-picture streams, each of said sub-picture streams including a plurality of sub-picture packs having sub-picture data, said first sub-picture stream having a first language and said second sub-picture streams having a second language;

wherein each of said first and second sub-picture streams comprising sub-picture data units, each said sub-picture data unit corresponding to a reproduction unit of the corresponding sub-picture stream and a sequence portion of plurality of said sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display command, and wherein the display control command of at least one among the plurality of sub-picture data units is a forcible display command;

said method comprising:

(e) acquiring a predetermined language code peculiar to the reproducing method:

(f) retrieving the video, audio and sub-picture packs from said optical disk;

(g) decoding the sub-picture data units of the first sub-picture stream into a plurality of first sub-picture signals for presenting information of the first sub-picture stream in the first languages and decoding the sub-picture data units of the second sub-picture stream into a plurality of sub-picture signals for presenting information of the second sub-picture stream in the second language;

(h) indicating one of said one of said first and second sub-picture streams in a sub-picture selecting mode and a default one of the first and second sub-picture streams in a sub-picture non-selecting mode, said default one among the first and second sub-picture streams being one having the language corresponding to the predetermined language code;

(i) setting one of a sub-picture presentation mode and a sub-picture non-presentation mode; and (j) outputting, when the presentation mode is set, those among the first and second sub-picture signals which correspond to the indicated one of the first and second sub-picture streams, outputting, when the non-presentation mode is set, those among the first and second sub-picture signals, in accordance with the forcible display command and the start time in the display control sequence, which correspond to said at least one among the plurality of sub-picture data units of the indicated one of the first and second sub-picture streams having the forcible display command, and preventing said decoding means, when the non-presentation mode is set, from outputting those among the first and second sub-picture signals which correspond to those among the plurality of sub-picture data unit that do not have the forcible display command.

22. A method of reproducing data from an optical disk, said optical disk comprising:

(a) a video stream including a plurality of video packs, each of said video packs having compressed video data;

(b) first and second audio streams, each of said audio streams including a plurality of audio packs, each of said audio packs having encoded audio data, the first audio stream having the first language and the second audio stream having the second language; and (c) first and second sub-picture streams, each of said sub-picture streams including a plurality of sub-picture packs having sub-picture data, said first sub-picture stream having a first language and said second sub-picture streams having a second language;

wherein each of said first and second sub-picture streams comprising sub-picture data units, each said sub-picture data unit corresponding to a reproduction unit of the corresponding sub-picture stream and a sequence portion of plurality of said sub-picture packs and comprising (1) a sub-picture unit header, (2) pixel data to be produced as the sub-picture data, and (3) a display control sequence table, said display control sequence table including a display control sequence, said display control sequence having (3a) a display control command for controlling a display of the pixel data and (3b) a start time of executing the display command, and wherein the display control command of at least one among the plurality of sub-picture data units is a forcible display command;

said apparatus comprising:

(d) acquiring a predetermined language code peculiar to the reproducing method;

(e) retrieving the video, audio and sub-picture packs from said optical disk;

(f) decoding the sub-picture data units of the first sub-picture stream into a plurality of first sub-picture signals for presenting information of the first sub-picture stream in the first languages and decoding the sub-picture data units of the second sub-picture stream into a plurality of sub-picture signals for presenting information of the second sub-picture stream in the second language;

(g) selecting one of said first and second audio streams in an audio stream selecting mode;

(h) indicating one of said one of said first and second sub-picture streams in a sub-picture selecting mode, indicating a predetermined one among the first and second sub-picture streams in a sub-picture non-selecting mode, said predetermined one among the first and second sub-picture streams being the one having the language of the selected one of the first and second audio streams, and indicating a default one among the first and second sub-picture streams in the sub-picture nonselecting mode and in an audio stream non-selecting mode, the default one among the first and second sub-picture streams being one having the predetermined language corresponding to the predetermined language code;

(i) setting one of a sub-picture presentation mode and a sub-picture non-presentation mode; and (j) outputting, when the presentation mode is set, those among the first and second sub-picture signals which correspond to the indicated one of the first and second sub-picture streams, outputting, when the non-presentation mode is set, those among the first and second sub-picture signals, in accordance with the forcible display command and the start time in the display control sequence, which correspond to said at least one among the plurality of sub-picture data units of the indicated one of the first and second sub-picture streams having the forcible display command, and preventing, when the non-presentation mode is set, output of those among the first and second sub-picture signals which correspond to those among the plurality of sub-picture data unit that do not have the forcible display command.

* * * * *